(12) United States Patent
Streit

(10) Patent No.: US 12,457,111 B2
(45) Date of Patent: Oct. 28, 2025

(54) SYSTEMS AND METHODS FOR PRIVACY-ENABLED BIOMETRIC PROCESSING

(71) Applicant: Private Identity LLC, Potomac, MD (US)

(72) Inventor: Scott Edward Streit, Woodbine, MD (US)

(73) Assignee: Private Identity LLC, Potomac, MD (US)

( * ) Notice: Subject to any disclaimer, the term of this patent is extended or adjusted under 35 U.S.C. 154(b) by 0 days.

(21) Appl. No.: 18/443,803

(22) Filed: Feb. 16, 2024

(65) Prior Publication Data
US 2025/0055696 A1    Feb. 13, 2025

Related U.S. Application Data

(63) Continuation of application No. 17/682,081, filed on Feb. 28, 2022, now Pat. No. 11,943,364, which is a
(Continued)

(51) Int. Cl.
*H04L 9/32* (2006.01)
*G06F 21/32* (2013.01)
(Continued)

(52) U.S. Cl.
CPC ............ *H04L 9/3231* (2013.01); *G06F 21/32* (2013.01); *G06F 21/6245* (2013.01);
(Continued)

(58) Field of Classification Search
CPC ....... H04L 9/3231; H04L 9/008; G06F 21/32; G06F 21/6245; G06N 3/045; G06N 3/08;
(Continued)

(56) References Cited

U.S. PATENT DOCUMENTS

| 5,408,588 A | 4/1995 | Ulug |
| 5,805,731 A | 9/1998 | Yaeger et al. |

(Continued)

OTHER PUBLICATIONS

U.S. Appl. No. 17/866,642, filed Jul. 18, 2022, Streit.
(Continued)

*Primary Examiner* — Kathleen Y Dulaney
(74) *Attorney, Agent, or Firm* — Wolf, Greenfield & Sacks, P.C.

(57) ABSTRACT

In one embodiment, a set of feature vectors can be derived from any biometric data, and then using a deep neural network ("DNN") on those one-way homomorphic encryptions (i.e., each biometrics' feature vector) an authentication system can determine matches or execute searches on encrypted data. Each biometrics' feature vector can then be stored and/or used in conjunction with respective classifications, for use in subsequent comparisons without fear of compromising the original biometric data. In various embodiments, the original biometric data is discarded responsive to generating the encrypted values. In another embodiment, the homomorphic encryption enables computations and comparisons on cypher text without decryption of the encrypted feature vectors. Security of such privacy enable biometrics can be increased by implementing an assurance factor (e.g., liveness) to establish a submitted biometric has not been spoofed or faked.

21 Claims, 18 Drawing Sheets

Related U.S. Application Data continuation of application No. 16/539,824, filed on Aug. 13, 2019, now Pat. No. 11,265,168, which is a continuation-in-part of application No. 16/218,139, filed on Dec. 12, 2018, now Pat. No. 11,210,375, which is a continuation-in-part of application No. 15/914,562, filed on Mar. 7, 2018, now Pat. No. 11,392,802, said application No. 16/539,824 is a continuation-in-part of application No. 15/914,562, filed on Mar. 7, 2018, now Pat. No. 11,392,802, said application No. 16/218,139 is a continuation-in-part of application No. 15/914,942, filed on Mar. 7, 2018, now Pat. No. 10,721,070, said application No. 16/539,824 is a continuation-in-part of application No. 15/914,436, filed on Mar. 7, 2018, now Pat. No. 10,419,221, said application No. 16/539,824 is a continuation-in-part of application No. 15/914,969, filed on Mar. 7, 2018, now Pat. No. 11,138,333, said application No. 16/218,139 is a continuation-in-part of application No. 15/914,969, filed on Mar. 7, 2018, now Pat. No. 11,138,333, said application No. 16/539,824 is a continuation-in-part of application No. 15/914,942, filed on Mar. 7, 2018, now Pat. No. 10,721,070.

(51) Int. Cl.

| | | |
|---|---|---|
| *G06F 21/62* | (2013.01) | |
| *G06N 3/045* | (2023.01) | |
| *G06N 3/08* | (2023.01) | |
| *G06N 20/00* | (2019.01) | |
| *G06V 10/44* | (2022.01) | |
| *G06V 10/764* | (2022.01) | |
| *G06V 10/82* | (2022.01) | |
| *G06V 30/194* | (2022.01) | |
| *G06V 40/16* | (2022.01) | |
| *H04L 9/00* | (2022.01) | |

(52) U.S. Cl.
CPC ............. *G06N 3/045* (2023.01); *G06N 3/08* (2013.01); *G06N 20/00* (2019.01); *G06V 10/454* (2022.01); *G06V 10/764* (2022.01); *G06V 10/82* (2022.01); *G06V 30/194* (2022.01); *G06V 40/172* (2022.01); *H04L 9/008* (2013.01)

(58) Field of Classification Search
CPC .... G06N 20/00; G06V 10/454; G06V 10/764; G06V 10/82; G06V 30/194; G06V 40/172
USPC .......................... 382/115, 156, 190; 713/186
See application file for complete search history.

(56) References Cited

U.S. PATENT DOCUMENTS

| | | | |
|---|---|---|---|
| 5,838,812 | A | 11/1998 | Pare, Jr. et al. |
| 6,480,621 | B1 | 11/2002 | Lyon |
| 6,944,319 | B1 | 9/2005 | Huang et al. |
| 7,278,025 | B2 | 10/2007 | Saito et al. |
| 8,281,148 | B2 | 10/2012 | Tuyls et al. |
| 8,418,249 | B1 | 4/2013 | Nucci et al. |
| 8,856,541 | B1 | 10/2014 | Chaudhury et al. |
| 8,924,928 | B1 | 12/2014 | Belovich |
| 8,966,277 | B2 | 2/2015 | Rane et al. |
| 9,003,196 | B2 | 4/2015 | Hoyos et al. |
| 9,037,846 | B2 | 5/2015 | Furukawa |
| 9,141,916 | B1 | 9/2015 | Corrado et al. |
| 9,208,492 | B2 | 12/2015 | Hoyos |
| 9,313,200 | B2 | 4/2016 | Hoyos |
| 9,348,488 | B1 | 5/2016 | Renema, II |
| 9,390,327 | B2 | 7/2016 | Gottemukkula et al. |
| 9,426,150 | B2 | 8/2016 | Stern et al. |
| 9,471,919 | B2 | 10/2016 | Hoyos et al. |
| 9,619,723 | B1 | 4/2017 | Chow et al. |
| 9,680,779 | B2 | 6/2017 | Marovets |
| 9,783,162 | B2 | 10/2017 | Hoyos et al. |
| 9,830,709 | B2 | 11/2017 | Li et al. |
| 9,838,388 | B2 | 12/2017 | Mather et al. |
| 10,075,289 | B2 | 9/2018 | Laine et al. |
| 10,108,902 | B1 | 10/2018 | Lockett |
| 10,110,738 | B1 | 10/2018 | Sawant et al. |
| 10,129,252 | B1 | 11/2018 | Suen |
| 10,180,339 | B1 | 1/2019 | Long et al. |
| 10,375,042 | B2 | 8/2019 | Chaum |
| 10,419,221 | B1 | 9/2019 | Streit |
| 10,467,526 | B1 | 11/2019 | Appalaraju et al. |
| 10,491,373 | B2 | 11/2019 | Jain et al. |
| 10,499,069 | B2 | 12/2019 | Wang et al. |
| 10,635,894 | B1 | 4/2020 | Genner |
| 10,721,070 | B2 | 7/2020 | Streit |
| 10,735,411 | B1 | 8/2020 | Hardt et al. |
| 10,757,207 | B1 | 8/2020 | Kharwandikar |
| 10,902,237 | B1 | 1/2021 | Aggarwal et al. |
| 10,938,852 | B1 | 3/2021 | Streit |
| 11,112,078 | B2 | 9/2021 | Jiang |
| 11,138,333 | B2 | 10/2021 | Streit |
| 11,170,084 | B2 | 11/2021 | Streit |
| 11,210,375 | B2 | 12/2021 | Streit |
| 11,281,664 | B1 | 3/2022 | Paiz |
| 11,288,530 | B1 | 3/2022 | Genner |
| 11,362,831 | B2 | 6/2022 | Streit |
| 11,392,802 | B2 | 7/2022 | Streit |
| 11,394,552 | B2 | 7/2022 | Streit |
| 11,489,866 | B2 | 11/2022 | Streit |
| 11,502,841 | B2 | 11/2022 | Streit |
| 11,562,181 | B2 | 1/2023 | Chen et al. |
| 11,562,255 | B2 | 1/2023 | Johnson et al. |
| 11,562,256 | B2 | 1/2023 | Bai et al. |
| 11,677,559 | B2 | 6/2023 | Streit |
| 11,762,967 | B2 | 9/2023 | Streit |
| 11,783,018 | B2 | 10/2023 | Streit |
| 11,789,699 | B2 | 10/2023 | Streit |
| 11,790,066 | B2 | 10/2023 | Streit |
| 11,943,364 | B2 * | 3/2024 | Streit .................. G06V 30/194 |
| 2002/0049685 | A1 | 4/2002 | Yaginuma |
| 2002/0104027 | A1 | 8/2002 | Skerpac |
| 2005/0138110 | A1 | 6/2005 | Redlich et al. |
| 2005/0149442 | A1 | 7/2005 | Adams et al. |
| 2006/0228005 | A1 | 10/2006 | Matsugu et al. |
| 2007/0155366 | A1 | 7/2007 | Manohar et al. |
| 2007/0177773 | A1 | 8/2007 | Hu et al. |
| 2007/0220595 | A1 | 9/2007 | M'raihi et al. |
| 2007/0245152 | A1 | 10/2007 | Pizano et al. |
| 2008/0113785 | A1 | 5/2008 | Alderucci et al. |
| 2008/0113786 | A1 | 5/2008 | Alderucci et al. |
| 2008/0235515 | A1 | 9/2008 | Yedidia et al. |
| 2008/0247611 | A1 | 10/2008 | Aisaka et al. |
| 2009/0034803 | A1 | 2/2009 | Matos |
| 2009/0328175 | A1 | 12/2009 | Shuster |
| 2010/0010968 | A1 | 1/2010 | Redlich et al. |
| 2010/0131273 | A1 | 5/2010 | Aley-Raz et al. |
| 2010/0162386 | A1 | 6/2010 | Li et al. |
| 2010/0180127 | A1 | 7/2010 | Li et al. |
| 2011/0026781 | A1 | 2/2011 | Osadchy et al. |
| 2012/0195475 | A1 | 8/2012 | Abiko |
| 2013/0080166 | A1 | 3/2013 | Buffum et al. |
| 2013/0148868 | A1 | 6/2013 | Troncoso Pastoriza et al. |
| 2013/0166296 | A1 | 6/2013 | Scheffer |
| 2013/0212049 | A1 | 8/2013 | Maldonado |
| 2013/0273968 | A1 | 10/2013 | Rhoads et al. |
| 2013/0307670 | A1 | 11/2013 | Ramaci |
| 2013/0318351 | A1 | 11/2013 | Hirano et al. |
| 2014/0279774 | A1 | 9/2014 | Wang et al. |
| 2014/0283061 | A1 | 9/2014 | Quinlan et al. |
| 2014/0304505 | A1 | 10/2014 | Dawson |
| 2014/0331059 | A1 | 11/2014 | Rane et al. |
| 2014/0337930 | A1 | 11/2014 | Hoyos et al. |
| 2015/0170053 | A1 | 6/2015 | Miao |
| 2015/0200958 | A1 | 7/2015 | Muppidi et al. |

(56) References Cited

U.S. PATENT DOCUMENTS

| | | |
|---|---|---|
| 2015/0215312 A1 | 7/2015 | Cesnik |
| 2015/0310444 A1 | 10/2015 | Chen et al. |
| 2015/0347820 A1 | 12/2015 | Yin et al. |
| 2016/0006673 A1 | 1/2016 | Thomas et al. |
| 2016/0078485 A1 | 3/2016 | Shim et al. |
| 2016/0127359 A1 | 5/2016 | Minter et al. |
| 2016/0140438 A1 | 5/2016 | Yang et al. |
| 2016/0164682 A1 | 6/2016 | Hartloff et al. |
| 2016/0337426 A1 | 11/2016 | Shribman et al. |
| 2016/0350648 A1 | 12/2016 | Gilad-Bachrach et al. |
| 2016/0371438 A1 | 12/2016 | Annulis |
| 2016/0373440 A1 | 12/2016 | Mather et al. |
| 2016/0379041 A1 | 12/2016 | Rhee et al. |
| 2016/0379044 A1 | 12/2016 | Tang et al. |
| 2017/0008168 A1 | 1/2017 | Weng et al. |
| 2017/0046563 A1 | 2/2017 | Kim et al. |
| 2017/0093851 A1 | 3/2017 | Allen |
| 2017/0098140 A1 | 4/2017 | Wang et al. |
| 2017/0126672 A1 | 5/2017 | Jang |
| 2017/0132526 A1 | 5/2017 | Cohen et al. |
| 2017/0169331 A1 | 6/2017 | Garner |
| 2017/0289168 A1 | 10/2017 | Bar et al. |
| 2017/0357890 A1 | 12/2017 | Kim et al. |
| 2018/0018451 A1 | 1/2018 | Spizhevoy et al. |
| 2018/0025243 A1 | 1/2018 | Chandraker et al. |
| 2018/0032844 A1 | 2/2018 | Yao et al. |
| 2018/0032997 A1 | 2/2018 | Gordon et al. |
| 2018/0060552 A1 | 3/2018 | Pellom et al. |
| 2018/0082172 A1 | 3/2018 | Patel et al. |
| 2018/0117446 A1 | 5/2018 | Tran et al. |
| 2018/0121560 A1 | 5/2018 | Chen et al. |
| 2018/0121710 A1 | 5/2018 | Leizerson et al. |
| 2018/0137395 A1 | 5/2018 | Han et al. |
| 2018/0139054 A1 | 5/2018 | Chu et al. |
| 2018/0173861 A1 | 6/2018 | Guidotti et al. |
| 2018/0173980 A1 | 6/2018 | Fan et al. |
| 2018/0176216 A1 | 6/2018 | Mather et al. |
| 2018/0232508 A1 | 8/2018 | Kursun |
| 2018/0276488 A1 | 9/2018 | Yoo et al. |
| 2018/0293429 A1 | 10/2018 | Wechsler et al. |
| 2018/0307815 A1 | 10/2018 | Samadani et al. |
| 2018/0330179 A1* | 11/2018 | Streit .................. G06F 21/32 |
| 2018/0336472 A1 | 11/2018 | Ravi |
| 2018/0373979 A1 | 12/2018 | Wang et al. |
| 2019/0005126 A1 | 1/2019 | Chen et al. |
| 2019/0019061 A1 | 1/2019 | Trenholm et al. |
| 2019/0020482 A1 | 1/2019 | Gupta et al. |
| 2019/0042895 A1 | 2/2019 | Liang et al. |
| 2019/0044723 A1 | 2/2019 | Prakash et al. |
| 2019/0068627 A1 | 2/2019 | Thampy |
| 2019/0080475 A1 | 3/2019 | Ma et al. |
| 2019/0122096 A1 | 4/2019 | Husain |
| 2019/0130168 A1 | 5/2019 | Khitrov et al. |
| 2019/0132344 A1 | 5/2019 | Lem et al. |
| 2019/0147305 A1 | 5/2019 | Lu et al. |
| 2019/0147434 A1 | 5/2019 | Leung |
| 2019/0171908 A1 | 6/2019 | Salavon |
| 2019/0180090 A1 | 6/2019 | Jiang et al. |
| 2019/0197331 A1 | 6/2019 | Kwak et al. |
| 2019/0205620 A1 | 7/2019 | Yi et al. |
| 2019/0215551 A1 | 7/2019 | Modarresi et al. |
| 2019/0225232 A1 | 7/2019 | Blau |
| 2019/0228248 A1 | 7/2019 | Han et al. |
| 2019/0236273 A1 | 8/2019 | Saxe et al. |
| 2019/0244138 A1 | 8/2019 | Bhowmick et al. |
| 2019/0253404 A1 | 8/2019 | Briceno et al. |
| 2019/0253431 A1 | 8/2019 | Atanda |
| 2019/0258927 A1 | 8/2019 | Chen et al. |
| 2019/0272361 A1 | 9/2019 | Kursun et al. |
| 2019/0278894 A1 | 9/2019 | Andala et al. |
| 2019/0278895 A1 | 9/2019 | Streit |
| 2019/0278937 A1 | 9/2019 | Streit |
| 2019/0279047 A1 | 9/2019 | Streit |
| 2019/0280868 A1 | 9/2019 | Streit |
| 2019/0280869 A1 | 9/2019 | Streit |
| 2019/0286950 A1 | 9/2019 | Kiapour et al. |
| 2019/0294973 A1 | 9/2019 | Kannan et al. |
| 2019/0295223 A1 | 9/2019 | Shen et al. |
| 2019/0306731 A1 | 10/2019 | Raghuramu et al. |
| 2019/0318261 A1 | 10/2019 | Deng et al. |
| 2019/0347432 A1 | 11/2019 | Boivie |
| 2019/0354806 A1 | 11/2019 | Chhabra |
| 2019/0372754 A1 | 12/2019 | Gou et al. |
| 2019/0372947 A1 | 12/2019 | Penar et al. |
| 2020/0004939 A1 | 1/2020 | Streit |
| 2020/0007931 A1 | 1/2020 | Ho et al. |
| 2020/0014541 A1* | 1/2020 | Streit .................. H04L 63/0861 |
| 2020/0044852 A1 | 2/2020 | Streit |
| 2020/0097653 A1 | 3/2020 | Mehta et al. |
| 2020/0099508 A1 | 3/2020 | Ghorbani |
| 2020/0228336 A1 | 7/2020 | Streit |
| 2020/0228339 A1 | 7/2020 | Barham et al. |
| 2020/0285737 A1 | 9/2020 | Kraus et al. |
| 2020/0351097 A1 | 11/2020 | Streit |
| 2020/0365143 A1 | 11/2020 | Ogawa et al. |
| 2020/0387835 A1 | 12/2020 | Sandepudi et al. |
| 2021/0014039 A1 | 1/2021 | Zhang et al. |
| 2021/0065859 A1 | 3/2021 | McKinney et al. |
| 2021/0097158 A1 | 4/2021 | Lee et al. |
| 2021/0103937 A1 | 4/2021 | Joglekar et al. |
| 2021/0141007 A1 | 5/2021 | Gu et al. |
| 2021/0141896 A1* | 5/2021 | Streit ..................... G06F 21/32 |
| 2021/0224563 A1 | 7/2021 | Patel et al. |
| 2021/0319784 A1 | 10/2021 | Le Roux et al. |
| 2021/0374445 A1 | 12/2021 | Genner |
| 2021/0377298 A1 | 12/2021 | Streit |
| 2022/0058255 A1 | 2/2022 | Streit |
| 2022/0078206 A1 | 3/2022 | Streit |
| 2022/0100896 A1 | 3/2022 | Streit |
| 2022/0147602 A1 | 5/2022 | Streit |
| 2022/0147607 A1 | 5/2022 | Streit |
| 2022/0150068 A1 | 5/2022 | Streit |
| 2022/0229890 A1 | 7/2022 | Streit |
| 2022/0277064 A1 | 9/2022 | Streit |
| 2023/0025754 A1 | 1/2023 | Hassanzadeh et al. |
| 2023/0043127 A1 | 2/2023 | Streit |
| 2023/0070649 A1 | 3/2023 | Streit |
| 2023/0103695 A1 | 4/2023 | Streit |
| 2023/0106829 A1 | 4/2023 | Streit |
| 2023/0176815 A1 | 6/2023 | Streit |
| 2023/0283476 A1 | 9/2023 | Streit |
| 2023/0368026 A1 | 11/2023 | Cox et al. |
| 2024/0028951 A1 | 1/2024 | Willardson et al. |
| 2024/0048389 A1 | 2/2024 | Streit |
| 2024/0078300 A1 | 3/2024 | Streit |
| 2024/0220594 A1 | 7/2024 | Streit |
| 2024/0248679 A1 | 7/2024 | Streit |
| 2024/0248973 A1 | 7/2024 | Streit |

OTHER PUBLICATIONS

U.S. Appl. No. 18/312,887, filed May 5, 2023, Streit.
U.S. Appl. No. 18/882,447, filed Sep. 11, 2024, Streit.
U.S. Appl. No. 18/140,935, filed Apr. 28, 2023, Streit.
U.S. Appl. No. 18/364,617, filed Aug. 3, 2023, Streit.
U.S. Appl. No. 18/823,448, filed Sep. 3, 2024, Streit.
U.S. Appl. No. 17/984,719, filed Nov. 10, 2022, Streit.
U.S. Appl. No. 17/866,673, filed Jul. 18, 2022, Streit.
U.S. Appl. No. 18/461,904, filed Sep. 6, 2023, Streit.
U.S. Appl. No. 18/465,312, filed Sep. 12, 2023, Streit.
U.S. Appl. No. 17/977,066, filed Oct. 31, 2022, Streit.
U.S. Appl. No. 17/583,687, filed Jan. 5, 2022, Streit.
U.S. Appl. No. 18/754,422, filed Jun. 26, 2024, Streit.
U.S. Appl. No. 18/754,457, filed Jun. 26, 2024, Streit.
U.S. Appl. No. 17/583,726, filed Jan. 25, 2022, Streit.
U.S. Appl. No. 17/583,763, filed Jan. 25, 2022, Streit.
U.S. Appl. No. 17/583,795, filed Jan. 25, 2022, Streit.
PCT/US2019/021100, Aug. 26, 2019, International Search Report and Written Opinion.
EP 19712657.6, Oct. 10, 2022, European Examination Report.
EP 20852611.1, Jul. 14, 2023, Extended European Search Report.
CA 3092941, Apr. 3, 2024, Canadian Examination Report.

(56) References Cited

OTHER PUBLICATIONS

*Brian Streit* v. *Private Identity LLC (f.k.a. Open Inference Holdings LLC)* Dist. Ct. ME, 8:23-cv-2031.
Extended European Search Report dated Aug. 12, 2024, in connection with European Application No. EP 21856719.6.
Barni et al., Privacy-Preserving ECG Classification With Branching Programs and Neural Networks. IEEE Transactions on information Forensics and Security. Jun. 2011;6(2):452-68.
Basu et al., User-in-a-context; a blueprint for context-aware identification. 14th Annual Conference on Privacy, Security and Trust (PST). 2016, pp. 329-334 doi: 10.1109/PST.2016.7906982.
Hema et al., Mouse Behavior Based Multi-Factor Authentication using Neural Networks. 2016 International Conference on Circuit, Power and Computing (ICCPCT). 2016, pp. 1-8. doi: 10.1109/ICCPCT.2016.7530312.
Ligier et al., Information leakage analysis of inner-product functional encryption-based data classification. 2017 15th Annual Conference on Privacy, Security and Trust (PST). 2017. 6 pages.
Picek et al. Side-Channel analysis and machine learning: A practical perspective. International Join Conference Neural Networks (IJCNN). 2017. 8 Pages.
Xu et al., Developing a Courses Module for Teaching Cryptography Programming on Android. 2015 IEEE Frontiers in Education Conference. (FIE). 2015. pp 1-4. doi:10.1109/FIE.2015.7344086.
Yang et al., Chaotic Encryption Algorithm Against Chosen-Plaintext Attacks in Optical OFDM Transmission. IEEE Photonics Technology Letters. 2016.28(22).

\* cited by examiner

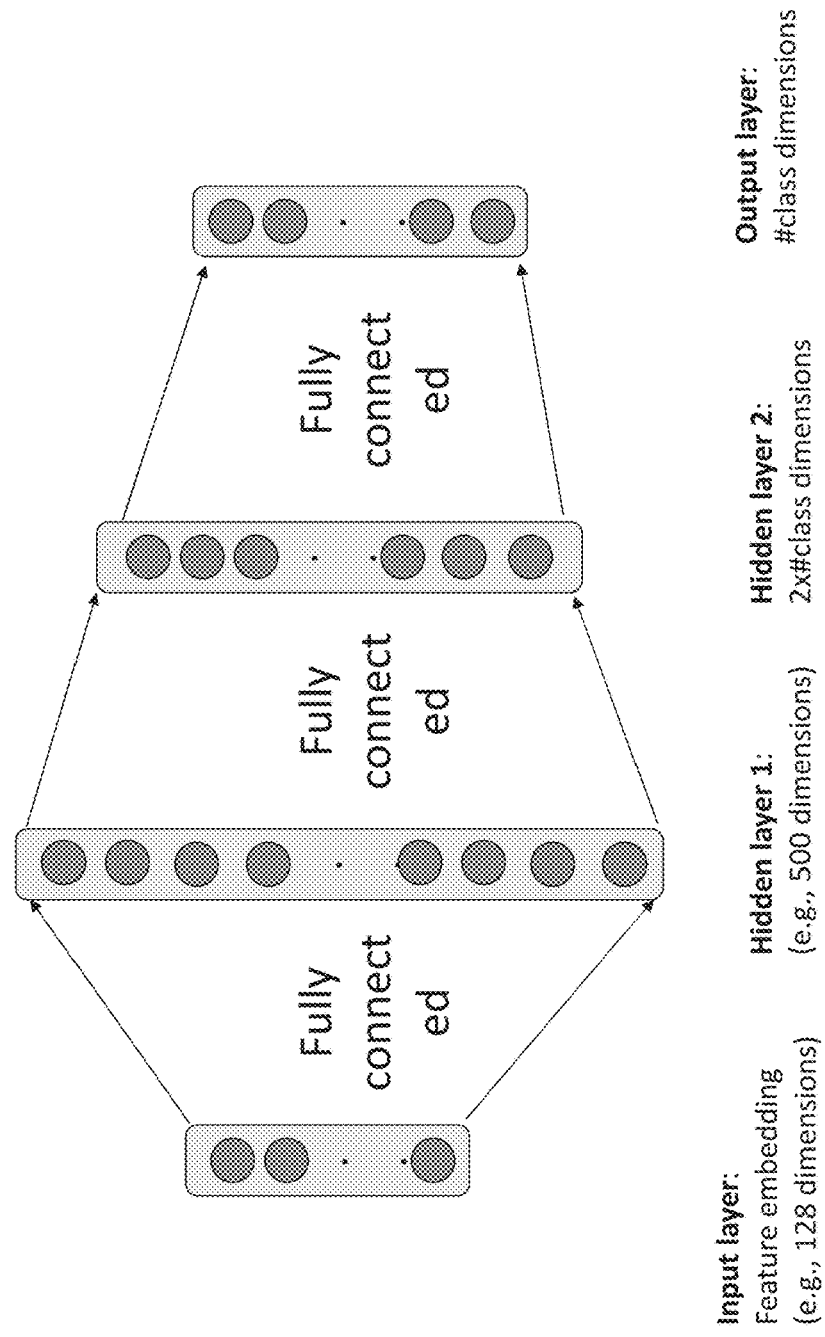

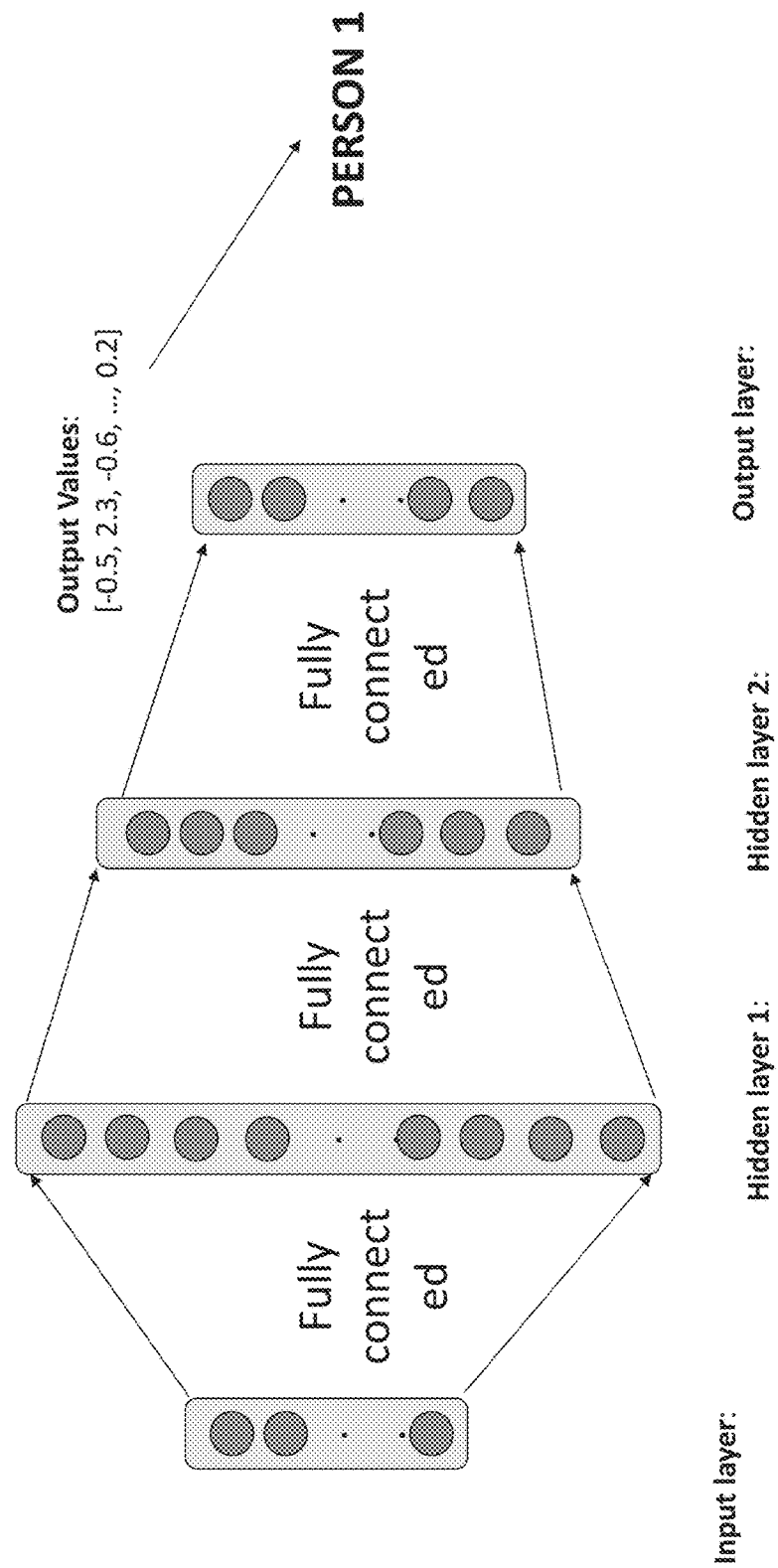

Test Generic Image Model

Source image

Job Status Done
- Initialized at 01:22:22 PM (1 second)
- Running at 01:22:23 PM (10 seconds)
- Done at 01:22:34 PM (Total = 12 seconds)

Infer Model Done ▶

Notes

None

Inference visualization softmax [[[ 7.7360213e-14]] [[ 2.2195698e-08]] [[ 2.7901094e-38]] [[
4.6566184e-12]] [[ 1.2244204e-25]] [[ 1.1417436e-23]] [[ 2.0873589e-10]] [[
5.5042492e-23]] [[ 1.4145355e-16]] [[ 1.0000000e+00]] [[ 3.8353947e-23]] [[
[[ 1.0662542e-15]] [[ 4.1514641e-09]] [[ 4.1813369e-20]] [[
1.6232584e-16]]]

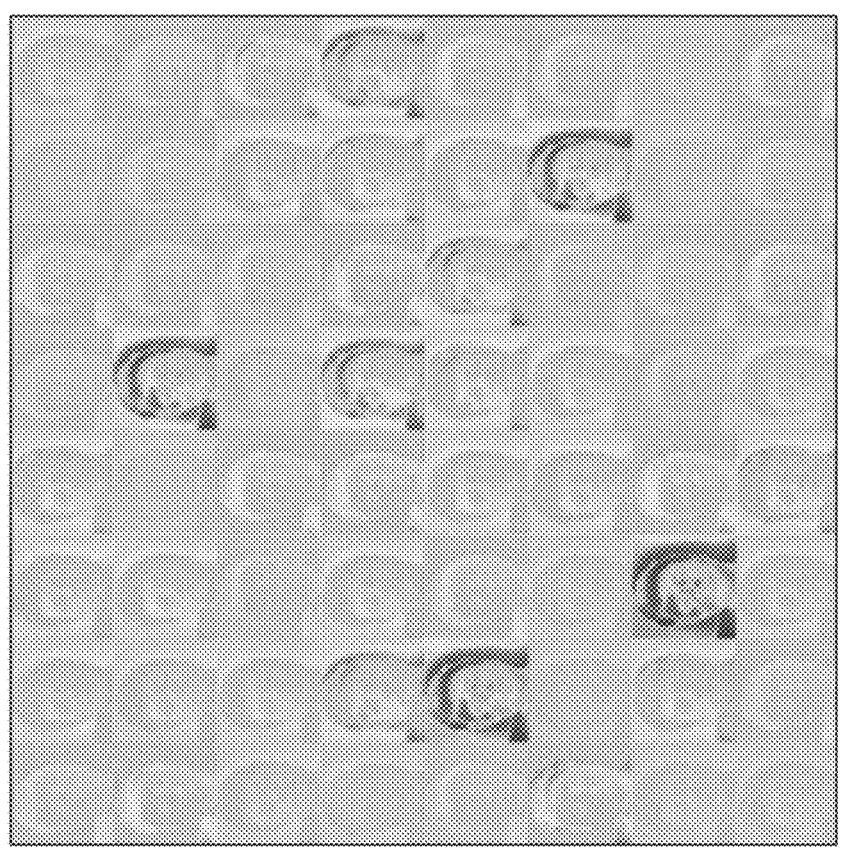
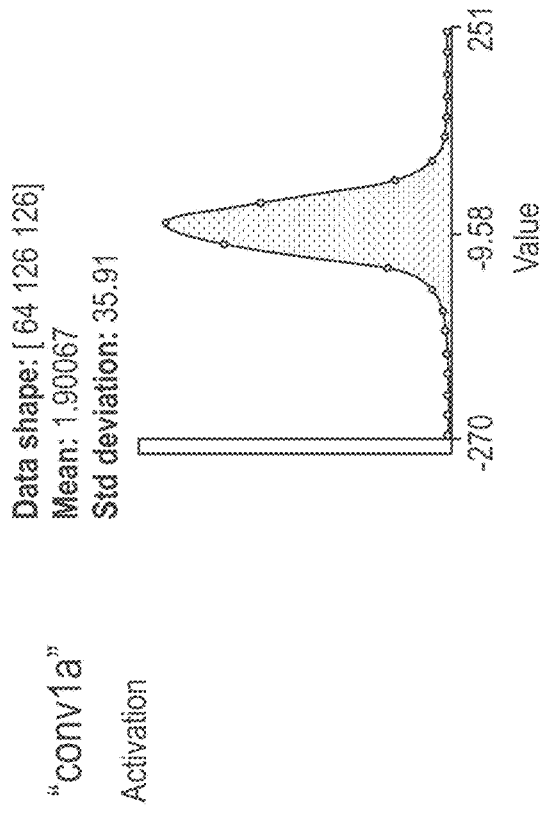
FIG. 5C

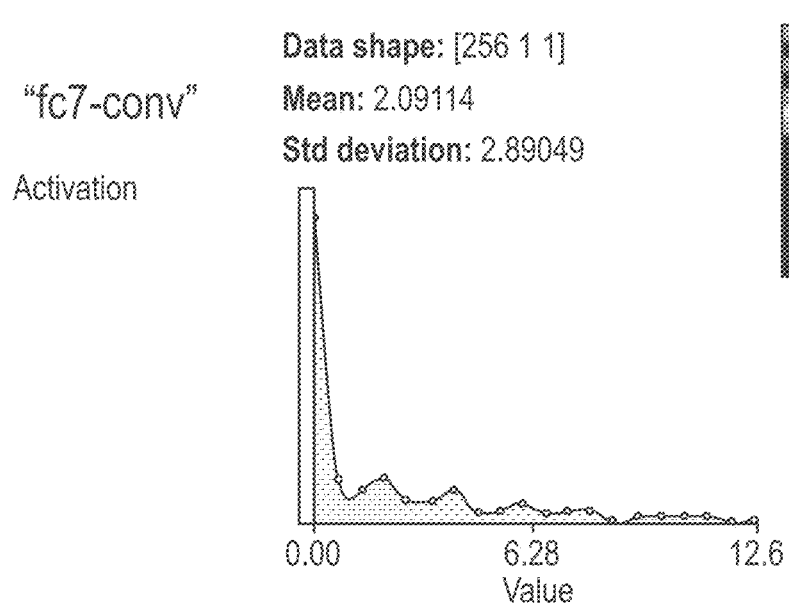
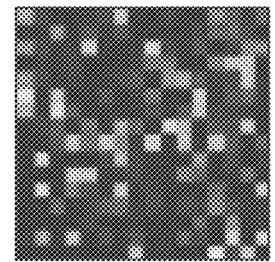
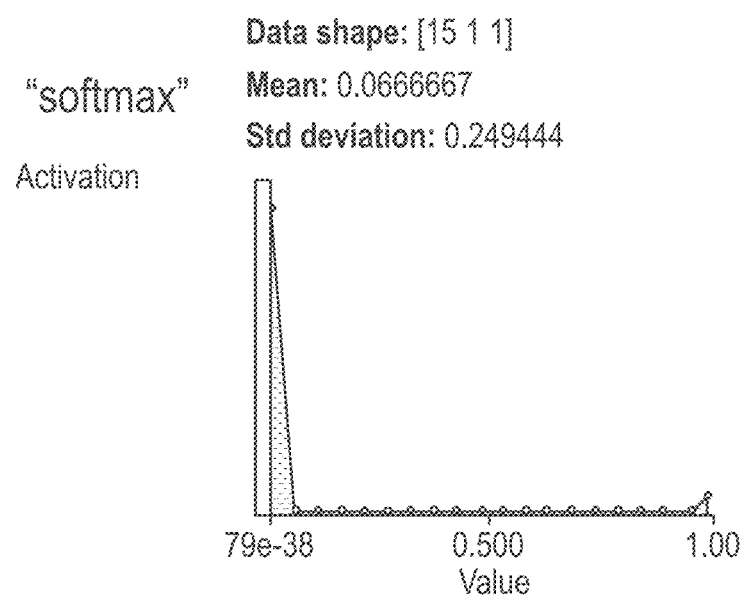
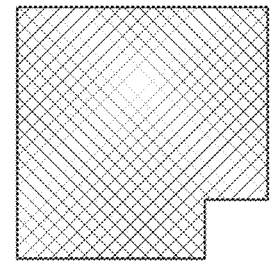
FIG. 5D

FIG. 8A

TABLE X. Liveness Implementations

| Id | Type | Strategy | Pros | Cons | Summary |
|---|---|---|---|---|---|
| 1 | Passive | 3D Camera | Does not impact user | As the third dimension solves a problem, 3D printers create a new and real vulnerability | Not efficient. Possible vulnerabilities exist as solutions that are 3D are potentially vulnerable to 3D printers |
| 2 | Passive | Detect blood pressure, or heart beat | Does not impact user | Difficult to read. Possibly could be simulated. | Not efficient. |
| 3 | Passive | Detect eyelid movement | Does not impact user | Difficult to read, and eye movement may be easily simulated in a video. | Not efficient due to a replay attack. |
| 4 | Active | Requested gesture from a set of gestures | More direct than passive | Spoof issue. Create a video of all possible gestures replay the gesture when requested | Easy to spoof. Relies on securing the set of gestures. |
| 5 | Active | Requested random gestures. | More direct than passive | The randomness too difficult to read for a large set of possibilities. Difficult to detect matches in large sets. | The larger the set of possibility gestures the more difficult it is to read. For this reason, inefficient |
| 6 | Active | Request words from a set of words. | Ease in detection | The entire set of requested words may be recorded and replayed | Inefficient due to replay. |

FIG. 8B

TABLE X (Continued)

| 7 | Active | Request a random set of words | The randomness makes it impossible to record and replay | Devices may say the words as requested in place of the user. | Practical but with some limitations. |
|---|--------|------------------------------|----------------------------------------------------------|--------------------------------------------------------------|--------------------------------------|
| 8 | Active | Request random set of words in conjunction with a voice identity based on the same audio input | The word check in conjunction with identity prevents replay thorough a device. | Future devices | Practical. |

SYSTEMS AND METHODS FOR PRIVACY-ENABLED BIOMETRIC PROCESSING

RELATED APPLICATIONS

This Application is a Continuation of U.S. application Ser. No. 17/682,081, Filed Feb. 28, 2022, entitled "SYSTEMS AND METHODS FOR PRIVACY-ENABLED BIOMETRIC PROCESSING", which is a Continuation of U.S. application Ser. No. 16/539,824, filed Aug. 13, 2019, entitled "SYSTEMS AND METHODS FOR PRIVACY-ENABLED BIOMETRIC PROCESSING", which is a Continuation-in-part of U.S. application Ser. No. 16/218,139, filed Dec. 12, 2018, entitled "SYSTEMS AND METHODS FOR BIOMETRIC PROCESSING WITH LIVENESS", which is a Continuation-in-part of U.S. application Ser. No. 15/914,562, filed Mar. 7, 2018, entitled "SYSTEMS AND METHODS FOR PRIVACY-ENABLED BIOMETRIC PROCESSING". Application Ser. No. 16/218,139 is a Continuation-in-part of U.S. application Ser. No. 15/914,942, filed Mar. 7, 2018, entitled "SYSTEMS AND METHODS FOR PRIVACY-ENABLED BIOMETRIC PROCESSING". application Ser. No. 16/218,139 is a Continuation-in-part of U.S. application Ser. No. 15/914,969, filed Mar. 7, 2018, entitled "SYSTEMS AND METHODS FOR PRIVACY-ENABLED BIOMETRIC PROCESSING". application Ser. No. 16/539,824 is a Continuation-in-part of U.S. application Ser. No. 15/914,436, filed Mar. 7, 2018, entitled "SYSTEMS AND METHODS FOR PRIVACY-ENABLED BIOMETRIC PROCESSING". application Ser. No. 16/539,824 is a Continuation-in-part of U.S. application Ser. No. 15/914,562, filed Mar. 7, 2018, entitled "SYSTEMS AND METHODS FOR PRIVACY-ENABLED BIOMETRIC PROCESSING". application Ser. No. 16/539,824 is a Continuation-in-part of U.S. application Ser. No. 15/914,942, filed Mar. 7, 2018, entitled "SYSTEMS AND METHODS FOR PRIVACY-ENABLED BIOMETRIC PROCESSING". application Ser. No. 16/539,824 is a Continuation-in-part of U.S. application Ser. No. 15/914,969, filed Mar. 7, 2018, entitled "SYSTEMS AND METHODS FOR PRIVACY-ENABLED BIOMETRIC PROCESSING". Each of which preceding applications are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Biometrics offer the opportunity for identity assurance and identity validation. Many conventional uses for biometrics currently exist for identity and validation. These conventional approaches suffer from many flaws. For example, the IPHONE facial recognition service limits implementation to a one to one match. This limitation is due to the inability to perform one to many searching on the biometric, let alone on a secure encrypted biometric. Other potential issues include faked biometric or replayed biometric signals that can be used to trick many conventional security systems.

SUMMARY

According to one aspect, it is realized that there is a need for a solution that provides one to many searching, and that provides for operations on encrypted biometric information. There is a further need to establish such searches that accomplish one to many matching in polynomial time. Various embodiments of the privacy-enabled biometric system provide for scanning of multiple biometrics to determine matches or closeness. Further embodiments can provide for search and matching across multiple types of encrypted biometric information improving accuracy of validation over many conventional approaches, while improving the security over the same approaches.

According to another aspect, a private authentication system can invoke multiple authentication methodologies, for example, to speed initial enrollment for users. For example, a distance metric store can be used in an initial enrollment phase, that permits quick establishment of user authentication credentials (e.g., encrypted feature vectors) that can be examined to determine distance between a subsequent encrypted feature vector(s) and encrypted feature vectors in the distance store. Where the distance is within a certain threshold, the user can be authenticated.

In various embodiments, the distance store is used as a rough or course authentication approach that can be quickly executed for authentications. During the initial authentication phase, a more sophisticated authentication approach can be trained—i.e. a DNN can be trained on encrypted feature vectors (e.g., Euclidean measurable feature vectors, distance measurable feature vectors, homomorphic encrypted feature vectors, etc.) and identification label, so that upon input of an encrypted feature vector the DNN can return an identification label (or unknown result, where applicable). According to further aspects, a privacy preserving authentication system can execute hybrid authentication schemes, a fast authentication approach (e.g., distance evaluations of encrypted biometrics) coupled with a more robust trained DNN approach that takes longer to establish. Once ready, the system can use either authentication approach (e.g., switch over to the trained DNN approach (e.g., neural network accepts encrypted feature vector as input and returns an identification label or unknown result)). In yet further embodiments, the system is configured to leverage a fast authentication approach for new enrollments and/or updates to authentication information and use, for example, multiple threads for distance authentication and deep learning authentication (e.g., with the trained DNN) once the DNN trained on encrypted feature vectors is ready. According to another aspect, conventional approaches are significantly burdened not only in biometric data that is to be searched in the clear but also by key management overhead that is needed for securing those biometrics in storage. Using APPLE as an example, a secure enclave is provided on the IPHONE with encryption keys only available to the secure enclave such that facial biometrics never leave a respective device or the secure enclave. Various embodiments described herein completely change this paradigm by fully encrypting the reference biometric, and executing comparisons on the encrypted biometrics (e.g., encrypted feature vectors of the biometric).

In further aspects, conventional approaches to passive biometric collection and authentication have been shown to be vulnerable to faked credentials and/or simply not useable for authentication. Some other approaches have attempted to resolve these issues with active biometric collection, but similar flaws are still present. For example, in gesture based authentication systems, requests are made of a user based on a set of gestures, and the set of gestures itself can become a vulnerability. Even random gesture authentication can be tricked with pre-recorded gestures that are played in response to random requests. The inventors have realized that there is a need for a solution that provides biometric identification coupled with randomized biometric liveness detection. According to one aspect, coupling a liveness factor into identity assurance and validation (e.g., with liveness with biometric identity) resolves problems with conventional security, closing security holes that allow replay or faked biometric signals. Further embodiments incorporate random liveness checks (e.g., with random biometric requests (e.g., voice identification coupled with identification of random words or syllables)) as part of a multi-factor authentication. According to one embodiment, imaging and facial recognition is executed in conjunction with random liveness testing of a separate biometric (e.g., voice identification with random word requests) to complete authentication. In further embodiments, privacy enabled biometrics (e.g., privacy enabled facial recognition and/or voice identification) can be used in conjunction with the liveness augmented authentication. In further embodiments, various authentication systems can incorporate fast enrollment authentication approaches (e.g., compare encrypted values for distance) coupled with neural networks trained on encrypted values (e.g., neural networks that subsequently accept encrypted input to return identification labels (or unknown as a result, wherein appropriate).

According to one aspect, an authentication system can test liveness and test biometric identity using fully encrypted reference biometrics. According to various embodiments, the system is configured to execute comparisons directly on the encrypted biometrics (e.g., encrypted feature vectors of the biometric or encrypted embeddings derived from unencrypted biometrics) to determine authenticity with a learning neural network. In further embodiments, a first neural network is used to process unencrypted biometric inputs and generate Euclidean measurable encrypted feature vectors or encrypted embeddings (e.g., distance measurable encrypted values—referred to as a generation network). The encrypted feature vectors are used to train a classification deep neural network. Multiple learning networks (e.g., deep neural networks—which can be referred to as classification networks) can be trained and used to predict matches on different types of biometric input (e.g., facial/feature biometrics, voice biometrics, health/biologic data biometrics, etc.). In some examples, multiple biometric types can be processed into an authentication system to increase accuracy of identification.

According to one embodiment, a set of encrypted feature vectors or encrypted embeddings can be derived from any biometric data (e.g., using a first pre-trained neural network), and then using a deep neural network ("DNN") on, for example, those one-way homomorphic encryptions (i.e., each biometrics' feature vector or each biometrics embedding values) a system can determine matches or execute searches on the encrypted data. Each of the biometrics encrypted feature vectors/embeddings can then be stored and/or used in conjunction with respective classifications for use in subsequent comparisons without fear of compromising the original biometric data. In various embodiments, any unencrypted or original biometric data is discarded responsive to generating the encrypted values.

According to one embodiment, the homomorphic encryption enables computations and comparisons on cypher text without decryption. This improves security over conventional approaches. Searching biometrics in the clear on any system, represents a significant security vulnerability. In various examples described herein, only the one-way encrypted biometric data is available on a given device. Various embodiments restrict execution to occur on encrypted biometrics for any matching or searching. In other embodiments, a first phase uses encrypted values to make distance comparisons and authenticate (or not) based on a threshold distance between encrypted values, and a second phase is executed to train a DNN on the encrypted values while the first phase handles authentication. Once ready, the DNN can take over authentication operation. In various implementations, the system can accept or enroll new users by triggering the first phase of operation while the second phase trains at least one DNN on the new authentication information (e.g., encrypted feature vectors).

According to another aspect, an authentication system can also analyze an assurance factor while processing biometric input to ensure that the biometric input is generated by the individual seeking authentication (i.e., not pre-recorded or faked biometric signaling). In some embodiments, the authentication system is configured to request randomly selected instances (e.g., system random selection) of a biometric input (e.g., randomly selected words). The system as part of one process can evaluate the received voice information to determine an identity match, while processing the received voice information to ensure that received voice information matches the randomly selected words. In various embodiments, the authentication system is able to validate that an identity match (e.g., neural network prediction of identity) was supplied at the time requested and by the entity trying to confirm their identity (i.e. liveness testing) based on matching the input to the requested random words. In further embodiment, the system and/or connected devices can collect biometric information of multiple types (e.g., facial features and voice, among other options) to increase accuracy of identity matching, which can be further augmented with liveness detection to prevent spoofing or fraud.

According to one aspect, a privacy-enabled biometric system is provided. The system comprises at least one processor operatively connected to a memory, the at least one processor configured to determine an authentication mode, trigger one or both of a first machine learning ("ML") process or a second ML process responsive to determining the authentication mode, execute the first ML process, wherein the first ML process when executed by the at least one processor is configured to accept distance measurable encrypted feature vector and label inputs during training of a first classification neural network and classify distance measurable encrypted feature vector inputs as part of authentication using the first classification network once trained, execute the second ML process, wherein the second ML process when executed by the at least one processor is configured to accept plain text biometric inputs during training of a generation neural network (e.g., creates encrypted feature vectors) to generate distance measurable encrypted feature vectors, and compare distances between distance measurable encrypted feature vectors during authentication.

According to one embodiment, one of the first ML process or the second ML process is configured to determine one or more distances between encrypted feature vectors produced by the generation neural network, exclude encrypted feature vectors having one or more distances exceeding a threshold distance for subsequent training processes, and include encrypted feature vectors having distances within the threshold distance for subsequent training processes. According to one embodiment, the at least one processor is configured to determine the authentication mode includes an enrollment mode for establishing a new entity for subsequent authentication. According to one embodiment, at least one processor is configured to trigger at least the second classification ML process responsive to determining a current authentication mode includes the enrollment mode. According to one embodiment, at least one processor is configured to trigger at least training operations of both the first and second classification ML processes responsive to determining that the current authentication mode includes the enrollment mode. According to one embodiment, at least one processor is configured to execute the at least part of the second classification process to authenticate the new user until at least a period of time required for training the first classification network expires. According to one embodiment, at least one processor is configured to execute the at least part of the first classification process to authenticate the new user responsive to completing training of the first classification network. According to one embodiment, the first classification network comprises a deep neural network ("DNN"), wherein the DNN is configured to generate an array of values in response to the input of the at least one unclassified encrypted feature vector during authentication, and determine a label or unknown result based on analyzing the generate array of values. According to one embodiment, determining the label or the unknown includes analyzing a position of values within the array and analyzing a respective value at a respective position. According to one embodiment, the embedding network comprises a learning network configured to accept plain text biometric as input and generate distance measurable encrypted feature vectors as output. According to one embodiment, the first classification network is configured to return a label for identification or an unknown result, responsive to input of encrypted feature vector input for authentication. According to one embodiment, at least one processor is configured to determine a probability of match using the first classification neural network is below a threshold value, and validate an unknown result output by the first classification network based on distance analysis of a highest probability match compared to the input feature vectors.

According to one aspect, a computer implemented method for privacy enabled authentication is provided. The method comprises determining, by at least one processor, an authentication mode, triggering, by the at least one processor, one or both of a first machine learning ("ML") process or a second ML process responsive to determining the authentication mode, executing, by the at least one processor, the first ML process, wherein executing the first ML process includes accepting distance measurable encrypted feature vector and label inputs during training of a first classification neural network and classifying distance measurable encrypted feature vector inputs as part of authentication using the first classification network once trained, executing, by the at least one processor, the second ML process, wherein executing the second ML process includes accepting plain text biometric inputs during training of a generation neural network (e.g., creates encrypted feature vectors) to generate distance measurable encrypted feature vectors, and comparing distances between distance measurable encrypted feature vectors during authentication.

According to one embodiment, the method further comprises determining one or more distances between encrypted feature vectors produced by the generation neural network, excluding encrypted feature vectors having one or more distances exceeding a threshold distance for subsequent training processes, and including encrypted feature vectors having distances within the threshold distance for subsequent training processes. According to one embodiment, the method further comprises determining the authentication mode includes an enrollment mode for establishing a new entity for subsequent authentication. According to one embodiment, the method further comprises triggering at least the second classification ML process responsive to determining a current authentication mode includes the enrollment mode. According to one embodiment, the method further comprises triggering at least training operations of both the first and second classification ML processes responsive to determining that the current authentication mode includes the enrollment mode. According to one embodiment, the method further comprises executing the at least part of the second classification process to authenticate the new user until at least a period of time required for training the first classification network expires. According to one embodiment, the method further comprises executing the at least part of the first classification process to authenticate the new user responsive to completing training of the first classification network. According to one embodiment, the method further comprises generating, by a deep learning neural network ("DNN") an array of values in response to the input of the at least one unclassified encrypted feature vector during authentication, and determining a label or unknown result based on analyzing the generate array of values. According to one embodiment, determining the label or the unknown includes analyzing a position of values within the array and analyzing a respective value at a respective position. According to one embodiment, the method further comprises accepting plain text biometric as input and generating distance measurable encrypted feature vectors as output. According to one embodiment, the method further comprises returning a label for identification or an unknown result, responsive to input of encrypted feature vector input for authentication. According to one embodiment, the method further comprises analyzing a user input set of instances of a first biometric data type, and validating an authentication request responsive to determining a match between the user input set of instances and a set of biometric instances randomly generated for the authentication request.

According to one aspect, an authentication system for evaluating privacy-enabled biometrics and validating contemporaneous input of biometrics is provided. The system comprises at least one processor operatively connected to a memory; an interface, executed by the at least one processor configured to: receive a candidate set of instances of a first biometric data type input by a user requesting authentication; a classification component executed by the at least one processor, configured to: analyze a liveness threshold, wherein analyzing the liveness threshold includes processing the candidate set of instances to determine that the candidate set of instances matches a random set of instances; the classification component further comprising at least a first deep neural network ("DNN"), the classification component configured to: accept encrypted feature vectors (e.g., voice feature vectors, etc.), generated from a first neural network, the first neural network configured to process an unencrypted input of the first data type into the encrypted feature vectors; classify with the first DNN the encrypted feature vectors of the first biometric type during training, based on training the first DNN with encrypted feature vector and label inputs; return a label for person identification or an unknown result during prediction responsive to analyzing encrypted feature vectors with the first DNN; and confirm authentication based at least on the label and the liveness threshold.

According to one embodiment, the classification component is configured to: determine for values above the liveness threshold that the input matches the random set of instances; and determine for values below the threshold that a current authentication request is invalid. According to one embodiment, the system further comprises a liveness component, executed by the at least one processor, configured to generate a random set of instances of a first biometric type in response to an authentication request. According to one embodiment, the system is configured to request a user provide the candidate set of instances of the first biometric data type based on the generated random set of instances. According to one embodiment, the interface is configured to prompt user input of the randomly selected instances of the first biometric input to establish a threshold volume of biometric information confirmed at validation.

According to one embodiment, the classification component further comprises at least a second deep neural network ("DNN") configured to: accept encrypted feature vectors (e.g., face feature vectors, etc.), generated from a second neural network, the second neural network configured to process an unencrypted input of the second data type into the encrypted feature vectors; return a label for person identification or an unknown result during prediction responsive to analyzing encrypted feature vectors; and wherein the classification component is configured to confirm identification based on matching the label for person identification from the first and second DNNs.

According to one embodiment, the second DNN is configured to classify the encrypted feature vectors of the second biometric type during training, based on training the second DNN with encrypted feature vector and label inputs. According to one embodiment, the system further comprises the first neural network configured to process an unencrypted input of the first data type into the encrypted feature vectors. According to one embodiment, the system further comprises a pre-processing component configured to reduce a volume of unencrypted input biometric information for input into the first neural network. According to one embodiment, the classification component is configured to incrementally update the first DNN with new person labels and new persons feature vectors, based on updating null or undefined elements defined in the first DNN at training, and maintaining the network architecture and accommodating the unknown result for subsequent predictions without requiring full retraining of the first DNN. According to one embodiment, the system is configured to analyze the output values from the first DNN and based on positioning of the output values in an array and the values in those positions, determine the label or unknown.

According to one aspect, a computer implemented method or evaluating privacy-enabled biometrics and validating contemporaneous input of biometrics is provided. The method comprises: receiving, by at least one processor, a candidate set of instances of a first biometric data type input by a user requesting authentication; analyzing, by the at least on processor, a liveness threshold, wherein analyzing the liveness threshold includes processing the candidate set of instances to determine that the candidate set of instances matches a random set of instances; accepting, by a first deep neural network ("DNN") executed by the at least one processor, encrypted feature vectors (e.g., voice feature vectors, etc.), generated from a first neural network, the first neural network configured to process an unencrypted input of the first data type into the encrypted feature vectors; classifying, by the first DNN, the encrypted feature vectors of the first biometric type during training, based on training the first DNN with encrypted feature vector and label inputs; returning, by the first DNN, a label for person identification or an unknown result during prediction responsive to analyzing encrypted feature vectors; and confirming authentication based at least on the label and the liveness threshold.

According to one embodiment, the method further comprises: determining for values above the liveness threshold that the input matches the random set of instances; and determining for values below the threshold that a current authentication request is invalid. According to one embodiment, the method further comprises generating a random set of instances of a first biometric type in response to an authentication request. According to one embodiment, the method further comprises requesting a user provide the candidate set of instances of the first biometric data type based on the generated random set of instances.

According to one embodiment, the method further comprises prompting user input of the randomly selected instances of the first biometric input to establish a threshold volume of biometric information confirmed at validation. According to one embodiment, the method further comprises: accepting, by at least a second deep neural network, encrypted feature vectors (e.g., face feature vectors, etc.), generated from a second neural network, the second neural network configured to process an unencrypted input of the second data type into the encrypted feature vectors; returning, by the second DNN a label for person identification or an unknown result during prediction responsive to analyzing encrypted feature vectors; and confirming identification based on matching the label for person identification from the first and second DNNs.

According to one embodiment, the second DNN is configured to classify the encrypted feature vectors of the second biometric type during training, based on training the second DNN with encrypted feature vector and label inputs. According to one embodiment, the method further comprises processing, by the first neural network, an unencrypted input of the first data type into the encrypted feature vectors. According to one embodiment, the method further comprises incrementally updating the first DNN with new person labels and new persons feature vectors, based on updating null or undefined elements established in the first DNN at training, and maintaining the architecture of the first DNN and accommodating the unknown result for subsequent predictions without requiring full retraining of the first DNN.

According to one aspect, an authentication system for evaluating privacy-enabled biometrics and contemporaneous input of biometrics for processing is provided. The system comprises at least one processor operatively connected to a memory, the at least one processor configured to generate in response to an authentication request, a random set of instances of a first biometric input of a first biometric data type (e.g., random words), an interface, executed by the at least one processor configured to: receive a candidate set of instances of a first biometric data type input by a user requesting authentication, for example, wherein the interface is configured to prompt a user to submit the first biometric input according to the randomly selected set of instances (e.g., display random words); a classification component executed by the at least one processor, configured to:

analyze a liveness threshold; determine for values above the liveness threshold that the user is submitting the biometric information concurrent with or responsive to the authentication request; determine for values below the threshold that a current authentication request is unacceptable (e.g., invalid or incorrect, etc.), wherein analyzing the liveness threshold includes processing the candidate set of instances to determine a confidence value that the candidate set of instances matches the random set of instances generated by the at least one processor; the classification component further comprising at least a first deep neural network ("DNN"), the classification component configured to: accept encrypted embeddings (e.g., feature vectors) generated with a first neural network ("NN") for processing the first data type of an unencrypted biometric input (e.g., pre-trained NN to classify the biometric input (e.g., your custom trained NN for voice, etc.)); classify embeddings (e.g., feature vectors) of the first type and label inputs during training based on processing the encrypted embeddings (e.g., feature vectors) obtained from the first neural network using the first DNN, return a label for person identification or an unknown result during prediction responsive to processing the encrypted embeddings from the candidate set of instances of the first biometric with the first DNN; and confirm authentication based on the person identification and the liveness threshold.

According to one embodiment, the system further comprises a feature vector generation component comprising a pre-trained neural network configured to generate Euclidean measurable encrypted feature vectors as an output of a least one layer in the neural network responsive to input of an unencrypted biometric input.

According to one aspect, an authentication system for evaluating privacy-enabled biometrics and liveness, the system comprising: at least one processor operatively connected to a memory; an interface configured to: accept a first biometric input associated with a first biometric data type (e.g., video or imaging); accept a second biometric input associated with a second biometric type, wherein the interface is configured to prompt a user to provide the second biometric input according to randomly selected instances of the second biometric input (e.g., the second biometric input providing voice and the randomly selected instances providing liveness); a classification component executed by the at least one processor, comprising at least a first and second deep neural network ("DNN"), the classification component configured to: accept encrypted feature vectors generated with a first classification neural network for processing a first type of an unencrypted biometric (e.g., pre-trained NN to classify the biometric input (e.g., FACENET, etc.)); accept encrypted feature vectors generated with a second classification neural network for processing a second type of an unencrypted biometric (e.g., custom pre-trained NN to classify voice identity—i.e. generate Euclidean measurable feature vectors); classify feature vector of the first type and label inputs during training based on processing the encrypted feature vectors from the first classification neural network using the first DNN, and return a label for person identification or an unknown result during prediction responsive to processing an unclassified encrypted biometric input of the first type with the first DNN; classify feature vector of the second type and label inputs during training based on processing the encrypted feature vectors from the second classification neural network using the second DNN, and return a label for person identification or an unknown result during prediction responsive to processing an unclassified encrypted biometric input of the second type with the second DNN; analyze an assurance factor derived from the randomly selected instances of the second biometric input, to determine that the input biometric information matches the randomly selected instances of the second biometric input, and to determine the input of the first and second biometric is contemporaneous with the authentication request; and confirm authentication based on the person identification resulting from the prediction executed by the first and second DNN and the assurance factor.

According to another aspect, encrypted search can be executed on the system in polynomial time, even in a one to many use case. This feature enables scalability that conventional systems cannot perform and enables security/privacy unavailable in many conventional approaches.

According to one aspect a privacy-enabled biometric system is provided. The system comprises at least one processor operatively connected to a memory; a classification component executed by the at least one processor, comprising a classification network having a deep neural network ("DNN") configured to classify feature vector inputs during training and return a label for person identification or an unknown result during prediction; and the classification component is further configured to accept as an input feature vectors that are Euclidean measurable and return the unknown result or the label as output.

According to one embodiment, a set of biometric feature vectors is used for training in the DNN neural network for subsequent prediction. According to one embodiment, biometrics are morphed a finite number of times to create additional biometrics for training of the second (classification) neural network. The second neural network is loaded with the label and a finite number of feature vectors based on an input biometric. According to one embodiment, the classification component is configured to accept or extract from another neural network Euclidean measurable feature vectors. According to one embodiment, the another neural network comprises a pre-trained neural network. According to one embodiment, this network takes in a plaintext biometric and returns a Euclidean measurable feature vector that represents a one-way encrypted biometric. According to one embodiment, the classification neural network comprises a classification based deep neural network configured for dynamic training with label and feature vector input pairs to training. According to one embodiment, a feature vector is input for prediction.

According to one embodiment, the system further comprises a preprocessing component configured to validate plaintext biometric input. According to one embodiment, only valid images are used for subsequent training after the preprocessing. According to one embodiment, the classification component is configured with a plurality of modes of execution, including an enrollment mode configured to accept, as input, a label and feature vectors on which to train the classification network for subsequent prediction. According to one embodiment, the classification component is configured to predict a match, based on a feature vector as input, to an existing label or to return an unknown result. According to one embodiment, the classification component is configured to incrementally update an existing model, maintaining the network architecture (e.g., weighting values, loss function values, etc.) and accommodating the unknown result for subsequent predictions. In various embodiments, incremental updating the existing model avoids re-training operations that conventional approaches require. According to one embodiment, the system is configured to analyze the output values and based on their position and the values, determine the label or unknown.

According to one embodiment, the classification network further comprises an input layer for accepting feature vectors of a number of dimensions, the input layer having a number of classes at least equal to the number of dimensions of the feature vector input, first and a second hidden layers, and an output layer that generates an array of values. According to one embodiment, the fully connected neural network further comprises an input layer for accepting feature vectors of a number of dimensions, the input layer having a number of nodes at least equal to the number of dimensions of the feature vector input, a first hidden layer of at least 500 dimensions, a second hidden layer of at least twice the number of input dimensions, and an output layer that generates an array of values—that based on their position in the array and the values at respective positions, determine the label or an unknown. According to one embodiment, a set of biometric feature vectors is used for training the DNN neural network for subsequent prediction.

According to one aspect a computer implemented method for executing privacy-enabled biometric training is provided. The method comprises instantiating, by at least one processor, a classification component comprising classification network having a deep neural network ("DNN") configured to classify feature vector inputs during training and return a label for person identification or an unknown result during prediction; accepting, by the classification component, as an input feature vectors that are Euclidean measurable and a label for training the classification network; and Euclidean measurable feature vectors for prediction functions with the classification network; and classifying, by a classification component executed on at least one processor, the feature vector inputs and the label during training.

According to one embodiment, the method further comprises accepting or extracting, by the classification component, from another neural network the Euclidean measurable feature vectors. According to one embodiment, the another neural network comprises a pre-trained neural network. According to one embodiment, the classification neural network comprises a classification based deep neural network configured for dynamic training with label and feature vector input pairs. According to one embodiment, the method further comprises an act of validating input biometrics used to generate a feature vector. According to one embodiment, the method further comprises an act of triggering a respective one of a plurality of modes of operation, including an enrollment mode configured to accept a label and feature vectors for an individual. According to one embodiment, the method further comprises an act of predicting a match to an existing label or returning an unknown result responsive to accepting a biometric feature vector as input.

According to one embodiment, method further comprises an act of updating the classification network with respective vectors for use in subsequent predictions. To handle the case of a person's looks changing over time, the input for prediction, may be used to re-train the individual. According to one embodiment, the method further comprises an act of updating, incrementally, an existing node in the classification network and maintaining the network architecture to accommodate the feature vector for subsequent predictions. According to one embodiment, the classification network further comprises an input layer for accepting feature vectors of a number of dimensions, the input layer having a number of nodes at least equal to the number of dimensions of the feature vector input, a first and second hidden layer and an output layer that generates an array of values.

According to one aspect a non-transitory computer readable medium containing instructions when executed by at least one processor cause a computer system to execute a method for executing privacy-enabled biometric analysis, the method is provided. A method comprises an instantiating, a classification component comprising a classification network having a deep neural network ("DNN") configured to classify feature vector and label inputs during training and return a label for person identification or an unknown result during prediction; accepting, by the classification component, as an input feature vectors that are Euclidean measurable as an input and a label for training the classification network, and Euclidean measurable feature vectors for prediction functions with the classification network; and classifying, by a classification component executed on at least one processor, the feature vector inputs and the label during training.

According to one embodiment, the method further comprises an act of accepting or extracting, by the classification component, from another neural network Euclidean measurable feature vectors. According to one embodiment, the another neural network comprises a pre-trained neural network. According to various embodiments, the computer readable medium contains instructions to perform any of the method steps above, individually, in combination, or in any combination.

According to one aspect a privacy-enabled biometric system is provided. The system comprises a classification means comprising a classifying deep neural network ("DNN") executed by at least one processor the FCNN configured to: classify feature vector inputs and return a label for person identification or an unknown result as a prediction; and accept as an input, feature vectors that are Euclidean measurable and a label as an instance of training.

According to one aspect, a privacy-enabled biometric system is provided. The system comprises at least one processor operatively connected to a memory; a classification component executed by the at least one processor, including a classification network having a deep neural network ("DNN") configured to classify feature vector inputs during training and return a label for person identification or an unknown result during prediction, wherein the classification component is further configured to accept as an input feature vectors that are Euclidean measurable; a feature vector generation component comprising a pre-trained neural network configured to generate Euclidean measurable feature vectors as an output of a least one layer in the neural network responsive to input of an unencrypted biometric input.

According to one embodiment, the classification component is further configured to accept one way homomorphic, Euclidean measurable vectors, and labels for person identification as input for training. According to one embodiment, the classification component is configured to accept or extract from the pre-trained neural network the feature vectors. According to one embodiment, the pre-trained neural network includes an output generation layer which provides Euclidean measurable feature vectors. According to one embodiment, the classification network comprises a deep neural network suitable for training and, for prediction, output of a list of values allowing the selection of labels or unknown as output. According to one embodiment, the pre-trained network generates feature vectors on a first biometric type (e.g., image, voice, health data, iris, etc.); and the classification component is further configured to accept feature vectors from another neural network that generates Euclidean measurable feature vectors on another biometric type.

According to one embodiment, the system is configured to instantiate multiple classification networks each associated with at least one different biometric type relative to another classification network, and classify input feature vectors based on executing at least a first or second classification network. According to one embodiment, the system is configured to execute a voting procedure to increase accuracy of identification based, for example, on multiple biometric inputs or multiple types of biometric input. According to one embodiment, the system is configured to maintain at least an executing copy of the classifying network and an updatable copy of classification network that can be locked or put in an offline state to enable retraining operations while the executing copy of the classifying network handles any classification requests. According to one embodiment, the classification component is configured with a plurality of modes of execution, including an enrollment mode configured to accept a label for identification and the input feature vectors for an individual from the feature vector generation component.

According to one embodiment, the classification component is configured to predict a match to an existing label or to return an unknown result based on feature vectors enrolled in the classification network. According to one embodiment, the classification component is configured to incrementally update an existing node in the neural network maintaining the network architecture and accommodating the unknown result for subsequent predictions. According to one embodiment, the classification network further comprises an input layer for accepting feature vectors of a number of dimensions, the input layer having a number of nodes at least equal to the number of dimensions of the feature vector input, a first hidden layer, a second hidden layer, and an output layer that generates hat generates an array of values that based on their position and the values, determine the label or unknown. According to one embodiment, the classification network further comprises a plurality of layers including two hidden layers and an output layer having a number of nodes at least equal to the number of dimensions of the feature vector input.

According to one aspect a computer implemented method for executing privacy-enabled biometric analysis, the method is provided. The method further comprises instantiating, by at least one processor, a classification component comprising a deep neural network ("DNN") configured to classify feature vector inputs during training and return a label for person identification or an unknown result during prediction, and a feature vector generation component comprising a pre-trained neural network; generating, by the feature vector generation component Euclidean measurable feature vectors as an output of a least one layer in the pre-trained neural network responsive to input of an unencrypted biometric input; accepting, by the classification component, as an input feature vectors that are Euclidean measurable generated by the feature vector generation component and a label for training the classification network, and Euclidean measurable feature vectors for prediction functions with the classification network; and classifying, by a classification component executed on at least one processor, the feature vector inputs and the label during training.

According to one embodiment, the method further comprises accepting or extracting, by the classification network the Euclidean measurable feature vectors from the pre-trained neural network. According to one embodiment, the second neural network comprises a pre-trained neural network. According to one embodiment, the method further comprises an act of validating input feature vectors as Euclidean measurable. According to one embodiment, the method further comprises generating, by the classification component feature vectors on a first biometric type (e.g., image, voice, health data, iris, etc.); and accepting, by the classification component, feature vectors from another neural network that generates Euclidean measurable feature vectors on a second biometric type.

According to one embodiment, method further comprises: instantiating multiple classification networks each associated with at least one different biometric type relative to another classification network, and classifying input feature vectors based on applying at least a first or second classification network. According to one embodiment, the method further comprises executing a voting procedure to increase accuracy of identification based on multiple biometric inputs or multiple types of biometric input and respective classifications. According to one embodiment, for a biometric to be considered a match, it must receive a plurality of votes based on a plurality of biometrics. According to one embodiment, the method further comprises instantiating multiple copies of the classification network to enable at least an executing copy of the classification network, and an updatable classification network that can be locked or put in an offline state to enable retraining operations while the executing copy of the classification network handles any classification requests. According to one embodiment, the method further comprises predicting a match to an existing label or to return an unknown result based, at least in part, on feature vectors enrolled in the classification network. According to one embodiment, the method further comprises updating, incrementally, an existing model in the classification network maintaining the network architecture and accommodating the unknown result for subsequent predictions.

According to one aspect a non-transitory computer readable medium containing instructions when executed by at least one processor cause a computer system to execute a method for executing privacy-enabled biometric analysis, the method is provided. The method comprises instantiating a classification component comprising a deep neural network ("DNN") configured to classify feature vector and label inputs during training and return a label for person identification or an unknown result during prediction, and a feature vector generation component comprising a pre-trained neural network; generating, by the feature vector generation component Euclidean measurable feature vectors as an output of a least one layer in the pre-trained neural network responsive to input of an unencrypted biometric input; accepting, by the classification component, as an input feature vectors that are Euclidean measurable generated by the feature vector generation component and a label for training the classification network, and Euclidean measurable feature vectors for prediction functions with the classification network; and classifying, by a classification component executed on at least one processor, the feature vector inputs and the label during training. According to various embodiments, the computer readable medium contains instructions to perform any of the method steps above, individually, in combination, or in any combination.

According to one aspect a privacy-enabled biometric system is provided. The system comprises a feature vector generation means comprising a pre-trained neural network configured to generate Euclidean measurable feature vectors responsive to an unencrypted biometric input; a classification means comprising a deep neural network ("DNN")

configured to: classify feature vector and label inputs and return a label for person identification or an unknown result for training; and accept feature vectors that are Euclidean measurable as inputs and return a label for person identification or an unknown result for prediction.

According to one aspect a privacy-enabled biometric system is provided. The system comprises at least one processor operatively connected to a memory; a classification component executed by the at least one processor, including a classification network having a deep neural network ("DNN") configured to classify feature vector and label inputs during training and return a label for person identification or an unknown result during prediction, wherein the classification component is further configured to accept as an input feature vectors that are Euclidean measurable; the classification network having an architecture comprising a plurality of layers: at least one layer comprising nodes associated with feature vectors, the at least one layer having an initial number of identification nodes and a subset of the identification nodes that are unassigned; the system responsive to input of biometric information for a new user is configured to trigger an incremental training operation for the classification network integrating the new biometric information into a respective one of the unallocated identification nodes usable for subsequent matching.

According to one embodiment, the system is configured to monitor allocation of the unallocated identification nodes and trigger a full retraining of the classification network responsive to assignment of the subset of unallocated nodes. According to one embodiment, the system is configured to execute a full retraining of the classification network to include additional unallocated identification nodes for subsequent incremental retraining of the DNN. According to one embodiment, the system iteratively fully retrains the classification network upon depletion of unallocated identification nodes with additional unallocated nodes for subsequent incremental training. According to one embodiment, the system is further configured to monitor matching of new biometric information to existing identification nodes in the classification network.

According to one embodiment, the system is further configured trigger integration of new biometric information into existing identification nodes responsive to exceeding a threshold associated with matching new biometric information. According to one embodiment, the pre-trained network is further configured to generate one way homomorphic, Euclidean measurable, feature vectors for the individual. According to one embodiment, the classification component is further configured to return a set of probabilities for matching a set of existing labels. According to one embodiment, the classification component is further configured to predict an outcome based on a trained model, a set of inputs for the prediction and a result of a class or unknown (all returned values dictating UNKNOWN).

According to one embodiment, the classification component is further configured to accept the feature vector inputs from a neural network model that generates Euclidean measurable feature vectors. According to one embodiment, the classification component is further configured to extract the feature vectors from the neural network model from layers in the model. According to one embodiment, the system further comprising a feature vector component executed by the at least one processor comprising a neural network. According to one embodiment, the feature vector component is configured to extract the feature vectors during execution of the neural network from layers. According to one embodiment, the neural network comprises of a set of layers wherein one layer outputs Euclidean Measurable Feature Vectors. According to one embodiment, the system further comprising a retraining component configured to monitor a number of new input feature vectors or matches of new biometric information to a label and trigger retraining by the classification component on the new biometric information for the label. This can be additional training on a person, using predict biometrics, that continues training as a biometric changes over time. The system may be configured to do this based on a certain number of consecutive predictions or may do it chronologically, say once every six months.

According to one embodiment, the classification component is configured to retrain the neural network on addition of new feature vectors. According to one embodiment, the neural network is initially trained with unallocated people classifications, and the classification component is further configured to incrementally retrain the neural network to accommodate new people using the unallocated classifications. According to one embodiment, the system further comprises a retraining component configured to: monitor a number of incremental retraining; trigger the classifier component to fully retrain the neural network responsive to allocation of the unallocated classifications. According to one embodiment, the classification component is configured to fully retrain the neural network to incorporate unallocated people classifications, and incrementally retrain for new people using the unallocated classifications. According to one embodiment, the classification component further comprises multiple neural networks for processing respective types of biometric information. According to one embodiment, the classification component is further configured to generate an identity of a person responsive to at least two probable biometric indicators that may be used simultaneously or as part of a "voting" algorithm.

According to one aspect a computer implemented method for privacy-enabled biometric analysis is provided. The method comprises instantiating, by at least one processor, a classification component comprising a classification network having a deep neural network ("DNN") configured to classify feature vector and label inputs during training and return a label for person identification or an unknown result during prediction, and wherein the classification component is further configured to accept as an input feature vectors that are Euclidean measurable and return the unknown result or the label as output; instantiating the classification component includes an act of allocating within at least one layer of the classification network, an initial number of classes and having a subset of the class slots that are unassigned; triggering responsive to input of biometric information for a new user incremental training operation for the classification network integrating the new biometric information into a respective one of the unallocated class slots usable for subsequent matching.

According to one embodiment, the method further comprises acts of accepting, by the classification component, as an input feature vectors that are Euclidean measurable generated by a feature vector generation component; classifying, by the classification component executed on at least one processor, the feature vector inputs; and returning, by the classification component, a label for person identification or an unknown result. According to one embodiment, the method further comprises acts of instantiating a feature vector generation component comprising a pre-trained neural network; and generating, by the feature vector generation component Euclidean measurable feature vectors as an output of a least one layer in the pre-trained neural network responsive to input of an unencrypted biometric input. According to one embodiment, the method further comprises an act of monitoring, by the at least one processor, allocation of the unallocated identification classes and triggering an incremental retraining of the classification network responsive to assignment of the subset of unallocated nodes to provide additional unallocated classes.

According to one embodiment, the method further comprises an act of monitoring, by the at least one processor, allocation of the unallocated identification nodes and triggering a full retraining or incremental of the classification network responsive to assignment of the subset of unallocated nodes. According to one embodiment, the method further comprises an act of executing a full retraining of the classification network to include additional unallocated classes for subsequent incremental retraining of the DNN. According to one embodiment, the method further comprises an act of fully retraining the classification network iteratively upon depletion of unallocated identification nodes, the full retraining including an act of allocating additional unallocated nodes for subsequent incremental training. According to one embodiment, the method further comprises an act of monitoring matching of new biometric information to existing identification nodes. According to one embodiment, the method further comprises an act of triggering integration of new biometric information into existing identification nodes responsive to exceeding a threshold associated with matching new biometric information. According to one embodiment, the method further comprises an act of generating one way homomorphic, Euclidean measurable, labels for person identification responsive to input of Euclidean measurable feature vectors for the individual by the classification component.

According to one aspect a non-transitory computer readable medium containing instructions when executed by at least one processor cause a computer system to execute a method instantiating a classification component comprising a classification network having a deep neural network ("DNN") configured to classify feature vector and label inputs during training and return a label for person identification or an unknown result during prediction, and wherein the classification component is further configured to accept as an input feature vectors that are Euclidean measurable and return the unknown result or the label as output; instantiating the classification component includes an act of allocating within at least one layer of the classification network, an initial number of classes and having a subset of additional classes that are unassigned; triggering responsive to input of biometric information for a new user incremental training operation for the classification network integrating the new biometric information into a respective one of the unallocated identification nodes usable for subsequent matching. According to various embodiments, the computer readable medium contains instructions to perform any of the method steps above, individually, in combination, or in any combination.

According to one aspect a privacy-enabled biometric system is provided. The system comprises at least one processor operatively connected to a memory; a classification component executed by the at least one processor, comprising classification network having a deep neural network configured to classify Euclidean measurable feature vectors and label inputs for person identification during training, and accept as an input feature vectors that are Euclidean measurable and return an unknown result or the label as output; and an enrollment interface configured to accept biometric information and trigger the classification component to integrate the biometric information into the classification network.

According to one embodiment, the enrollment interface is accessible via uri, and is configured to accept unencrypted biometric information and personally identifiable information ("PII"). According to one embodiment, the enrollment interface is configured to link the PII to a one way homomorphic encryption of an unencrypted biometric input. According to one embodiment, the enrollment interface is configured to trigger deletion of the unencrypted biometric information. According to one embodiment, the system is further configured to enroll an individual for biometric authentication; and the classification component is further configured to accept input of Euclidean measurable feature vectors for person identification during prediction. According to one embodiment, the classification component is further configured to return a set of probabilities for matching a feature vector. According to one embodiment, the classification component is further configured to predict an outcome based on a trained model, a set of inputs for the prediction and a result of a class (persons) or UNKNOWN (all returned values dictating UNKNOWN).

According to one embodiment, the system further comprises an interface configured to accept a biometric input and return and indication of known or unknown to a requesting entity. According to one embodiment, requesting entity includes any one or more of: an application, a mobile application, a local process, a remote process, a method, and a business object. According to one embodiment, the classification component further comprising multiple classification networks for processing different types of biometric information. According to one embodiment, the classification component is further configured to match an identity of a person responsive to at least two probable biometric indicators that may be used simultaneously or as part of a voting algorithm. According to one embodiment, the classification network further comprises an input layer for accepting feature vectors of a number of dimensions, the input layer having a number of classes at least equal to the number of dimensions of the feature vector input, a first and second hidden layer, and an output layer that generates an array of values.

According to one aspect a computer implemented method for privacy-enabled biometric analysis, the method is provided. The method comprises instantiating, by at least one processor, a classification component comprising a full deep neural network configured to classify feature vectors that are Euclidean measurable and a label inputs for person identification during training, and accept as an input feature vectors that are Euclidean measurable and return an unknown result or the label as output during prediction, and an enrollment interface; accepting, by the enrollment interface, biometric information associated with a new individual; triggering the classification component to train the classification network on feature vectors derived from the biometric information and a label for subsequent identification; and return the label through for subsequent identification.

According to one embodiment, an instantiating the enrollment interface included hosting a portal accessible via uri, and the method includes accepting biometric information and personally identifiable information ("PII") through the portal. According to one embodiment, the method further comprises linking the PII to a one way homomorphic encryption of an unencrypted biometric input. According to one embodiment, the method further comprises triggering deletion of unencrypted biometric information on a submitting device. According to one embodiment, method further comprises enrolling individuals for biometric authentication; and mapping labels and respective feature vectors for person identification, responsive to input of Euclidean measurable feature vectors and a label for the individual. According to one embodiment, the method further comprises returning a set of probabilities for matching a set of existing labels.

According to one embodiment, the method further comprises predicting an outcome based on a trained model, a set of inputs for the prediction and a result of a class (e.g., persons) or unknown (e.g., all returned values dictating UNKNOWN). According to one embodiment, the method further comprises accepting via an authentication interface a biometric input and returning and indication of known or unknown to a requesting entity. According to one embodiment, the requesting entity includes any one or more of: an application, a mobile application, a local process, a remote process, a method, and a business object. According to one embodiment, the method further comprises processing different types of biometric information using multiple classification networks. According to one embodiment, the method further comprises generating an identity of a person responsive to at least two probable biometric indicators that may be used simultaneously or as part of a voting algorithm.

According to one embodiment, the classification network further comprises an input layer for accepting feature vectors of a number of dimensions, the input layer having a number of classes at least equal to the number of dimensions of the feature vector input, a second hidden layer of at least twice the number of input dimensions, and an output layer that generates an array of values. According to one embodiment, the fully connected neural network further comprises an input layer for accepting feature vectors of a number of dimensions, the input layer having a number of nodes at least equal to the number of dimensions of the feature vector input, a first hidden layer of at least 500 dimensions, a second hidden layer of at least twice the number of input dimensions, and an output layer that generates an array of values that based on their position and the values, determine the label or unknown.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 4A-D are a diagrams of embodiments of a fully connected neural network for classification;

FIG. 5A-D illustrate example processing steps and example outputs during identification, according to one embodiment;

FIG. 8A-B is a table showing comparative considerations of example implementation, according to various embodiments;

DETAILED DESCRIPTION

Figure 1:
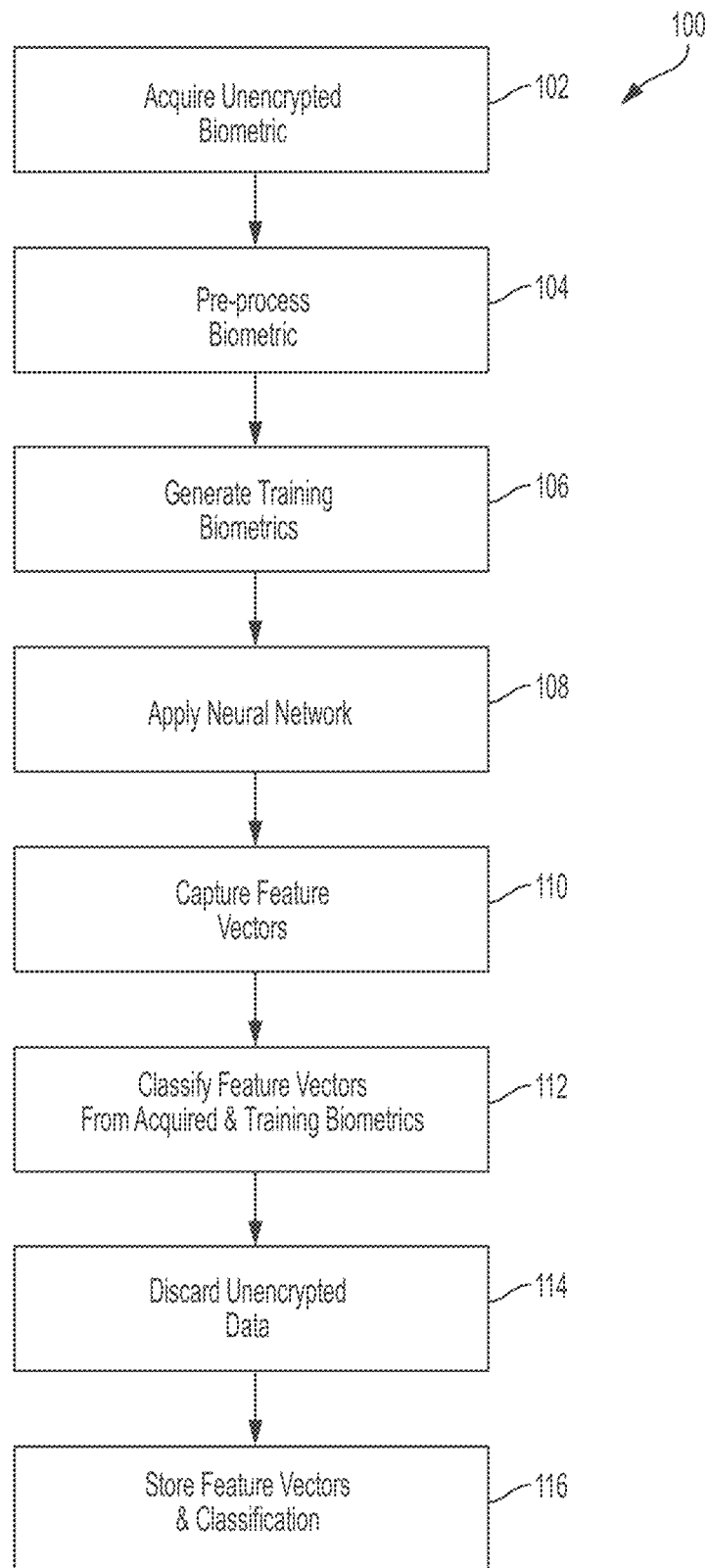
FIG. 1 is an example process flow for classifying biometric information, according to one embodiment.

Various embodiments of a privacy-enabled biometric system are configured to enable encrypted authentication procedures in conjunction with biometric information. The handling of biometric information includes capture of unencrypted biometrics that are used to generate encrypted forms (e.g., encrypted feature vectors via a generation neural network). The system uses the encrypted forms for subsequent processing, and in various embodiments discards any unencrypted version of the biometric data—thus providing a fully private authentication system. For example, the system can provide for scanning of multiple encrypted biometrics (e.g., one to many prediction) to determine authentication (e.g., based on matches or closeness). Further embodiments can provide for search and matching across multiple types of encrypted biometric information (e.g., based on respective neural networks configured to process certain biometric information) improving accuracy of validation over many conventional approaches, while improving the security over the same approaches.

According to one aspect, a private authentication system can invoke multi-phase authentication methodologies. In a first phase of enrollment, users' unencrypted biometric information is converted to encrypted form. According to various embodiments, the users unencrypted biometric data is input into neural networks configured to process the respective biometric input (e.g., voice, face, image, health data, retinal scan, fingerprint scan, etc.). In various embodiments, the generation neural networks are configured to generate one way encryptions of the biometric data. The output(s) of the neural network(s) (or, for example, intermediate values created by the generation neural networks) can be distance measurable encryptions of the biometric information which are stored for later comparison.

For a given user, the generated encrypted values can now be used for subsequent authentication. For example, the system can compare a newly created encrypted feature vector to the encrypted feature vectors stored on the system. If the distance between the encrypted values is within a threshold, the user is deemed authenticated or more generally, that a valid match results.

In a second phase of operation, the enrollment process uses the generated encrypted biometrics (e.g., distance measurable encrypted feature vectors) to train a second neural network (e.g., a deep neural network or fully connected neural network—described in greater detail below). The second neural network accepts as input encrypted feature vectors (e.g., distance measurable feature vectors, Euclidean measurable feature vectors, homomorphic encrypted feature vectors, etc.) and label inputs during training. Once trained the second neural network (e.g., encrypted classification network) accepts encrypted feature vectors and returns identification labels (or, for example, an unknown result). According to various embodiments, the phases of operation are complimentary and can be used sequentially, alternatively, or simultaneously, among other options. For example, the first phase can be used to prime the second phase for operation, and can do so repeatedly. Thus, a first enrollment may use the first phase to generate encrypted feature vectors for training a first DNN of the second phase. Once ready the first DNN can be used for subsequent authentication. In another example, the system can accept new users or enrolled additional authentication information, which triggers the first phase again to generate encrypted feature vectors. This can occur while the first DNN continues to execute its authentication functions.

A second DNN can be trained on the new authentication information, and may also be trained on the old authentication information of the first DNN. For example, the system can use the first DNN to handle older users, and the second DNN to handle newer users. In another example, the system can switch over to the second DNN trained on the collective body of authentication information (e.g., encrypted feature vectors). Various embodiments use different transition protocols between and amongst the first and second phases of authentication. For example, the system can invoke multiple threads one for each authentication type (e.g., fast or deep learning), and may further invoke multiple threads within each authentication type.

Thus in some embodiments, a distance metric store can be used in an initial enrollment phase to permit quick establishment of user authentication credentials so that a more sophisticated authentication approach can be trained in the background (e.g., a DNN can be trained on encrypted feature vectors (e.g., Euclidean measurable feature vectors, distance measurable feature vectors, homomorphic encrypted feature vectors, etc.) and identification labels, so that upon input of an encrypted feature vector the DNN can return an identification label (or unknown result, where applicable)). The authentication system can also be configured to integrate liveness testing protocols to ensure that biometric information is being validly submitted (e.g., and not spoofed).

According to some embodiments, the system is also configured to provide one to many search and/or matching on encrypted biometrics in polynomial time. According to one embodiment, the system takes input biometrics and transforms the input biometrics into feature vectors (e.g., a list of floating point numbers (e.g., 64, 128, 256, or within a range of at least 64 and 10240, although some embodiments can use more feature vectors)). According to various embodiments, the number of floating point numbers in each list depends on the machine learning model being employed to process input encrypted biometric information. For example, the known FACENET model by GOOGLE generates a feature vector list of 128 floating point numbers, but other embodiments use models with different feature vectors and, for example, lists of floating point numbers.

According to various embodiments, the biometrics processing model (e.g., a deep learning convolution network (e.g., for images and/or faces)) is configured such that each feature vector is Euclidean measurable when output. In one example, the input (e.g., the biometric) to the model can be encrypted using a neural network to output a homomorphic encrypted value.

In another example, the inventors have created a first neural network for processing plain or unencrypted voice input. The voice neural network is used to accept unencrypted voice input and to generate embeddings or feature vectors that are encrypted and Euclidean measurable for use in training another neural network. In various embodiments, the first voice neural network generates encrypted embeddings that are used to train a second neural network, that once trained can generate predictions on further voice input (e.g., match or unknown). In one example, the second neural network (e.g., a deep neural network—DNN) is trained to process unclassified voice inputs for authentication (e.g., predicting a match). In some embodiments, the feature vectors generated for voice can be a list of 64 floating point numbers, but similar ranges of floating points numbers to the FACENET implementations (discussed in greater detail below) can also be used (e.g., 32 floating point numbers up to 10240 floating point numbers, among other options).

According to one aspect, by executing on embedding or feature vectors that are encrypted and Euclidean measurable the system produces and operates in a privacy preserving manner. These encryptions (e.g., one way homomorphic encryptions) can be used in encrypted operations (e.g., addition, multiplication, comparison, etc.) without knowing the underlying plaintext value. Thus, the original or input biometric can simply be discarded, and does not represent a point of failure for security thereafter. In further aspects, implementing one way encryptions eliminates the need for encryption keys that can likewise be compromised. This is a failing of many convention systems.

According to various aspects, the privacy enabled with encrypted biometrics can be further augmented with liveness detection to prevent faked or spoofed biometric credentials from being used. According to some embodiments, the system can analyze an assurance factor derived from randomly selected instances (e.g., selected by the system) of a biometric input, to determine that input biometric information matches the set of randomly selected instances of the biometric input. The assurance factor and respective execution can be referred to as a "liveness" test. According to various embodiments, the authentication system can validate the input of biometric information for identity and provide assurance the biometric information was not faked via liveness testing.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 7:
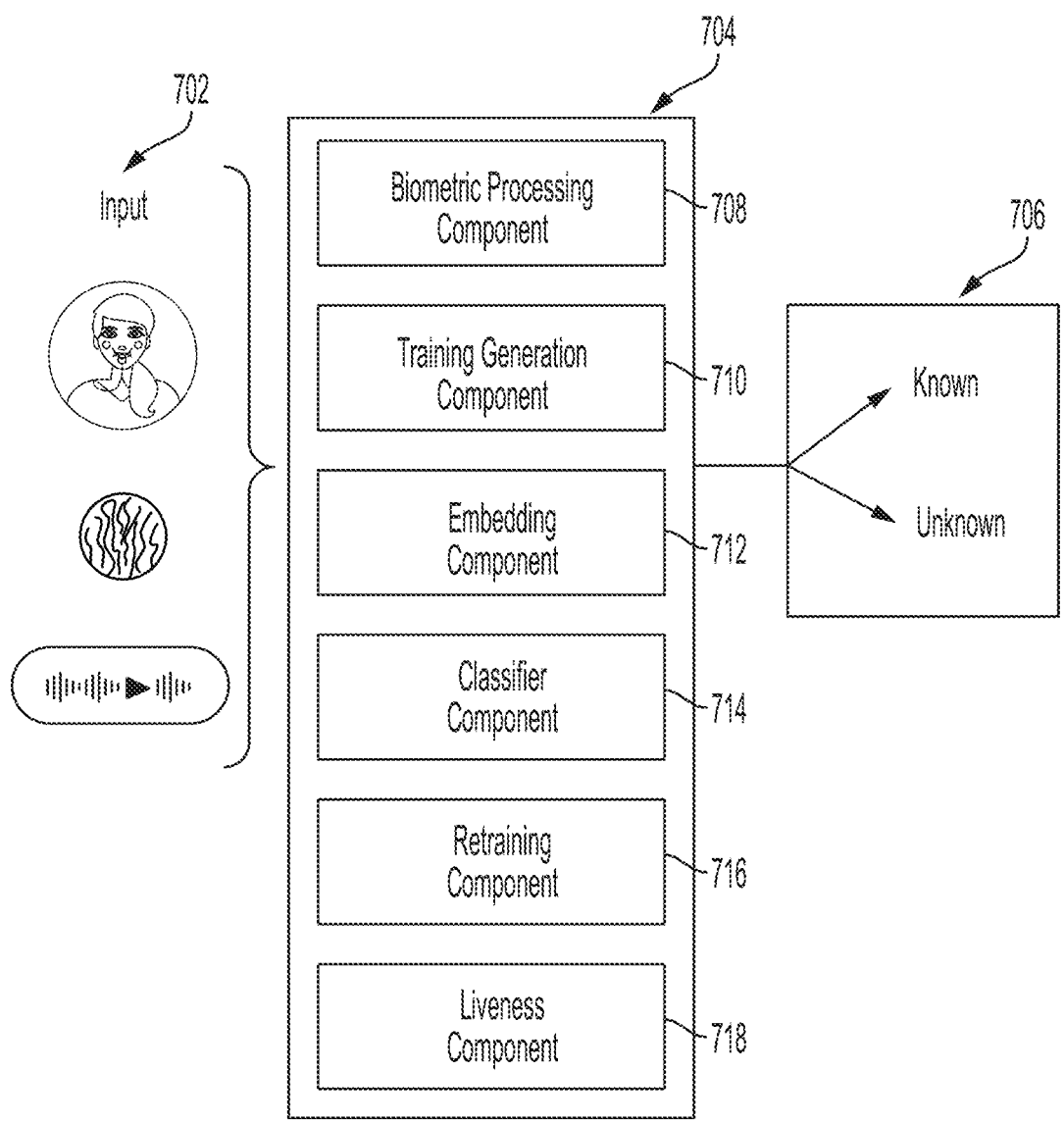
FIG. 7 is a block diagram of an embodiment of a privacy-enabled biometric system with liveness validation, according to one embodiment.

FIG. 7 is a block diagram of an example privacy-enabled biometric system 704 with liveness validation. According to some embodiments, the system can be installed on a mobile device or called from a mobile device (e.g., on a remote server or cloud based resource) to return an authenticated or not signal. In various embodiments, system 704 can execute any of the following processes. For example, system 704 can enroll users (e.g., via process 100), identify enrolled users (e.g., process 200) and/or include multiple enrollment phases (e.g., distance metric evaluation and fully encrypted input/evaluation), and search for matches to users (e.g., process 250). In various embodiments, system 704 includes multiple pairs of neural networks, where each pair includes a processing/generating neural network for accepting an unencrypted biometric input (e.g., images or voice, etc.) and processing to generate an encrypted embedding or feature vector. Each pair can include a classification neural network than can be trained on the generated encrypted feature vectors to classify the encrypted information with labels, and that is further used to predict a match to the trained labels or an unknown class based on subsequent input of encrypted feature vectors to the trained network.

In other embodiments, the system can be configured with a trained classification neural network and receive from another processing component, system, or entity, encrypted feature vectors to use for prediction with the trained classification network. According to various embodiments, system 704 can accept, create or receive original biometric information (e.g., input 702). The input 702 can include images of people, images of faces, thumbprint scans, voice recordings, sensor data, etc. Further, the voice inputs can be requested by the system, and correspond to a set of randomly selected biometric instances (including for example, randomly selected words) as part of liveness validation. According to various embodiments, the inputs can be processed for identity matching and in conjunction the inputs can be analyzed to determine matching to the randomly selected biometric instances for liveness verification. As discussed above, the system 704 can also be architected to provide a prediction on input of an encrypted feature vector, and another system or component can accept unencrypted biometrics and/or generate encrypted feature vectors, and communicate the same for processing.

According to one embodiment, the system can include a biometric processing component 708. A biometric processing component (e.g., 708) can be configured to crop received images, sample voice biometrics, eliminate noise from microphone captures, etc., to focus the biometric information on distinguishable features (e.g., automatically crop image around face, eliminate background noise for voice sample, normalized health data received, generate samples of received health data, etc.). Various forms of pre-processing can be executed on the received biometrics, and the pre-processing can be executed to limit the biometric information to important features or to improve identification by eliminating noise, reducing an analyzed area, etc. In some embodiments, the pre-processing (e.g., via 708) is not executed or not available. In other embodiments, only biometrics that meet quality standards are passed on for further processing.

Processed biometrics can be used to generate additional training data, for example, to enroll a new user, and/or train a classification component/network to perform predictions. According to one embodiment, the system 704 can include a training generation component 710, configured to generate new biometrics for use in training to identify a user. For example, the training generation component 710 can be configured to create new images of the user's face or voice having different lighting, different capture angles, etc., different samples, filtered noise, introduced noise, etc., in order to build a larger training set of biometrics. In one example, the system includes a training threshold specifying how many training samples to generate from a given or received biometric. In another example, the system and/or training generation component 710 is configured to build twenty five additional images from a picture of a user's face. Other numbers of training images, or voice samples, etc., can be used. In further examples, additional voice samples can be generated from an initial set of biometric inputs to create a larger set of training samples for training a voice network (e.g., via 710)

According to one embodiment, the system is configured to generate encrypted feature vectors from the biometric input (e.g., process images from input and/or generated training images, process voice inputs and/or voice samples and/or generated training voice data, among other options). In various embodiments, the system 704 can include an embedding component 712 configured to generate encrypted embeddings or encrypted feature vectors (e.g., image feature vectors, voice feature vectors, health data feature vectors, etc.).

According to one embodiment, component 712 executes a convolution neural network ("CNN") to process image inputs (and for example, facial images), where the CNN includes a layer which generates distance (e.g., Euclidean) measurable output. The embedding component 712 can include multiple neural networks each tailored to specific biometric inputs, and configured to generate encrypted feature vectors (e.g., for captured images, for voice inputs, for health measurements or monitoring, etc.) that are distance measurable. According to various embodiments, the system can be configured to required biometric inputs of various types, and pass the type of input to respective neural networks for processing to capture respective encrypted feature vectors, among other options. In various embodiments, one or more processing neural networks is instantiated as part of the embedding component 712, and the respective neural network process unencrypted biometric inputs to generate encrypted feature vectors.

In one example, the processing neural network is a convolutional neural network constructed to create encrypted embeddings from unencrypted biometric input. In one example, encrypted feature vectors can be extracted from a neural network at the layers preceding a softmax layer (including for example, the n-1 layer). As discussed herein, various neural networks can be used to define embeddings or feature vectors with each tailored to an analyzed biometric (e.g., voice, image, health data, etc.), where an output of or with the model is Euclidean measurable. Some examples of these neural network include a model having a softmax layer. Other embodiments use a model that does not include a softmax layer to generate Euclidean measurable feature vectors. Various embodiments of the system and/or embedding component are configured to generate and capture encrypted feature vectors for the processed biometrics in the layer or layer preceding the softmax layer.

Optional processing of the generated encrypted biometrics can include filter operations prior to passing the encrypted biometrics to classifier neural networks (e.g., a DNN). For example, the generated encrypted feature vectors can be evaluated for distance to determine that they meet a validation threshold. In various embodiments, the validation threshold is used by the system to filter noisy or encrypted values that are too far apart.

According to one aspect, filtering of the encrypted feature vectors improves the subsequent training and prediction accuracy of the classification networks. In essence, if a set of encrypted embeddings for a user are too far apart (e.g., distances between the encrypted values are above the validation threshold) the system can reject the enrollment attempt, request new biometric measurements, generate additional training biometrics, etc.

Each set of encrypted values can be evaluated against the validation threshold and values with too great a distance can be rejected and/or trigger requests for additional/new biometric submission. In one example, the validation threshold is set so that no distance between comparisons (e.g., of face image vectors) is greater than 0.85. In another example, the threshold can be set such that no distance between comparisons is greater than 1.0. Stated broadly, various embodiments of the system are configured to ensure that a set of enrollment vectors are of sufficient quality for use with the classification DNN, and in further embodiments configured to reject enrollment vectors that are bad (e.g., too dissimilar).

According to some embodiments, the system can be configured to handle noisy enrollment conditions. For example, validation thresholds can be tailored to accept distance measures of having an average distance greater than 0.85 but less than 1 where the minimum distance between compared vectors in an enrollment set is less than 0.06. Different thresholds can be implemented in different embodiments, and can vary within 10%, 15% and/or 20% of the examples provided.

According to some embodiments, the system 704 can include a classifier component 714. The classifier component can include one or more deep neural networks trained on encrypted feature vector and label inputs for respective users and their biometric inputs. The trained neural network can then be used during prediction operations to return a match to a person (e.g., from among a groups of labels and people (one to many matching) or from a singular person (one to one matching)) or to return a match to an unknown class.

During training of the classifier component 714, the feature vectors from the embedding component 712 or system 704 are used by the classifier component 714 to bind a user to a classification (i.e., mapping biometrics to a matchable/searchable identity). According to one embodiment, a deep learning neural network (e.g., enrollment and prediction network) is executed as a fully connected neural network ("FCNN") trained on enrollment data. In one example, the FCNN generates an output identifying a person or indicating an UNKNOWN individual (e.g., at 706). Other examples can implement different neural networks for classification and return a match or unknown class accordingly. In some examples, the classifier is a neural network but does not require a fully connected neural network.

According to various embodiments, a deep learning neural network (e.g., which can be an FCNN) must differentiate between known persons and the UNKNOWN. In some examples, the deep learning neural network can include a sigmoid function in the last layer that outputs probability of class matching based on newly input biometrics or that outputs values showing failure to match. Other examples achieve matching based on executing a hinge loss function to establish a match to a label/person or an unknown class.

In further embodiments, the system 704 and/or classifier component 714 are configured to generate a probability to establish when a sufficiently close match is found. In some implementations, an unknown person is determined based on negative return values (e.g., the model is tuned to return negative values for no match found). In other embodiments, multiple matches can be developed by the classifier component 714 and voting can also be used to increase accuracy in matching.

Various implementations of the system (e.g., 704) have the capacity to use this approach for more than one set of input. In various embodiments, the approach itself is biometric agnostic. Various embodiments employ encrypted feature vectors that are distance measurable (e.g., Euclidean, homomorphic, one-way encrypted, etc.), generation of which is handled using the first neural network or a respective first network tailored to a particular biometric.

In some embodiments, the system can invoke multiple threads or processes to handle volumes of distance comparisons. For example, the system can invoke multiple threads to accommodate an increase in user base and/or volume of authentication requests. According to various aspect, the distance measure authentication is executed in a brute force manner. In such settings, as the user population grows so does the complexity or work required to resolve the analysis in a brute force (e.g., check all possibilities (e.g., until match)) fashion. Various embodiments are configured to handle this burden by invoking multiple threads, and each thread can be used to check a smaller segment of authentication information to determine a match.

In some examples, different neural networks are instantiated to process different types of biometrics. Using that approach the vector generating neural network may be swapped for or use a different neural network in conjunction with others where each is capable of creating a distance measurable encrypted feature vector based on the respective biometric. Similarly, the system may enroll on both or greater than multiple biometric types (e.g., use two or more vector generating networks) and predict on the feature vectors generated for both types of biometrics using both neural networks for processing respective biometric types, which can also be done simultaneously. In one embodiment, feature vectors from each type of biometric can likewise be processed in respective deep learning networks configured to predict matches based on the feature vector inputs (or return unknown). The co-generated results (e.g., one from each biometric type) may be used to identify a user using a voting scheme and may better perform by executing multiple predictions simultaneously. For each biometric type used, the system can execute multi-phase authentication approaches with a first generation network and distance measures in a first phase, and a network trained on encrypted feature vectors in a second phase. At various times each of the phases may be in used—for example, an enrolled user can be authentication with the trained network (e.g., second phase), while a newly enrolling user is enrolled and/or authenticated via the generation network and distance measure phase.

In some embodiments, the system can be configured to validate an unknown determination. It is realized that accurately determining that an input to the authentication system is an unknown is an unsolved problem in this space. Various embodiments leverage the deep learning construction (including, for example, the classification network) described herein to enable identification/return of an unknown result. In some embodiments, the DNN can return a probability of match that is below a threshold probability. If the result is below the threshold, the system is configured to return an unknown result. Further embodiments leverage the distance store to improve the accuracy of the determination of the unknown result. In one example, upon a below threshold determination output from the DNN, the system can validate the below threshold determination by performing distance comparison(s) on the authentication vectors and the vectors in the distance store for the most likely match (e.g., greatest probability of match under the threshold).

According to another aspect, generating accurate (e.g., greater than 90% accuracy in example executions described below) identification is only a part of a complete authentication system. In various embodiments, identification is coupled with liveness testing to ensure that biometric inputs are not, for example, being recorded and replayed for verification. For example, the system 704 can include a liveness component 718. The liveness component can be configured to generate a random set of biometric instances, that the system requests a user submit. The random set of biometric instance can serve multiple purposes. For example, the biometric instances provide a biometric input that can be used for identification, and can also be used for liveness (e.g., validate matching to random selected instances). If both tests are valid, the system can provide an authentication indication or provide access or execution of a requested function. Further embodiments can require multiple types of biometric input for identification, and couple identification with liveness validation. In yet other embodiments, liveness testing can span multiple biometric inputs as well.

According to one embodiment, the liveness component 718 is configured to generate a random set of words that provide a threshold period of voice data from a user requesting authentication. In one example, the system is configured to require a five second voice signal for processing, and the system can be configured to select the random biometric instances accordingly. Other thresholds can be used (e.g., one, two, three, four, six, seven, eight, nine seconds or fractions thereof, among other examples), each having respective random selections that are associated with a threshold period of input.

According to further embodiments, the system (e.g. 704) can be configured to incorporate new identification classes responsive to receiving new biometric information. In one embodiment, the system 704 includes a retraining component configured to monitor a number of new biometrics (e.g., per user/identification class or by total number of new biometrics) and automatically trigger a re-enrollment with the new feature vectors derived from the new biometric information (e.g., produced by 712). In other embodiments, the system can be configured to trigger re-enrollment on new feature vectors based on time or time period elapsing.

The system 704 and/or retraining component 716 can be configured to store feature vectors as they are processed, and retain those feature vectors for retraining (including for example feature vectors that are unknown to retrain an unknown class in some examples). Various embodiments of the system are configured to incrementally retrain the classification model (e.g., classifier component 714 and/or a DNN) on system assigned numbers of newly received biometrics. Further, once a system set number of incremental re-trainings have occurred the system is further configured to complete a full retrain of the model.

According to various aspects, the incremental retrain execution avoids the conventional approach of fully retraining a neural network to recognize new classes and generate new identifications and/or to incorporate new feature vectors as they are input. Incremental re-training of an existing model to include a new identification without requiring a full retraining provides significant execution efficiency benefits over conventional approaches.

According to various embodiments, the variables for incremental retraining and full retraining can be set on the system via an administrative function. Some defaults include incremental retrain every 3, 4, 5, 6, etc., identifications, and full retrain every 3, 4, 5, 6, 7, 8, 9, 10, etc., incremental retrains. Additionally, this requirement may be met by using calendar time, such as retraining once a year. These operations can be performed on offline (e.g., locked) copies of the model, and once complete, the offline copy can be made live.

Additionally, the system 704 and/or retraining component 716 is configured to update the existing classification model with new users/identification classes. According to various embodiments, the system builds a classification model for an initial number of users, which can be based on an expected initial enrollment. The model is generated with empty or unallocated spaces to accommodate new users. For example, a fifty user base is generated as a one hundred user model. This over allocation in the model enables incremental training to be executed and incorporated, for example, new classes without requiring fully retraining the classification model. When a new user is added, the system is and/or retraining component 716 is configured to incrementally retrain the classification model—ultimately saving significant computation time over convention retraining executions. Once the over allocation is exhausted (e.g., 100 total identification classes) a full retrain with an additional over allocation can be made (e.g., fully retrain the 100 classes to a model with 150 classes). In other embodiments, an incremental retrain process can be executed to add additional unallocated slots.

Even with the reduced time retraining, the system can be configured to operate with multiple copies of the classification model. One copy may be live that is used for authentication or identification. A second copy may be an update version, that is taken offline (e.g., locked from access) to accomplish retraining while permitting identification operations to continue with a live model. Once retraining is accomplished, the updated model can be made live and the other model locked and updated as well. Multiple instances of both live and locked models can be used to increase concurrency.

According to some embodiments, the system 700 can receive feature vectors instead of original biometrics and processing original biometrics can occur on different systems-in these cases system 700 may not include, for example, 708, 710, 712, and instead receive feature vectors from other systems, components or processes.

Example Liveness Execution And Considerations

According to one aspect, in establishing identity and authentication an authentication system is configured to determine if the source presenting the features is, in fact, a live source. In conventional password systems, there is no check for liveliness. A typical example of a conventional approach includes a browser where the user fills in the fields for username and password or saved information is pre-filled in a form on behalf of the user. The browser is not a live feature, rather the entry of the password is pulled from the browser' form history and essentially replayed. This is an example of replay, and according to another aspect presents many challenges exist where biometric input could be copied and replayed.

The inventors have realized that biometrics have the potential to increase security and convenience simultaneously. However, there are many issues associated with such implementation, including for example, liveness. Some conventional approaches have attempted to introduce biometrics—applying the browser example above, an approach can replace authentication information with an image of a person's face or a video of the face. In such conventional systems that do not employ liveness checks, these conventional systems may be compromised by using a stored image of the face or stored video and replaying for authentication.

The inventors have realized that use of biometrics (e.g., such as face, voice or fingerprint, etc.) include the consequence of the biometric potentially being offered in non-live forms, and thus allowing a replayed biometric to be an offering of a plausible to the system. Without liveness, the plausible will likely be accepted. The inventors have further realized that to determine if a biometric is live is an increasingly difficult problem. Examined are some approaches for resolving the liveness problem—which are treated broadly as two classes of liveness approaches (e.g., liveness may be subdivided into active liveness and passive liveness problem domains). Active liveness requires the user to do something to prove the biometric is not a replica. Passive liveness makes no such requirement to the user and the system alone must prove the biometric is not a replica. Various embodiments and examples are directed to active liveness validation (e.g., random words supplied by a user), however, further examples can be applied in a passive context (e.g., system triggered video capture during input of biometric information, ambient sound validation, etc.). Table X (FIG. 8A-B) illustrates example implementation that may be employed, and includes analysis of potential issues for various interactions of the example approaches. In some embodiments, various ones of the examples in Table X can be combined to reduce inefficiencies (e.g., potential vulnerabilities) in the implementation. Although some issues are present in the various comparative embodiments, the implementation can be used, for example, where the potential for the identified replay attacks can be minimized or reduced.

According to one embodiment, randomly requested biometric instances in conjunction with identity validation on the same random biometric instances provides a high level of assurance of both identity and liveness. In one example (Row 8), the random biometric instances include a set of random words selected for liveness validation in conjunction with voice based identification.

Figure 9:
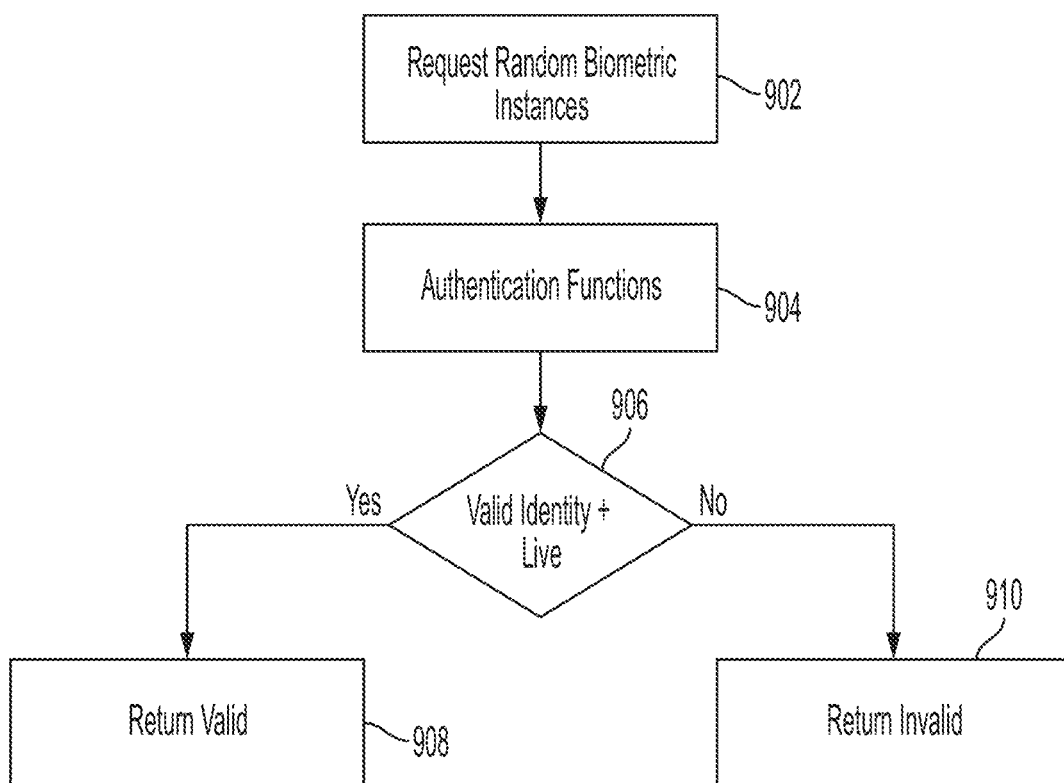
FIG. 9 is an example process for determining identity and liveness, according to one embodiment.

According to one embodiment, an authentication system, assesses liveness by asking the user to read a few random words. This can be done in various embodiments, via execution of process 900, FIG. 9. According to various embodiment, process 900 can being at 902 with a request to a user to supply a set of random biometric instances. Process 900 continues with concurrent (or, for example, simultaneous) authentication functions—identity and liveness at 904. For example, an authentication system can concurrently or simultaneously process the received voice signal through two algorithms (e.g., liveness algorithm and identity algorithm (e.g., by executing 904 of process 900), returning a result in less than one second. The first algorithm (e.g., liveness) performs a text to speech function to compare the pronounced text to the requested text (e.g., random words) to verify that the words were read correctly, and the second algorithm uses a prediction function (e.g., a prediction application programming interface (API)) to perform a one-to-many (1:N) identification on a private voice biometric to ensure that the input correctly identifies the expected person. At 908, for example, process 900 can return an authentication value for identified and live inputs 906 YES. If either check fails 906 NO, process 900 can return an invalid indicator at 910.

Further embodiments implement multiple biometric factor identification with liveness to improve security and convenience. In one example, a first factor, face (e.g., image capture), is used to establish identity. In another example, the second factor, voice (e.g., via random set of words), is used to confirm identity, and establish authentication with the further benefit of confirming (or not) that the source presenting the biometric input is live.

Various embodiments of private biometric systems are configured to execute liveness. The system generates random text that is selected to take roughly 5 seconds to speak (in whatever language the user prefers—and with other example threshold minimum periods). The user reads the text and the system (e.g., implemented as a private biometrics cloud service or component) then performs a text to speech process, comparing the pronounced text to the requested text. The system allows, for example, a private biometric component to assert the liveness of the requestor for authentication. In conjunction with liveness, the system compares the random text voice input and performs an identity assertion on the same input to ensure the voice that spoke the random words matches the user's identity. For example, input audio is now used for liveness and identity.

Figure 10:
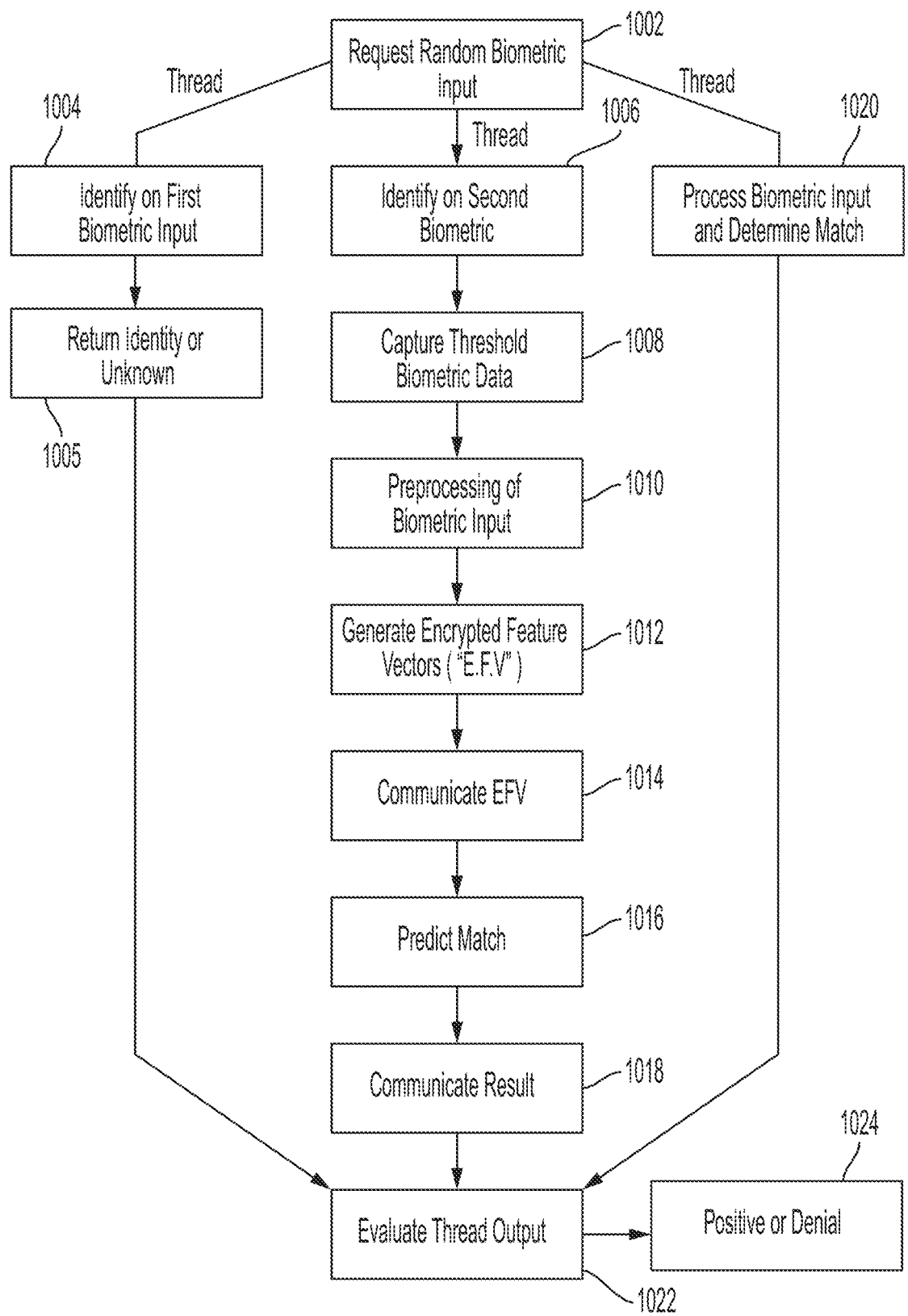
FIG. 10 is an example process for determining identity and liveness, according to one embodiment.

FIG. 10 is an example process flow 1000 for executing identification and liveness validation. Process 1000 can be executed by an authentication system (e.g., 704, FIG. 7 or 304, FIG. 3). According to one embodiment, process 1000 begins with generation of a set of random biometric instances (e.g., set of random words) and triggering a request for the set of random words at 1002. In various embodiments, process 1000 continues under multiple threads of operation. At 1004, a first biometric type can be used for a first identification of a user in a first thread (e.g., based on images captured of a user during input of the random words). Identification of the first biometric input (e.g., facial identification) can proceed as discussed herein (e.g., process unencrypted biometric input with a first neural network to output encrypted feature vectors, predict a match on the encrypted feature vectors with a DNN, and return an identification or unknown and/or use a first phase for distance evaluation), and as described in, for example, process 200 and/or process 250 below. At 1005, an identity corresponding to the first biometric or an unknown class is returned. At 1006, a second biometric type can be used for a second identification of a user in a second thread. For example, the second identification can be based upon a voice biometric. According to one embodiment, processing of a voice biometric can continue at 1008 with capture of at least a threshold amount of the biometric (e.g., 5 second of voice). In some examples, the amount of voice data used for identification can be reduced at 1010 with biometric pre-processing. In one embodiment, voice data can be reduced with execution of pulse code modulation. Various approaches for processing voice data can be applied, including pulse code modulation, amplitude modulation, etc., to convert input voice to a common format for processing. Some example functions that can be applied (e.g., as part of 1010) include Librosa (e.g., to eliminate background sound, normalize amplitude, etc.); pydub (e.g., to convert between mp3 and .wav formats); Librosa (e.g., for phase shift function); Scipy (e.g. to increase low frequency); Librosa (e.g., for pulse code modulation); and/or soundfile (e.g., for read and write sound file operations).

In various embodiments, processed voice data is converted to the frequency domain via a fourier transform (e.g., fast fourier transform, discrete fourier transform, etc.) which can be provided by numpy or scipy libraries. Once in the frequency domain, the two dimensional frequency array can be used to generate encrypted feature vectors.

In some embodiments, voice data is input to a pre-trained neural network to generate encrypted voice feature vectors at 1012. In one example, the frequency arrays are used as input to a pre-trained convolutional neural network ("CNN") which outputs encrypted voice feature vectors. In other embodiments, different pre-trained neural networks can be used to output encrypted voice feature vectors from unencrypted voice input. As discussed throughout, the function of the pre-trained neural network is to output distance measurable encrypted feature vectors upon voice data input. Once encrypted feature vectors are generated at 1012, the unencrypted voice data can be deleted. Some embodiments receive encrypted feature vectors for processing rather than generate them from unencrypted voice directly, in such embodiments there is no unencrypted voice to delete.

In one example, a CNN is constructed with the goal of creating embeddings and not for its conventional purpose of classifying inputs. In further example, the CNN can employ a triple loss function (including, for example, a hard triple loss function), which enables the CNN to converge more quickly and accurately during training than some other implementations. In further examples, the CNN is trained on hundreds or thousands of voice inputs. Once trained, the CNN is configured for creation of embeddings (e.g., encrypted feature vectors). In one example, the CNN accepts a two dimensional array of frequencies as an input and provides floating point numbers (e.g., 32, 64, 128, 256, 1028, . . . floating point numbers) as output.

In some executions of process 1000, the initial voice capture and processing (e.g., request for random words—1002—1012) can be executed on a user device (e.g., a mobile phone) and the resulting encrypted voice feature vector can be communicated to a remote service via an authentication API hosted and executed on cloud resources. In some other executions, the initial processing and prediction operations can be executed on the user device as well. Various execution architectures can be provided, including fully local authentication, fully remote authentication, and hybridization of both options.

In one embodiment, process 1000 continues with communication of the voice feature vectors to a cloud service (e.g., authentication API) at 1014. The voice feature vectors can then be processed by a fully connected neural network ("FCNN") for predicting a match to a trained label at 1016. As discussed, the input to the FCNN is an embedding generated by a first pre-trained neural network (e.g., an embedding comprising 32, 64, 128, 256, 1028, etc. floating point numbers). Prior to execution of process 1000, the FCNN is trained with a threshold number of people for identification (e.g., 500, 750, 1000, 1250, 1500 . . . etc.). The initial training can be referred to as "priming" the FCNN. The priming function is executed to improve accuracy of prediction operations performed by the FCNN.

At 1018, the FCNN returns a result matching a label or an unknown class—i.e., matches to an identity from among a group of candidates or does not match to a known identity. The result is communicated for evaluation of each threads' result at 1022.

According to various embodiments, the third thread of operation is executed to determine that the input biometrics used for identification are live (i.e., not spoofed, recorded, or replayed). For example, at 1020 the voice input is processed to determine if the input words match the set of random words requested. In one embodiment, a speech recognition function is executed to determine the words input, and matching is executed against the randomly requested words to determine an accuracy of the match. If any unencrypted voice input remains in memory, the unencrypted voice data can be deleted as part of 1020. In various embodiments, processing of the third thread, can be executed locally on a device requesting authorization, on a remote server, a cloud resource, or any combination. If remote processing is executed, a recording of the voice input can be communicated to a server or cloud resource as part of 1020, and the accuracy of the match (e.g., input to random words) determined remotely. Any unencrypted voice data can be deleted once encrypted feature vectors are generated and/or once matching accuracy is determined.

In further embodiments, the results from each thread is joined to yield an authorization or invalidation. At 1024, the first thread returns an identity or unknown for the first biometric, the second thread returns an identity or unknown for the second biometric, and the third thread an accuracy of match between a random set of biometric instances and input biometric instances. At 1024, process 1000 provides a positive authentication indication wherein first thread identity matches the second thread identity and one of the biometric inputs is determined to be live (e.g., above a threshold accuracy (e.g., 33% or greater among other options). If not positive, process 1000 can be re-executed (e.g., a threshold number of times) or a denial can be communicated.

According to various embodiments, process 1000 can include concurrent, branched, and/or simultaneous execution of the authentication threads to return a positive authentication or a denial. In further embodiments, process 1000 can be reduced to a single biometric type such that one identification thread and one liveness thread is executed to return a positive authentication or a denial. In further embodiments, the various steps described can be executed together or in different order, and may invoke other processes (e.g., to generate encrypted feature vectors to process for prediction) as part of determining identity and liveness of biometric input. In yet other embodiments, additional biometric types can be tested to confirm identity, with at least one liveness test on one of the biometric inputs to provide assurance that submitted biometrics are not replayed or spoofed. In further example, multiple biometrics types can be used for identity and multiple biometric types can be used for liveness validation.

Example Authentication System With Liveness

In some embodiments, an authentication system interacts with any application or system needing authentication service (e.g., a Private Biometrics Web Service). According to one embodiment, the system uses private voice biometrics to identify individuals in a datastore (and provides one to many (1:N) identification) using any language in one second. Various neural networks measure the signals inside of a voice sample with high accuracy and thus allow private biometrics to replace "username" (or other authentication schemes) and become the primary authentication vehicle.

In some examples, the system employs face (e.g., images of the user's face) as the first biometric and voice as the second biometric type, providing for at least two factor authentication ("2FA"). In various implementation, the system employs voice for identity and liveness as the voice biometric can be captured with the capture of a face biometric. Similar biometric pairings can be executed to provide a first biometric identification, a second biometric identification for confirmation, coupled with a liveness validation.

In some embodiments, an individual wishing to authenticate is asked to read a few words while looking into a camera and the system is configured to collect the face biometric and voice biometric while the user is speaking. According to various examples, the same audio that created the voice biometric is used (along with the text the user was requested to read) to check liveness and to ensure the identity of the user's voice matches the face.

Such authentication can be configured to augment security in a wide range of environments. For example, private biometrics (e.g., voice, face, health measurements, etc.) can be used for common identity applications (e.g., "who is on the phone?") and single factor authentication (1FA) by call centers, phone, watch and TV apps, physical security devices (door locks), and other situations where a camera is unavailable. Additionally, where additional biometrics can be captured 2FA or better can provide greater assurance of identity with the liveness validation.

Broadly stated, various aspects implement similar approaches for privacy-preserving encryption for processed biometrics (including, for example, face and voice biometrics). Generally stated, after collecting an unencrypted biometric (e.g., voice biometric), the system creates a private biometric (e.g., encrypted feature vectors) and then discards the original unencrypted biometric template. As discussed herein, these private biometrics enable an authentication system and/or process to identify a person (i.e., authenticate a person) while still guaranteeing individual privacy and fundamental human rights by only operating on biometric data in the encrypted space.

To transform the unencrypted voice biometric into a private biometric, various embodiments are configured to pre-process the voice signal and reduce the voice data to a smaller form (e.g., for example, without any loss). The Nyquist sampling rate for this example is two times the frequency of the signal. In various implementations, the system is configured to sample the resulting data and use this sample as input to a Fourier transform. In one example, the resulting frequencies are used as input to a pre-trained voice neural network capable of returning a set of embeddings (e.g., encrypted voice feature vectors). These embeddings, for example, sixty four floating point numbers, provide the system with private biometrics which then serve as input to a second neural network for classification.

Private Biometric Implementation

Various embodiments are discussed below for enrolling users with private biometrics and prediction on the same. Various embodiments discuss some considerations and examples for implementation of private biometrics. These examples and embodiments can be used with liveness verification of the respective private biometrics as discussed above.

FIG. 1 is an example process flow 100 for enrolling in a privacy-enabled biometric system (e.g., FIG. 3, 304 described in greater detail below or FIG. 7, 704 above). Process 100 begins with acquisition of unencrypted biometric data at 102. The unencrypted biometric data (e.g., plaintext, reference biometric, etc.) can be directly captured on a user device, received from an acquisition device, or communicated from stored biometric information. In one example, a user takes a photo of themselves on their mobile device for enrollment. Pre-processing steps can be executed on the biometric information at 104. For example, given a photo of a user, pre-processing can include cropping the image to significant portions (e.g., around the face or facial features). Various examples exist of photo processing options that can take a reference image and identify facial areas automatically.

In another example, the end user can be provided a user interface that displays a reference area, and the user is instructed to position their face from an existing image into the designated area. Alternatively, when the user takes a photo, the identified area can direct the user to focus on their face so that it appears within the highlight area. In other options, the system can analyze other types of images to identify areas of interest (e.g., iris scans, hand images, fingerprint, etc.) and crop images accordingly. In yet other options, samples of voice recordings can be used to select data of the highest quality (e.g., lowest background noise), or can be processed to eliminate interference from the acquired biometric (e.g., filter out background noise).

Having a given biometric, the process 100 continues with generation of additional training biometrics at 106. For example, a number of additional images can be generated from an acquired facial image. In one example, an additional twenty five images are created to form a training set of images. In some examples, as few as three images can be used but with the tradeoff of reduce accuracy. In other examples, as many as forty training images may be created. The training set is used to provide for variation of the initial biometric information, and the specific number of additional training points can be tailored to a desired accuracy (see e.g., Tables I-VIII below provide example implementation and test results).

Other embodiments can omit generation of additional training biometrics. Various ranges of training set production can be used in different embodiments (e.g., any set of images from two to one thousand). For an image set, the training group can include images of different lighting, capture angle, positioning, etc. For audio based biometrics different background noises can be introduced, different words can be used, different samples from the same vocal biometric can be used in the training set, among other options. Various embodiments of the system are configured to handle multiple different biometric inputs including even health profiles that are based at least in part on health readings from health sensors (e.g., heart rate, blood pressure, EEG signals, body mass scans, genome, etc.), and can, in some examples, include behavioral biometric capture/processing. According to various embodiments, biometric information includes Initial Biometric Values (IBV) a set of plaintext values (pictures, voice, SSNO, driver's license number, etc.) that together define a person.

At 108, feature vectors are generated from the initial biometric information (e.g., one or more plain text values that identify an individual). Feature vectors are generated based on all available biometric information which can include a set of and training biometrics generated from the initial unencrypted biometric information received on an individual or individuals. According to one embodiment, the IBV is used in enrollment and for example in process 100. The set of IBVs are processed into a set of initial biometric vectors (e.g., encrypted feature vectors) which are used downstream in a subsequent neural network.

In one implementation, users are directed to a website to input multiple data points for biometric information (e.g., multiple pictures including facial images), which can occur in conjunction with personally identifiable information ("PII"). The system and/or execution of process 100 can include tying the PII to encryptions of the biometric as discussed below.

In one embodiment, a convolutional deep neural network is executed to process the unencrypted biometric information and transform it into feature vector(s) which have a property of being one-way encrypted cipher text. The neural network is applied (108) to compute a one-way homomorphic encryption of the biometric—resulting in feature vectors (e.g., at 110). These outputs can be computed from an original biometric using the neural network but the values are one way in that the neural network cannot then be used to regenerate the original biometrics from the outputs.

Various embodiments employ networks that take as input a plaintext input and return Euclidean measurable output. One such implementation is FaceNet which takes in any image of a face and returns 128 floating point numbers, as the feature vector. The neural network is fairly open ended, where various implementations are configured to return a distance or Euclidean measurable feature vector that maps to the input. This feature vector is nearly impossible to use to recreate the original input biometric and is therefore considered a one-way encryption.

Various embodiments are configured to accept the feature vector(s) produced by a first neural network and use it as input to a new neural network (e.g., a second classifying neural network). According to one example, the new neural network has additional properties. This neural network is specially configured to enable incremental training (e.g., on new users and/or new feature vectors) and configured to distinguish between a known person and an unknown person. In one example, a fully connected neural network with 2 hidden layers and a "hinge" loss function is used to process input feature vectors and return a known person identifier (e.g., person label or class) or indicate that the processed biometric feature vectors are not mapped to a known person.

For example, the hinge loss function outputs one or more negative values if the feature vector is unknown. In other examples, the output of the second neural network is an array of values, wherein the values and their positions in the array determined a match to a person or identification label.

Various embodiments use different machine learning models for capturing feature vectors in the first network. According to various embodiments, the feature vector capture is accomplished via a pre-trained neural network (including, for example, a convolutional neural network) where the output is distance measurable (e.g., Euclidean measurable). In some examples, this can include models having a softmax layer as part of the model, and capture of feature vectors can occur preceding such layers. Feature vectors can be extracted from the pre-trained neural network by capturing results from the layers that are Euclidean measurable. In some examples, the softmax layer or categorical distribution layer is the final layer of the model, and feature vectors can be extracted from the n-1 layer (e.g., the immediately preceding layer). In other examples, the feature vectors can be extracted from the model in layers preceding the last layer. Some implementations may offer the feature vector as the last layer.

In some embodiments, and optional step can be executed as part of process 100 (not shown). The optional step can be executed as a branch or fork in process 100 so that authentication of a user can immediately follow enrollment of a new user or authentication information. In one example, a first phase of enrollment can be executed to generate encrypted feature vectors. The system can use the generated encrypted feature vectors directly for subsequent authentication. For example, distance measures can be application to determine a distance between enrolled encrypted feature vectors and a newly generated encrypted feature vector. Where the distance is within a threshold, the user can be authenticated or an authentication signal returned. In various embodiments, this optional authentication approach can be used while a classification network is being trained on encrypted feature vectors in the following steps.

The resulting feature vectors are bound to a specific user classification at 112. For example, deep learning is executed at 112 on the feature vectors based on a fully connected neural network (e.g., a second neural network, an example classifier network). The execution is run against all the biometric data (i.e., feature vectors from the initial biometric and training biometric data) to create the classification information. According to one example, a fully connected neural network having two hidden layers is employed for classification of the biometric data. In another example, a fully connected network with no hidden layers can be used for the classification. However, the use of the fully connected network with two hidden layers generated better accuracy in classification in some example executions (see e.g., Tables I-VIII described in greater detail below). According to one embodiment, process 100 can be executed to receive an original biometric (e.g., at 102) generate feature vectors (e.g., 110), and apply a FCNN classifier to return a label for identification at 112 (e.g., output #people).

In further embodiments, step 112 can also include filtering operations executed on the encrypted feature vectors before binding the vectors to a label via training the second network. For example, encrypted feature vectors can be analyzed to determine if they are within a certain distance of each other. Where the generated feature vectors are too far apart, they can be rejected for enrollment (i.e., not used to train the classifier network). In other examples, the system is configured to request additional biometric samples, and re-evaluate the distance threshold until satisfied. In still other examples, the system rejects the encrypted biometrics and request new submissions to enroll.

Process 100 continues with discarding any unencrypted biometric data at 114. In one example, an application on the user's phone is configured to enable enrollment of captured biometric information and configured to delete the original biometric information once processed (e.g., at 114). In other embodiments, a server system can process received biometric information and delete the original biometric information once processed. According to some aspects, only requiring that original biometric information exists for a short period during processing or enrollment significantly improves the security of the system over conventional approaches. For example, systems that persistently store or employ original biometric data become a source of vulnerability. Unlike a password that can be reset, a compromised biometric remains compromised, virtually forever.

Returning to process 100, at 116 the resulting cipher text (e.g., feature vectors) biometric is stored. In one example, the encrypted biometric can be stored locally on a user device. In other examples, the generated encrypted biometric can be stored on a server, in the cloud, a dedicated data store, or any combination thereof. In one example, the biometrics and classification are stored for use in subsequent matching or searching. For instance, new biometric information can be processed to determine if the new biometric information matches any classifications. The match (depending on a probability threshold) can then be used for authentication or validation.

In cases where a single match is executed, the neural network model employed at 112 can be optimized for one to one matching. For example, the neural network can be trained on the individual expected to use a mobile phone (assuming no other authorized individuals for the device). In some example, the neural network model can include training allocation to accommodate incremental training of the model on acquired feature vectors over time. Various embodiment, discussed in great detail below incorporate incremental training operations for the neural network to permit additional people and to incorporate newly acquired feature vectors.

In other embodiments, an optimized neural network model (e.g., FCNN) can be used for a primary user of a device, for example, stored locally, and remote authentication can use a data store and one to many models (e.g., if the first model returns unknown). Other embodiments may provide the one to many models locally as well. In some instances, the authentication scenario (e.g., primary user or not) can be used by the system to dynamically select a neural network model for matching, and thereby provide additional options for processing efficiency.

Figure 2A:
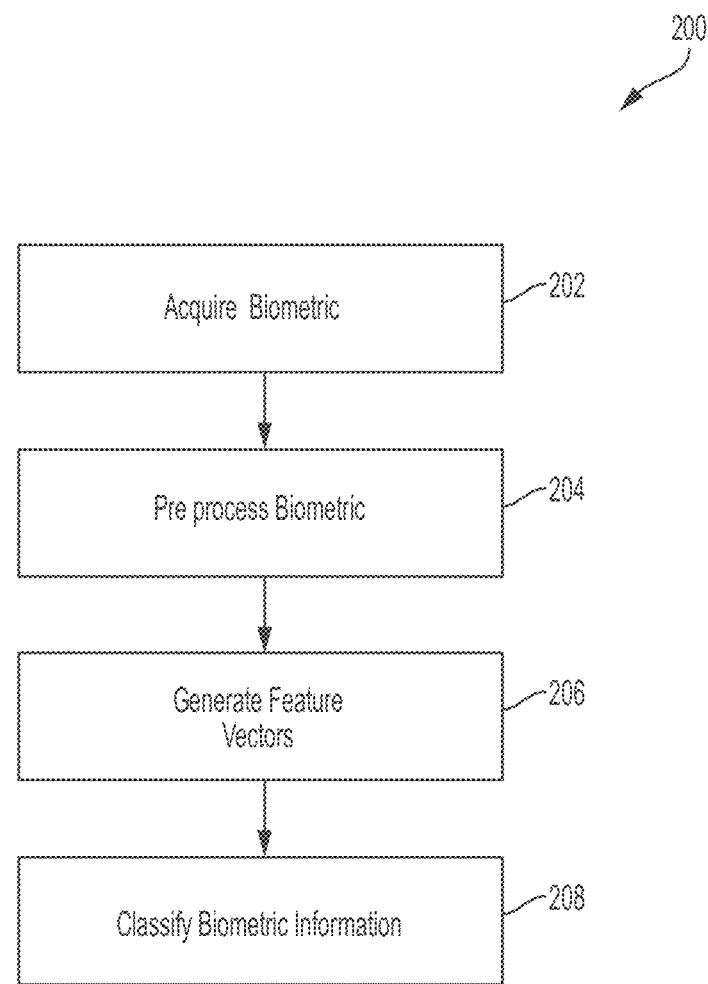
FIG. 2A is an example process flow for authentication with secured biometric data, according to one embodiment.

FIG. 2A illustrates an example process 200 for authentication with secured biometric data. Process 200 begins with acquisition of multiple unencrypted biometrics for analysis at 202. In one example, the privacy-enabled biometric system is configured to require at least three biometric identifiers (e.g., as plaintext data, reference biometric, or similar identifiers). If for example, an authentication session is initiated, the process can be executed so that it only continues to the subsequent steps if a sufficient number of biometric samples are taken, given, and/or acquired. The number of required biometric samples can vary, and take place with as few as one.

Similar to process 100, the acquired biometrics can be pre-processed at 204 (e.g., images cropped to facial features, voice sampled, iris scans cropped to relevant portions, etc.).

Once pre-processing is executed the biometric information is transformed into a one-way homomorphic encryption of the biometric information to acquire the feature vectors for the biometrics under analysis (e.g., at 206). Similar to process 100, the feature vectors can be acquired using any pre-trained neural network that outputs distance measurable encrypted feature vectors (e.g., Euclidean measurable feature vectors, homomorphic encrypted feature vectors, among other options). In one example, this includes a pre-trained neural network that incorporates a softmax layer. However, other examples do not require the pre-trained neural network to include a softmax layer, only that they output Euclidean measurable feature vectors. In one, example, the feature vectors can be obtained in the layer preceding the softmax layer as part of step 206.

In various embodiments, authentication can be executed based on comparing distances between enrolled encrypted biometrics and subsequently created encrypted biometrics. In further embodiments, this is executed as a first phase of authentication. Once a classifying network is trained on the encrypted biometrics a second phase of authentication can be used, and authentication determinations made via 208.

According to some embodiments, the phases of authentication can be executed together and even simultaneously. In one example, an enrolled user will be authenticated using the classifier network (e.g., second phase), and a new user will be authenticated by comparing distances between encrypted biometrics (e.g., first phase). As discussed, the new user will eventually be authenticated using a classifier network trained on the new user's encrypted biometric information, once the classifier network is ready.

Figure 4B:
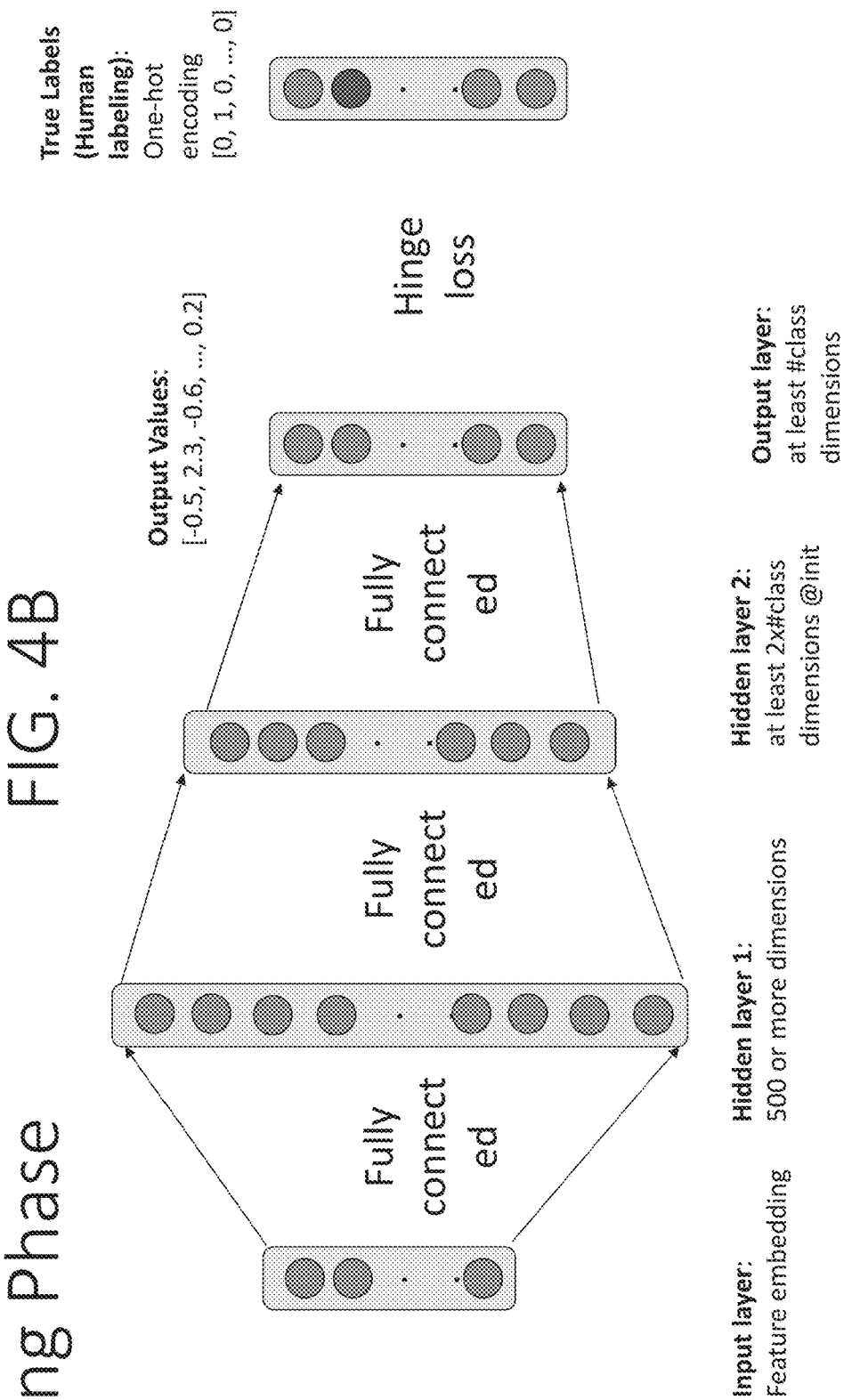
Figure 4D:
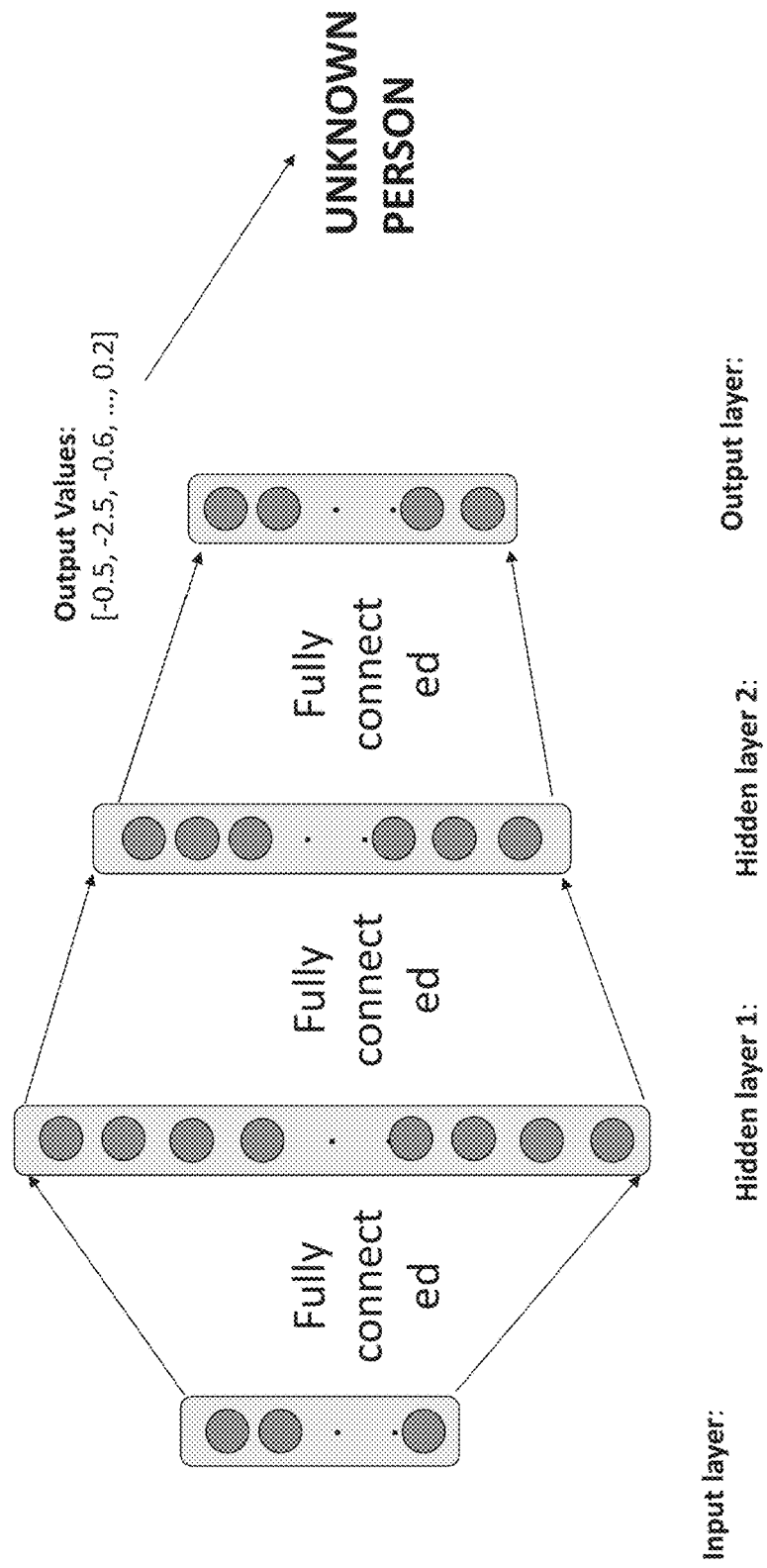
Figure 5A:
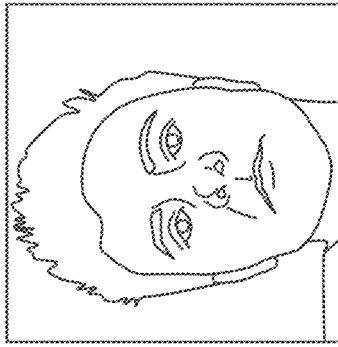
Figure 5B:

At 208, a prediction (e.g., a via deep learning neural network) is executed to determine if there is a match for the person associated with the analyzed biometrics. As discussed above with respect to process 100, the prediction can be executed as a fully connected neural network having two hidden layers (during enrollment the neural network is configured to identify input feature vectors as individuals or unknown, and unknown individuals can be added via incremental training or full retraining of the model). In other examples, a fully connected neural network having no hidden layers can be used. Examples of neural networks are described in greater detail below (e.g., FIG. 4 illustrates an example neural network 400). Other embodiments of the neural network can be used in process 200. According to some embodiments, the neural network features include operates as a classifier during enrollment to map feature vectors to identifications; operates as a predictor to identify a known person or an unknown. In some embodiments, different neural networks can be tailored to different types of biometrics, and facial images processed by one, while voice biometrics are processed by another.

According to some embodiments, process 208 is described agnostic to submitter security. In other words, process 200 relies on front end application configuration to ensure submitted biometrics are captured from the person trying to authenticate. As process 200 is agnostic to submitter security, the process can be executed in local and remote settings in the same manner. However, according to some implementations the execution relies on the native application or additional functionality in an application to ensure an acquired biometric represents the user to be authenticated or matched.

Figure 2B:
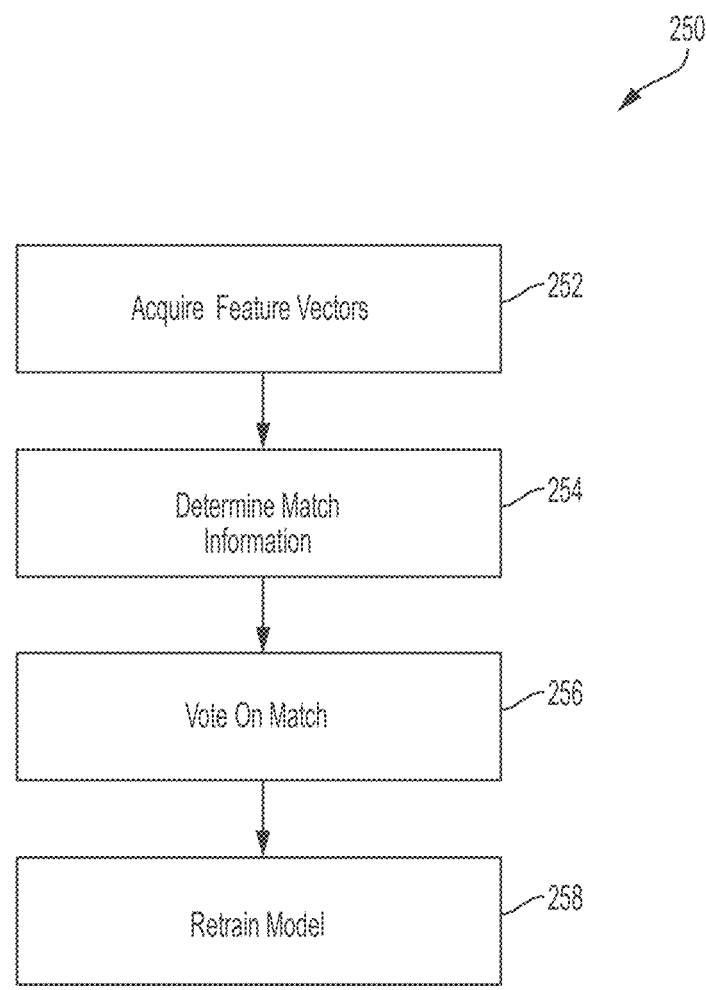
FIG. 2B is an example process flow for one to many matching execution, according to one embodiment.

FIG. 2B illustrates an example process flow 250 showing additional details for a one to many matching execution (also referred to as prediction). According to one embodiment, process 250 begins with acquisition of feature vectors (e.g., step 206 of FIG. 2A or 110 of FIG. 1). At 254, the acquired feature vectors are matched against existing classifications via a deep learning neural network. In one example, the deep learning neural network has been trained during enrollment on s set of individuals. The acquired feature vectors will be processed by the trained deep learning network to predict if the input is a match to known individual or does not match and returns unknown. In one example, the deep learning network is a fully connected neural network ("FCNN"). In other embodiments, different network models are used for the second neural network.

According to one embodiment, the FCNN outputs an array of values. These values, based on their position and the value itself, determine the label or unknown. According to one embodiment, returned from a one to many case are a series of probabilities associated with the match—assuming five people in the trained data: the output layer showing probability of match by person: [0.1, 0.9, 0.3, 0.2, 0.1] yields a match on Person 2 based on a threshold set for the classifier (e.g., >0.5). In another run, the output layer: [0.1, 0.6, 0.3, 0.8, 0.1] yields a match on Person 2 & Person 4 (e.g., using the same threshold).

However, where two results exceed the match threshold, the process and or system is configured to select the maximum value and yield a (probabilistic) match Person 4. In another example, the output layer: [0.1, 0.2, 0.3, 0.2, 0.1] shows no match to a known person—hence an UNKNOWN person—as no values exceed the threshold. Interestingly, this may result in adding the person into the list of authorized people (e.g., via enrollment discussed above), or this may result in the person being denied access or privileges on an application. According to various embodiments, process 250 is executed to determine if the person is known or not. The functions that result can be dictated by the application that requests identification of an analyzed biometrics.

For an UNKNOWN person, i.e. a person never trained to the deep learning enrollment and prediction neural network, an output layer of an UNKNOWN person looks like [−0.7, −1.7, −6.0, −4.3]. In this case, the hinge loss function has guaranteed that the vector output is all negative. This is the case of an UNKNOWN person. In various embodiments, the deep learning neural network must have the capability to determine if a person is UNKNOWN. Other solutions that appear viable, for example, support vector machine ("SVM") solutions break when considering the UNKNOWN case. In one example, the issue is scalability. An svm implementation cannot scale in the many-to-many matching space becoming increasing unworkable until the model simply cannot be used to return a match in any time deemed functional (e.g., 100 person matching cannot return a result in less than 20 minutes). According to various embodiments, the deep learning neural network (e.g., an enrollment & prediction neural network) is configured to train and predict in polynomial time.

Step 256 can be executed to vote on matching. According to one embodiment, multiple images or biometrics are processed to identify a match. In an example where three images are processed the FCNN is configured to generate an identification on each and use each match as a vote for an individual's identification. Once a majority is reached (e.g., at least two votes for person A) the system returns as output identification of person A. In other instance, for example, where there is a possibility that an unknown person may result—voting can be used to facilitate determination of the match or no match. In one example, each result that exceeds the threshold probability can count as one vote, and the final tally of votes (e.g., often 4 out of 5) is used to establish the match. In some implementations, an unknown class may be trained in the model—in the examples above a sixth number would appear with a probability of matching the unknown model. In other embodiments, the unknown class is not used, and matching is made or not against known persons. Where a sufficient match does not result, the submitted biometric information is unknown.

Responsive to matching on newly acquired biometric information, process 250 can include an optional step 258 for retraining of the classification model. In one example, a threshold is set such that step 258 tests if a threshold match has been exceeded, and if yes, the deep learning neural network (e.g., classifier & prediction network) is retrained to include the new feature vectors being analyzed. According to some embodiments, retraining to include newer feature vectors permits biometrics that change over time (e.g., weight loss, weight gain, aging or other events that alter biometric information, haircuts, among other options).

Figure 3:
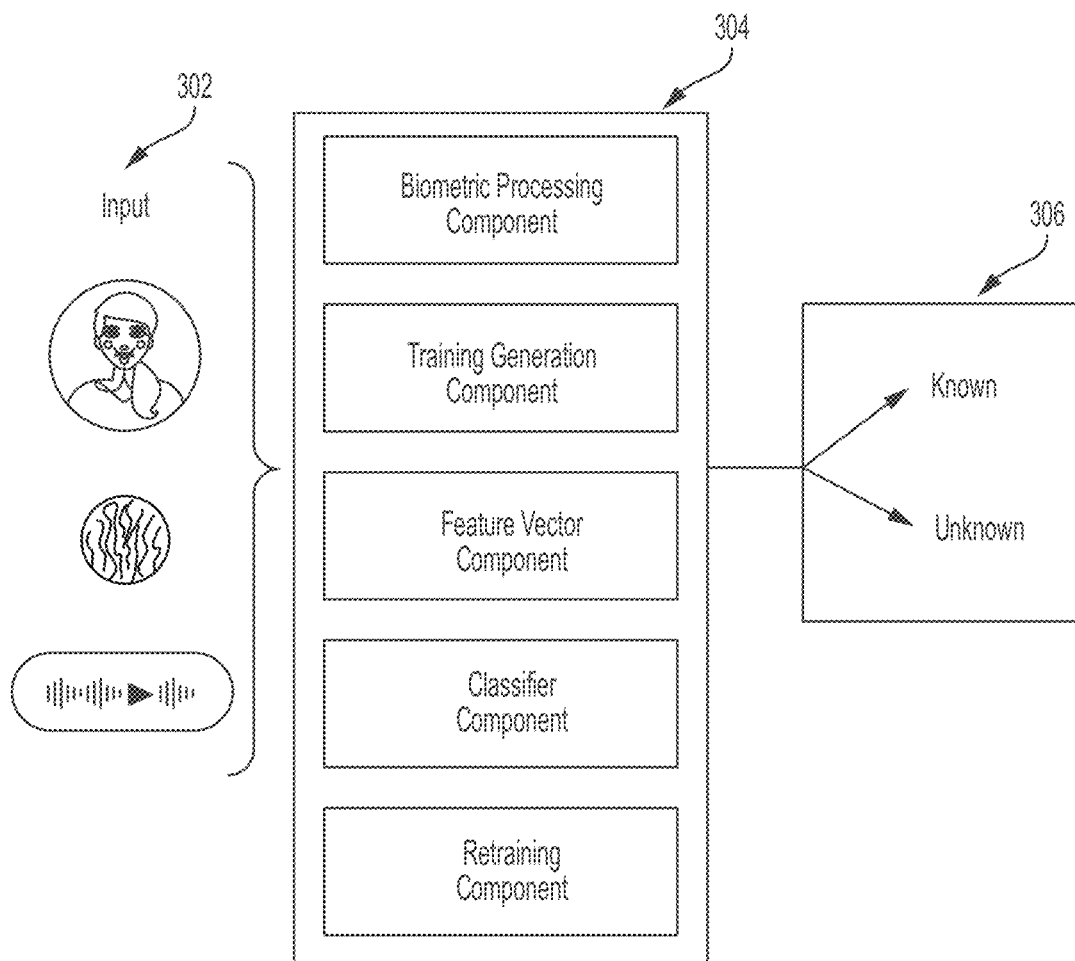
FIG. 3 is a block diagram of an embodiment of a privacy-enabled biometric system, according to one embodiment.

FIG. 3 is a block diagram of an example privacy-enabled biometric system 304. According to some embodiments, the system can be installed on a mobile device or called from a mobile device (e.g., on a remote server or cloud based resource) to return an authenticated or not signal. In various embodiments system 304 can executed any of the preceding processes. For example, system 304 can enroll users (e.g., via process 100), identify enrolled users (e.g., process 200), and search for matches to users (e.g., process 250).

According to various embodiments, system 304 can accept, create or receive original biometric information (e.g., input 302). The input 302 can include images of people, images of faces, thumbprint scans, voice recordings, sensor data, etc. A biometric processing component (e.g., 308) can be configured to crop received images, sample voice biometrics, etc., to focus the biometric information on distinguishable features (e.g., automatically crop image around face). Various forms of pre-processing can be executed on the received biometrics, designed to limit the biometric information to important features. In some embodiments, the pre-processing (e.g., via 308) is not executed or available. In other embodiments, only biometrics that meet quality standards are passed on for further processing.

Processed biometrics can be used to generate additional training data, for example, to enroll a new user. A training generation component 310 can be configured to generate new biometrics for a user. For example, the training generation component can be configured to create new images of the user's face having different lighting, different capture angles, etc., in order to build a train set of biometrics. In one example, the system includes a training threshold specifying how many training samples to generate from a given or received biometric. In another example, the system and/or training generation component 310 is configured to build twenty five additional images from a picture of a user's face. Other numbers of training images, or voice samples, etc., can be used.

The system is configured to generate feature vectors from the biometrics (e.g., process images from input and generated training images). In some examples, the system 304 can include a feature vector component 312 configured to generate the feature vectors. According to one embodiment, component 312 executes a convolution neural network ("CNN"), where the CNN includes a layer which generates Euclidean measurable output. The feature vector component 312 is configured to extract the feature vectors from the layers preceding the softmax layer (including for example, the n-1 layer). As discussed above, various neural networks can be used to define feature vectors tailored to an analyzed biometric (e.g., voice, image, health data, etc.), where an output of or with the model is Euclidean measurable. Some examples of these neural network include model having a softmax layer. Other embodiments use a model that does not include a softmax layer to generate Euclidean measurable vectors. Various embodiment of the system and/or feature vector component are configured to generate and capture feature vectors for the processed biometrics in the layer or layer preceding the softmax layer.

According to another embodiment, the feature vectors from the feature vector component 312 or system 304 are used by the classifier component 314 to bind a user to a classification (i.e., mapping biometrics to a match able/searchable identity). According to one embodiment, the deep learning neural network (e.g., enrollment and prediction network) is executed as a FCNN trained on enrollment data. In one example, the FCNN generates an output identifying a person or indicating an UNKNOWN individual (e.g., at 306). Other examples, use not fully connected neural networks.

According to various embodiments, the deep learning neural network (e.g., which can be an FCNN) must differentiate between known persons and the UNKNOWN. In some examples, this can be implemented as a sigmoid function in the last layer that outputs probability of class matching based on newly input biometrics or showing failure to match. Other examples achieve matching based on a hinge loss functions.

In further embodiments, the system 304 and/or classifier component 314 are configured to generate a probability to establish when a sufficiently close match is found. In some implementations, an unknown person is determined based on negative return values. In other embodiments, multiple matches can be developed and voting can also be used to increase accuracy in matching.

Various implementations of the system have the capacity to use this approach for more than one set of input. The approach itself is biometric agnostic. Various embodiments employ feature vectors that are distance measurable and/or Euclidean measurable, which is generated using the first neural network. In some instances, different neural networks are configured to process different types of biometrics. Using that approach the encrypted feature vector generating neural network may be swapped for or use a different neural network in conjunction with others where each is capable of creating a distance and/or Euclidean measurable feature vector based on the respective biometric. Similarly, the system may enroll in two or more biometric types (e.g., use two or more vector generating networks) and predict on the feature vectors generated for both (or more) types of biometrics using both neural networks for processing respective biometric type simultaneously. In one embodiment, feature vectors from each type of biometric can likewise be processed in respective deep learning networks configured to predict matches based on feature vector inputs or return unknown. The simultaneous results (e.g., one from each biometric type) may be used to identify using a voting scheme or may better perform by firing both predictions simultaneously According to further embodiments, the system can be configured to incorporate new identification classes responsive to receiving new biometric information. In one embodiment, the system 304 includes a retraining component configured to monitor a number of new biometrics (e.g., per user/identification class or by total number of new biometrics) and automatically trigger a re-enrollment with the new feature vectors derived from the new biometric information (e.g., produced by 312). In other embodiments, the system can be configured to trigger re-enrollment on new feature vectors based on time or time period elapsing.

The system 304 and/or retraining component 316 can be configured to store feature vectors as they are processed, and retain those feature vectors for retraining (including for example feature vectors that are unknown to retrain an unknown class in some examples). Various embodiments of the system are configured to incrementally retrain the model on system assigned numbers of newly received biometrics. Further, once a system set number of incremental retraining have occurred the system is further configured to complete a full retrain of the model. The variables for incremental retraining and full retraining can be set on the system via an administrative function. Some defaults include incremental retrain every 3, 4, 5, 6 identifications, and full retrain every 3, 4, 5, 6, 7, 8, 9, 10 incremental retrains. Additionally, this requirement may be met by using calendar time, such as retraining once a year. These operations can be performed on offline (e.g., locked) copies of the model, and once complete the offline copy can be made live.

Additionally, the system 304 and/or retraining component 316 is configured to update the existing classification model with new users/identification classes. According to various embodiments, the system builds a classification model for an initial number of users, which can be based on an expected initial enrollment. The model is generated with empty or unallocated spaces to accommodate new users. For example, a fifty user base is generated as a one hundred user model. This over allocation in the model enables incremental training to be executed on the classification model. When a new user is added, the system is and/or retraining component 316 is configured to incrementally retrain the classification model—ultimately saving significant computation time over convention retraining executions. Once the over allocation is exhausted (e.g., 100 total identification classes) a full retrain with an additional over allocation can be made (e.g., fully retrain the 100 classes to a model with 150 classes). In other embodiments, an incremental retrain process can be executed to add additional unallocated slots.

Even with the reduced time retraining, the system can be configured to operate with multiple copies of the classification model. One copy may be live that is used for authentication or identification. A second copy may be an update version, that is taken offline (e.g., locked from access) to accomplish retraining while permitting identification operations to continue with a live model. Once retraining is accomplished, the updated model can be made live and the other model locked and updated as well. Multiple instances of both live and locked models can be used to increase concurrency.

According to some embodiments, the system 300 can receive encrypted feature vectors instead of original biometrics and processing original biometrics can occur on different systems—in these cases system 300 may not include, for example, 308, 310, 312, and instead receive feature vectors from other systems, components or processes.

FIGS. 4A-D illustrate example embodiments of a classifier network. The embodiments show a fully connected neural network for classifying feature vectors for training and for prediction. Other embodiments implement different neural networks, including for example, neural networks that are not fully connected. Each of the networks accepts distance and/or Euclidean measurable feature vectors and returns a label or unknown result for prediction or binds the feature vectors to a label during training.

FIGS. 5A-D illustrate examples of processing that can be performed on input biometrics (e.g., facial image) using a neural network. Encrypted feature vectors can be extracted from such neural networks and used by a classifier (e.g., FIGS. 4A-D) during training or prediction operations. According to various embodiments, the system implements a first pre-trained neural network for generating distance and/or Euclidean measurable feature vectors that are used as inputs for a second classification neural network. In other embodiments, other neural networks are used to process biometrics in the first instance. In still other examples, multiple neural networks can be used to generated Euclidean measurable feature vectors from unencrypted biometric inputs each may feed the feature vectors to a respective classifier. In some examples, each generator neural network can be tailored to a respective classifier neural network, where each pair (or multiples of each) is configured to process a biometric data type (e.g., facial image, iris images, voice, health data, etc.).

Implementation Examples

The following example instantiations are provided to illustrates various aspects of privacy-enabled biometric systems and processes. The examples are provided to illustrate various implementation details and provide illustration of execution options as well as efficiency metrics. Any of the details discussed in the examples can be used in conjunction with various embodiments.

It is realized that conventional biometric solutions have security vulnerability and efficiency/scalability issues. Apple, Samsung, Google and MasterCard have each launched biometric security solutions that share at least three technical limitations. These solutions are (1) unable to search biometrics in polynomial time; (2) do not one-way encrypt the reference biometric; and (3) require significant computing resources for confidentiality and matching.

Modern biometric security solutions are unable to scale (e.g. Apple Face ID™ authenticates only one user) as they are unable to search biometrics in polynomial time. In fact, the current "exhaustive search" technique requires significant computing resources to perform a linear scan of an entire biometric datastore to successfully one-to-one record match each reference biometric and each new input record—this is as a result of inherent variations in the biometric instances of a single individual.

Similarly, conventional solutions are unable to one-way encrypt the reference biometric because exhaustive search (as described above) requires a decryption key and a decryption to plaintext in the application layer for every attempted match. This limitation results in an unacceptable risk in privacy (anyone can view a biometric) and authentication (anyone can use the stolen biometric). And, once compromised, a biometric—unlike a password—cannot be reset.

Finally, modern solutions require the biometric to return to plaintext in order to match since the encrypted form is not Euclidean measurable. It is possible to choose to make a biometric two-way encrypted and return to plaintext—but this requires extensive key management and, since a two-way encrypted biometric is not Euclidean measurable, it also returns the solution to linear scan limitations.

Various embodiments of the privacy-enabled biometric system and/or methods provide enhancement over conventional implementation (e.g., in security, scalability, and/or management functions). Various embodiments enable scalability (e.g., via "encrypted search") and fully encrypt the reference biometric (e.g., "encrypted match"). The system is configured to provide an "identity" that is no longer tied independently to each application and a further enables a single, global "Identity Trust Store" that can service any identity request for any application.

Various operations are enabled by various embodiment, and the functions include. For example:

Encrypted Match: using the techniques described herein, a deep neural network ("DNN") is used to process a reference biometric to compute a one-way, homomorphic encryption of the biometric's feature vector before transmitting or storing any data. This allows for computations and comparisons on cipher texts without decryption, and ensures that only the distance and/or Euclidean measurable, homomorphic encrypted biometric is available to execute subsequent matches in the encrypted space. The plaintext data can then be discarded and the resultant homomorphic encryption is then transmitted and stored in a datastore. This example allows for computations and comparisons on cipher texts without decryption and ensures that only the Euclidean measurable, homomorphic encrypted biometric is available to execute subsequent matches in the encrypted space.

Encrypted Search: using the techniques described herein, encrypted search is done in polynomial time according to various embodiments. This allows for comparisons of biometrics and achieve values for comparison that indicate "closeness" of two biometrics to one another in the encrypted space (e.g. a biometric to a reference biometric) while at the same time providing for the highest level of privacy.

Various examples detail implementation of one-to-many identification using, for example, the N-1 layer of a deep neural network. The various techniques are biometric agnostic, allowing the same approach irrespective of the biometric or the biometric type. Each biometric (face, voice, IRIS, etc.) can be processed with a different, fully trained, neural network to create the biometric feature vector.

According to some aspects, an issue with current biometric schemes is they require a mechanism for: (1) acquiring the biometric, (2) plaintext biometric match, (3) encrypting the biometric, (4) performing a Euclidean measurable match, and (5) searching using the second neural network prediction call. To execute steps 1 through 5 for every biometric is time consuming, error prone and frequently nearly impossible to do before the biometric becomes deprecated. One goal with various embodiments, is to develop schemes, techniques and technologies that allow the system to work with biometrics in a privacy protected and polynomial-time based way that is also biometric agnostic. Various embodiments employ machine learning to solve problems issues with (2)-(5).

According to various embodiments, assumed is or no control over devices such as cameras or sensors that acquire the to be analyzed biometrics (thus arriving as plain text). According to various embodiments, if that data is encrypted immediately and only process the biometric information as cipher text, the system provides the maximum practical level of privacy. According to another aspect, a one-way encryption of the biometric, meaning that given cipher text, there is no mechanism to get to the original plaintext, reduces/eliminates the complexity of key management of various conventional approaches. Many one-way encryption algorithms exist, such as MD5 and SHA-512—however, these algorithms are not homomorphic because they are not Euclidean measurable. Various embodiments discussed herein enable a general purpose solution that produces biometric cipher text that is Euclidean measurable using a neural network. Apply a classifying algorithm to the resulting feature vectors enables one-to-many identification. In various examples, this maximizes privacy and runs between $O(n)=1$ and $O(n)=\log(n)$ time.

As discussed above, some capture devices can encrypt the biometric via a one way encryption and provide feature vectors directly to the system. This enables some embodiments, to forgo biometric processing components, training generation components, and feature vector generation components, or alternatively to not use these elements for already encrypted feature vectors.

Example Execution and Accuracy

In some executions, the system is evaluated on different numbers of images per person to establish ranges of operating parameters and thresholds. For example, in the experimental execution the num-epochs establishes the number of interactions which can be varied on the system (e.g., between embodiments, between examples, and between executions, among other options). The LFW dataset is taken from the known labeled faces in the wild data set. Eleven people is a custom set of images and faces94 from the known source—faces94. For our examples, the epochs are the number of new images that are morphed from the original images. So if the epochs are 25, and we have 10 enrollment images, then we train with 250 images. The morphing of the images changed the lighting, angles and the like to increase the accuracy in training.

TABLE I (fully connected neural network model with 2 hidden layers + output sigmoid layer):
➤ Input => [100, 50] => num_people (train for 100 people given 50 individuals to identify).
Other embodiments improve over these accuracies for the UNKNOWN.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.90% | 86.40% |
| LFW | 70% | 30% | 11 people dataset | 2226 | 257 | min_images_per_person = 3 num-epochs = 25 | 93.90% | 87.20% |
| 11 people | 70% | 30% | Copy 2 people from LFW | 77 | 4 | min_images_per_person = 2 num-epochs = 25 | 100.00% | 50.00% |
| faces94 | 70% | 30% | 11 people dataset | 918 | 257 | min_images_per_person = 2 num-epochs = 25 | 99.10% | 79.40% |

TABLE II (0 hidden layers & output linear with decision f(x); Decision at .5 value)
Improves accuracy for the UNKNOWN case, but other implementations achieve higher accuracy.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.80% | 91.10% % |
| LFW | 70% | 30% | 11 people dataset | 2226 | 257 | min_images_per_person = 3 num-epochs = 25 | 96.60% | 97.70% % |
| 11 people | 70% | 30% | Copy 2 people from LFW | 77 | 4 | min_images_per_person = 2 num-epochs = 25 | 98.70% | 50.00% % |
| faces94 | 70% | 30% | 11 people dataset | 918 | 257 | min_images_per_person = 2 num-epochs = 25 Cut-off = 0.5 | 99.10% | 82.10% % |
| faces94 | 70% | 30% | 11 people dataset | 918 | 257 | min_images_per_person = 2 num-epochs = 25 Cut-off = 1.0 | 98.30% | 95.70% |

TABLE III

FCNN with 1 hidden layer (500 nodes) + output linear with decision

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 99.30% | 92.20% |
| LFW | 70% | 30% | 11 people dataset | 2226 | 257 | min_images_per_person = 3 num-epochs = 25 | 97.50% | 97.70% |
| 11 people | 70% | 30% | Copy 2 people from LFW | 77 | 4 | min_images_per_person = 2 num-epochs = 25 | | |
| faces94 | 70% | 30% | 11 people dataset | 918 | 257 | min_images_per_person = 2 num-epochs = 25 Cut-off = 0.5 | 99.20% | 92.60% |
| faces94 | 70% | 30% | 11 people dataset | 918 | 257 | min_images_per_person = 2 num-epochs = 25 Cut-off = 1.0 | | |

TABLE IV

**FCNN 2 Hidden Layers (500, 2\*num_people) + output linear, decisions f(x)**

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.30% | 97.70% |
| LFW | 70% | 30% | 11 people dataset | 2226 | 257 | min_images_per_person = 3 num-epochs = 25 Cut-off = 0 | 98.50% | 98.10% |
| 11 people | 70% | 30% | Copy 2 people from LFW | 77 | 4 | min_images_per_person = 2 num-epochs = 25 | | |
| faces94 | 70% | 30% | 11 people dataset | 918 | 257 | min_images_per_person = 2 num-epochs = 25 Cut-off = 0 | 98.60% | 93.80% |

In various embodiments, the neural network model is generated initially to accommodate incremental additions of new individuals to identify (e.g., 2\*num_people is an example of a model initially trained for 100 people given an initial 50 individuals of biometric information). The multiple or training room provides can be tailored to the specific implementation. For example, where additions to the identifiable users is anticipated to be small additional incremental training options can include any number with ranges of 1% to 200%. In other embodiments, larger percentages can be implemented as well.

TABLE V

**FCNN: 2 Hidden Layers (500, 2\*num_people) + output linear, decisions f(x), and voting - where the model is trained on 2\* the number of class identifiers for incremental training.**

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set = 11 people | Accuracy In UNKNOWN PERSON Set = faces94 |
|---|---|---|---|---|---|---|---|---|---|
| LFW | 70% | 30% | 11 people dataset | 1304 | 257 | min_images_per_person = 10 num-epochs = 25 | 98.20% (vote) 100.00% | 98.80% (vote) 100.00% | 88.40% (vote) 90.80% |
| LFW | 70% | 30% | 11 people dataset | 2226 | 257 | min_images_per_person = 3 num-epochs = 25 Cut-off = 0 | 98.10% (vote) 98.60% | 98.40% (vote) 100.00% | 93.60% (vote) 95.40% |

TABLE V-continued

FCNN: 2 Hidden Layers (500, 2*num_people) + output linear, decisions f(x), and voting - where the model is trained on 2* the number of class identifiers for incremental training.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set = 11 people | Accuracy In UNKNOWN PERSON Set = faces94 |
|---|---|---|---|---|---|---|---|---|---|
| 11 people | 70% | 30% | Copy 2 people from LFW | 77 | 4 | min_images_per_person = 2 num-epochs = 25 | | | |
| faces94 | 70% | 30% | 11 people dataset | 918 | 257 | min_images_per_person = 2 num-epochs = 25 Cut-off = 0 | | | |

According to one embodiment the system can be implemented as a REST compliant API that can be integrated and/or called by various programs, applications, systems, system components, etc., and can be requested locally or remotely.

In one example, the privacy-enabled biometric API includes the following specifications:
Preparing data: this function takes the images & labels and saves them into the local directory.

```
{
def add_training_data(list_of_images, list_of_label) :
    @params list_of_images: the list of images
    @params list_of_label: the list of corresponding labels
}
```

Training model: each label (person/individual) can include at least 2 images. In some examples, if the person does not have the minimum that person will be ignored.

```
{
def train( ) :
}
● Prediction:
{
def predict(list_of_images) :
    @params list_of_images: the list of images of the same person
    @return label: a person name or "UNKNOWN_PERSON"
}
```

Further embodiments can be configured to handle new people (e.g., labels or classes in the model) in multiple ways. In one example, the current model can be retrained every time (e.g., with a threshold number) a certain number of new people are introduced. In this example, the benefit is improved accuracy—the system can guarantee a level of accuracy even with new people. There exists a trade-off in that full retraining is a slow time consuming and a heavy computation process. This can be mitigated with live and offline copies of the model so the retraining occurs offline and the newly retrain model is swapped for the live version. In one example, training time executed in over 20 minutes. With more data the training time increases.

According to another example, the model is initialized with slots for new people. The expanded model is configured to support incremental training (e.g., the network structure is not changed when adding new people). In this example, the time to add new people is significantly reduced (even over other embodiments of the privacy-enabled biometric system). It is realized that there may be some reduction in accuracy with incremental training, and as more and more people are added the model can trends towards overfit on the new people i.e., become less accurate with old people. However, various implementations have been tested to operate at the same accuracy even under incremental retraining.

Yet another embodiments implements both incremental retraining and full retraining at a threshold level (e.g., build the initial model with a multiple of the people as needed—(e.g., 2 times—100 labels for an initial 50 people, 50 labels for an initial 25 people, etc.)). Once the number of people reaches the upper bound (or approaches the upper bound) the system can be configured to execute a full retrain on the model, while building in the additional slots for new users. In one example, given 100 labels in the model with 50 initial people (50 unallocated) reaches 50 new people, the system will execute a full retrain for 150 labels and now 100 actual people. This provides for 50 additional users and incremental retraining before a full retrain is executed.

Stated generally, the system in various embodiments is configured to retrain the whole network from beginning for every N people. Training data: have 100 people; step 1: train the network with N=1000 people; assign 100 people and reserving 900 to train incremental; train incrementally with new people until we reach 1000 people; and reach 1000 people, full retrain. Full retrain: train the network with 2N=2000 people; now have 1000 people for reserving to train incremental; train incrementally with new people until we reach 2000 people; and repeat the full retrain with open allocations when reach the limit.

An example implementation of the API includes the following code:

```
drop database if exists trueid;
create database trueid;
grant all on trueid.* to trueid@'localhost' identified by 'trueid';
drop table if exists feature;
drop table if exists image;
drop table if exists PII;
drop table if exists subject;
CREATE TABLE subject
(
    id INT PRIMARY KEY AUTO_INCREMENT,
    when_created TIMESTAMP DEFAULT CURRENT_TIMESTAMP
);
CREATE TABLE PII
(
    id INT PRIMARY KEY AUTO_INCREMENT,
    subject_id INT,
    tag VARCHAR(254),
    value VARCHAR(254)
);
CREATE TABLE image
(
    id INT PRIMARY KEY AUTO_INCREMENT,
```

-continued

```
    subject_id INT,
    image_name VARCHAR(254),
    is_train boolean,
    when_created TIMESTAMP DEFAULT CURRENT_TIMESTAMP
);
CREATE TABLE feature
(
    id INT PRIMARY KEY AUTO_INCREMENT,
    image_id INT NOT NULL,
    feature_order INT NOT NULL,
    feature_value DECIMAL(32,24) NOT NULL
);
ALTER TABLE image ADD CONSTRAINT fk_subject_id FOREIGN
KEY (subject_id) REFERENCES subject(id);
    ALTER TABLE PII ADD CONSTRAINT fk_subject_id_pii
FOREIGN KEY (subject_id) REFERENCES subject(id);
    ALTER TABLE feature ADD CONSTRAINT fk_image_id FOREIGN
KEY (image_id) REFERENCES image(id);
    CREATE INDEX piisubjectid ON PII(subject_id);
    CREATE INDEX imagesubjectid ON image(subject_id);
    CREATE INDEX imagesubjectidimage ON image(subject_id,
image_name);
    CREATE INDEX featureimage_id ON feature(image_id);
```

API Execution Example

Push the known LFW feature embeddings to biometric feature database.
Simulate the incremental training process:
num_seed=50 #build the model network, and first num_seed people was trained fully
num_window=50 #For every num_window people: build the model network, and people trained fully
num_step=1 #train incremental every new num_step people
num_eval=10 #evaluate the model every num_eval people
Build the model network with #class=100. Train from beginning (#epochs=100) with the first 50 people. The remaining 50 classes are reserved for incremental training.
  i) Incremental training for the 51st person. Train the previous model with all 51 people (#epochs=20)
  ii) Incremental training for the 52nd person. Train the previous model with all 52 people (#epochs=20)
  iii) continue . . .
(Self or automatic monitoring can be executed by various embodiments to ensure accuracy over time—alert flags can be produced if deviation or excessive inaccuracy is detected; alternatively or in conjunction full retraining can be executed responsive to excess inaccuracy and the fully retrained model evaluated to determine is accuracy issues are resolved—if so the full retrain threshold can be automatically adjusted). Evaluate the accuracy of the previous model (e.g., at every 10 steps), optionally record the training time for every step.
Achieve incremental training for maximum allocation (e.g., the 100th person). Full train of the previous model with all 100 people (e.g., #epochs=20)
Build the model network with #class=150. Train from beginning (e.g., #epochs=100) with the first 100 people. The remaining 50 classes are reserved for incremental training.
  i) Incremental training for the 101st person. Train the previous model with all 101 people (#epochs=20)
  ii) continue . . .
Build the model network with #class=200. Train from beginning (e.g., #epochs=100) with the first 150 people. The remaining 50 classes are reserved for incremental training.
  i) Incremental training for the 151st person. Train the previous model with all 151 people (#epochs=20)
  ii) Continue . . .
Refactor problem:

According to various embodiments, it is realized that incremental training can trigger concurrency problems: e.g., a multi-thread problem with the same model, thus the system can be configured to avoid retrain incrementally at the same time for two different people (data can be lost if retraining occurs concurrently). In one example, the system implements a lock or a semaphore to resolve. In another example, multiple models can be running simultaneously—and reconciliation can be executed between the models in stages. In further examples, the system can monitor models to ensure only one retrain is executed on multiple live models, and in yet others use locks on the models to ensure singular updates via incremental retrain. Reconciliation can be executed after an update between models. In further examples, the system can cache feature vectors for subsequent access in the reconciliation.

According to some embodiments, the system design resolves a data pipeline problem: in some examples, the data pipeline supports running one time due to queue and thread characteristics. Other embodiments, avoid this issue by extracting the embeddings. In examples, that do not include that functionality the system can still run multiple times without issue based on saving the embedding to file, and loading the embedding from file. This approach can be used, for example, where the extracted embedding is unavailable via other approaches. Various embodiments can employ different options for operating with embeddings: when we give a value to a tensorflow, we have several ways: Feed_dict (speed trade-off for easier access); and Queue: faster via multi-threads, but can only run one time (the queue will be end after it's looped).

Table VIII & TABLE IX (below) shows execution timing during operation and accuracy percentages for the respective example.

TABLE VI

| 1 | STEP | ACTION | INFO | TIME | ACCURACY |
|---|------|--------|------|------|----------|
| 2 | 50 | Retrieving feature embedding | | 100.939024 | |
| 3 | 50 | Training Deep Learning classifier | | 54.34578061 | |
| 4 | 51 | Retrieving feature embedding | | 104.8042319 | |
| 5 | 51 | Training incrementally Deep Learning classifier | | 9.755134106 | |
| 6 | 52 | Retrieving feature embedding | | 105.692045 | |
| 7 | 52 | Training incrementally Deep Learning classifier | | 9.367767096 | |
| 8 | 53 | Retrieving feature embedding | | 95.68940234 | |
| 9 | 53 | Training incrementally Deep Learning classifier | | 9.38846755 | |
| 10 | 54 | Retrieving feature embedding | | 108.8445647 | |

TABLE VI-continued

| 1 | STEP | ACTION | INFO | TIME | ACCURACY |
|---|------|--------|------|------|----------|
| 11 | 54 | Training incrementally Deep Learning classifier | | 9.668224573 | |
| 12 | 55 | Retrieving feature embedding | | 108.7391896 | |
| 13 | 55 | Training incrementally Deep Learning classifier | | 10.2577827 | |
| 14 | 56 | Retrieving feature embedding | | 107.1305535 | |
| 15 | 56 | Training incrementally Deep Learning classifier | | 9.660038471 | |
| 16 | 57 | Retrieving feature embedding | | 111.1128619 | |
| 17 | 57 | Training incrementally Deep Learning classifier | | 9.824867487 | |
| 18 | 58 | Retrieving feature embedding | | 109.780278 | |
| 19 | 58 | Training incrementally Deep Learning classifier | | 10.25701618 | |
| 20 | 59 | Retrieving feature embedding | | 114.9919829 | |
| 21 | 59 | Training incrementally Deep Learning classifier | | 9.752382278 | |
| 22 | 60 | Retrieving feature embedding | | 114.3731036 | |
| 23 | 60 | Training incrementally Deep Learning classifier | | 10.15184236 | |
| 24 | 60 | Accuracy | #test_images = 533 | | 0.988743 |
| 25 | 60 | Vote Accuracy | #test_images = 533 | | 1 |
| 26 | 61 | Retrieving feature embedding | | 118.237993 | |
| 27 | 61 | Training incrementally Deep Learning classifier | | 10.0895071 | |
| 28 | 62 | Retrieving feature embedding | | 120.2519257 | |
| 29 | 62 | Training incrementally Deep Learning classifier | | 10.69825125 | |
| 30 | 63 | Retrieving feature embedding | | 119.3803787 | |
| 31 | 63 | Training incrementally Deep Learning classifier | | 10.66580486 | |
| 32 | 64 | Retrieving feature embedding | | 138.031605 | |
| 33 | 64 | Training incrementally Deep Learning classifier | | 12.32183456 | |
| 34 | 65 | Retrieving feature embedding | | 133.2701755 | |
| 35 | 65 | Training incrementally Deep Learning classifier | | 12.35964537 | |
| 36 | 66 | Retrieving feature embedding | | 136.8798289 | |
| 37 | 66 | Training incrementally Deep Learning classifier | | 12.07544327 | |
| 38 | 67 | Retrieving feature embedding | | 140.3868775 | |
| 39 | 67 | Training incrementally Deep Learning classifier | | 12.54206896 | |
| 40 | 68 | Retrieving feature embedding | | 140.855052 | |
| 41 | 68 | Training incrementally Deep Learning classifier | | 12.59552693 | |
| 42 | 69 | Retrieving feature embedding | | 140.2500689 | |
| 43 | 69 | Training incrementally Deep Learning classifier | | 12.55604577 | |
| 44 | 70 | Retrieving feature embedding | | 144.5612676 | |
| 45 | 70 | Training incrementally Deep Learning classifier | | 12.95398426 | |
| 46 | 70 | Accuracy | #test_images = 673 | | 0.9925706 |
| 47 | 70 | Vote Accuracy | #test_images = 673 | | 1 |
| 48 | 71 | Retrieving feature embedding | | 145.2458987 | |
| 49 | 71 | Training incrementally Deep Learning classifier | | 13.09419131 | |

TABLE VII

| 1 | STEP | ACTION | INFO | TIME | ACCURACY |
|---|------|--------|------|------|----------|
| 67 | 80 | Training incrementally Deep Learning classifier | | 14.24880123 | |
| 68 | 80 | Accuracy | #test_images = 724 | | 0.9903315 |
| 69 | 80 | Vote Accuracy | #test_images = 724 | | 1 |
| 70 | 81 | Retrieving feature embedding | | 153.8295755 | |
| 71 | 81 | Training incrementally Deep Learning classifier | | 14.72389603 | |
| 72 | 82 | Retrieving feature embedding | | 157.9210677 | |
| 73 | 82 | Training incrementally Deep Learning classifier | | 14.57672453 | |
| 74 | 83 | Retrieving feature embedding | | 164.8383744 | |
| 75 | 83 | Training incrementally Deep Learning classifier | | 21.83570766 | |
| 76 | 84 | Retrieving feature embedding | | 161.2950387 | |
| 77 | 84 | Training incrementally Deep Learning classifier | | 14.25801277 | |
| 78 | 85 | Retrieving feature embedding | | 155.9785285 | |
| 79 | 85 | Training incrementally Deep Learning classifier | | 14.45170879 | |
| 80 | 86 | Retrieving feature embedding | | 160.9079704 | |
| 81 | 86 | Training incrementally Deep Learning classifier | | 14.81818509 | |
| 82 | 87 | Retrieving feature embedding | | 164.5734673 | |
| 83 | 87 | Training incrementally Deep Learning classifier | | 18.26664591 | |
| 84 | 88 | Retrieving feature embedding | | 169.8400548 | |
| 85 | 88 | Training incrementally Deep Learning classifier | | 15.75074983 | |
| 86 | 89 | Retrieving feature embedding | | 169.2413263 | |
| 87 | 89 | Training incrementally Deep Learning classifier | | 15.93148685 | |
| 88 | 90 | Retrieving feature embedding | | 172.5191889 | |
| 89 | 90 | Training incrementally Deep Learning classifier | | 15.88449383 | |
| 90 | 90 | Accuracy | #test_images = 822 | | 0.986618 |
| 91 | 90 | Vote Accuracy | #test_images = 822 | | 0.9963504 |
| 92 | 91 | Retrieving feature embedding | | 170.162873 | |
| 93 | 91 | Training incrementally Deep Learning classifier | | 15.72525668 | |
| 94 | 92 | Retrieving feature embedding | | 174.9947026 | |
| 95 | 92 | Training incrementally Deep Learning classifier | | 15.791049 | |
| 96 | 93 | Retrieving feature embedding | | 175.3449857 | |

TABLE VII-continued

| 1 | STEP | ACTION | INFO | TIME | ACCURACY |
|---|---|---|---|---|---|
| 97 | 93 | Training incrementally Deep Learning classifier | | 15.8756597 | |
| 98 | 94 | Retrieving feature embedding | | 177.0825081 | |
| 99 | 94 | Training incrementally Deep Learning classifier | | 15.72812366 | |
| 100 | 95 | Retrieving feature embedding | | 178.8846812 | |
| 101 | 95 | Training incrementally Deep Learning classifier | | 16.04615927 | |
| 102 | 96 | Retrieving feature embedding | | 171.2114341 | |
| 103 | 96 | Training incrementally Deep Learning classifier | | 16.32442522 | |
| 104 | 97 | Retrieving feature embedding | | 177.8708515 | |
| 105 | 97 | Training incrementally Deep Learning classifier | | 15.90093112 | |
| 106 | 98 | Retrieving feature embedding | | 177.5916936 | |
| 107 | 98 | Training incrementally Deep Learning classifier | | 16.57834721 | |
| 108 | 99 | Retrieving feature embedding | | 185.1854212 | |
| 109 | 99 | Training incrementally Deep Learning classifier | | 16.64935994 | |
| 110 | 100 | Retrieving feature embedding | | 179.5375969 | |
| 111 | 100 | Training incrementally Deep Learning classifier | | 17.24395561 | |
| 112 | 100 | Accuracy | #test_images = 875 | | 0.9897143 |
| 113 | 100 | Vote Accuracy | #test_images = 875 | | 1 |
| 114 | 100 | Retrieving feature embedding | | 184.8017459 | |

TABLE VIII shows summary information for additioanl executions.

| Dataset | Training Set | Test Set | UNKNOWN PERSON Set | #people in Traing Set | #images In Test Set | #images In UNKNOWN PERSON Set | Parameters | Accuracy In Test Set |
|---|---|---|---|---|---|---|---|---|
| LFW | 70% | 30% | 11 people dataset | 158 | 1304 | 257 | min_images_per_person = 10 num-epochs = 25 Cut-off = 0 | 98.70% (vote) 100.00% |
| LFW | 70% | 30% | 11 people dataset | 901 | 2226 | 257 | min_images_per_person = 3 num-epochs = 25 Cut-off = 0 | 93.80% (vote) 95.42% |

According to one embodiment, the system can be described broadly to include the any one or more or any combination of the following elements and associated functions:

Preprocessing: where the system takes in an unprocessed biometric, which can include cropping and aligning and either continues processing or returns that the biometric cannot be processed.

Neural network 1: Pre-trained. Takes in unencrypted biometrics. Returns biometric feature vectors that are one way encrypted and distance and/or Euclidean measurable. Regardless of biometric type being processed—NN1 generates Euclidean measurable encrypted feature vectors.

Distance evaluation of NN1 output for a phase of authentication and/or to filter output of NN1: As discussed above, a first phase of authentication can use encrypted feature vectors to determine a distance and authenticate or not based on being within a threshold distance. Similarly during enrollment the generated feature vectors can be evaluated to ensure they are within a threshold distance and otherwise require new biometric samples.

Neural network 2: Not pre-trained. It is a deep learning neural network that does classification. Includes incremental training, takes a set of label, feature vector pairs as input and returns nothing during training—the trained network is used for matching or prediction on newly input biometric information. Does prediction, which takes a feature vector as input and returns an array of values. These values, based on their position and the value itself, determine the label or unknown.

Voting functions can be executed with neural network 2 e.g., during prediction.

System may have more than one neural network 1 for different biometrics. Each would generate Euclidean measurable encrypted feature vectors based on unencrypted input.

System may have multiple neural network 2(s) one for each biometric type.

Figure 6:
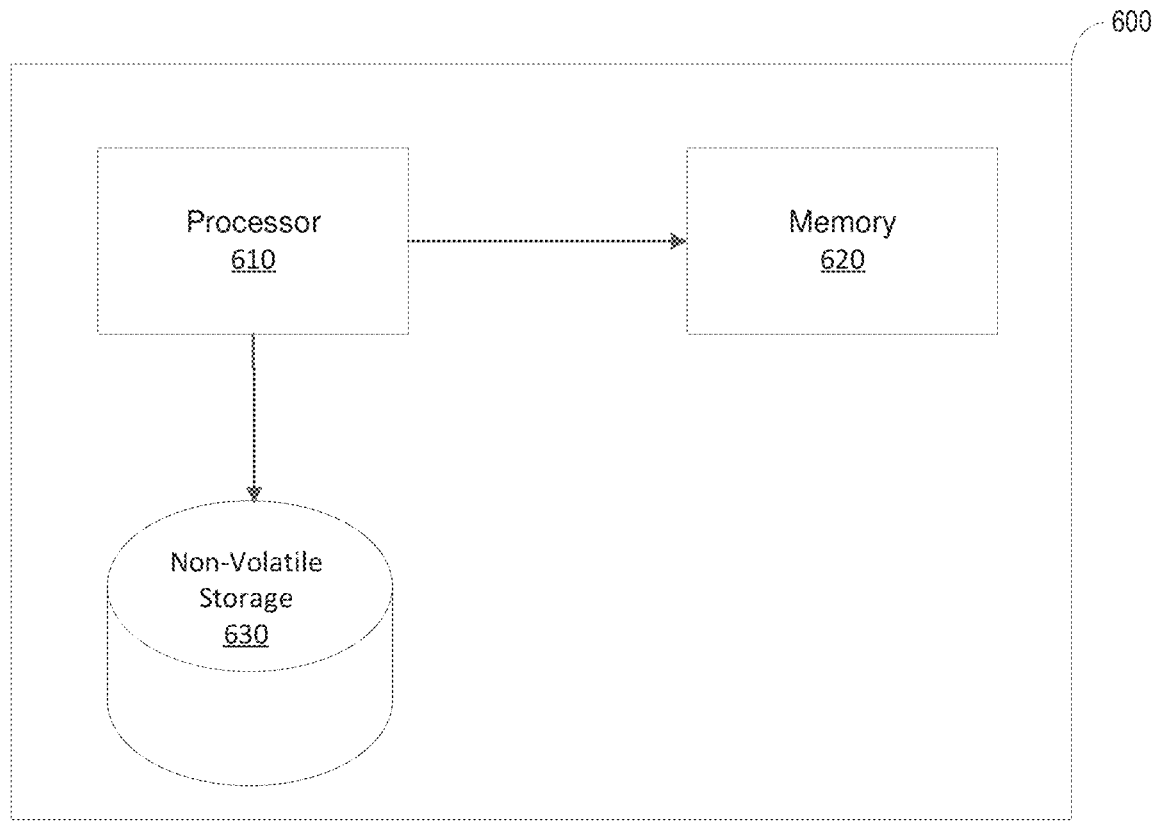
FIG. 6 is a block diagram of an embodiment of a special purpose computer system program to execute the processes and/or functions described herein.

Modifications and variations of the discussed embodiments will be apparent to those of ordinary skill in the art and all such modifications and variations are included within the scope of the appended claims. An illustrative implementation of a computer system 600 that may be used in connection with any of the embodiments of the disclosure provided herein is shown in FIG. 6. The computer system 600 may include one or more processors 610 and one or more articles of manufacture that comprise non-transitory computer-readable storage media (e.g., memory 620 and one or more non-volatile storage media 630). The processor 610 may control writing data to and reading data from the memory 620 and the non-volatile storage device 630 in any suitable manner. To perform any of the functionality described herein, the processor 610 may execute one or more processor-executable instructions stored in one or more non-transitory computer-readable storage media (e.g., the memory 620), which may serve as non-transitory computer-readable storage media storing processor-executable instructions for execution by the processor 610.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIGS. 1 and 2A-2B, 9, 10, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed:

1. A privacy-enabled biometric system comprising:
at least one processor operatively connected to a memory, the at least one processor configured to:
establish an authentication mode of operation;
execute a first machine learning ("ML") process based on the authentication mode, wherein the first ML process when executed by the at least one processor is configured to accept distance measurable encrypted feature vectors as input and classify the distance measurable encrypted feature vector input as part of identification or authentication of an entity using a first classification network trained on the distance measurable encrypted feature vectors, produced, at least in part, by a pre-trained generation neural network, for a plurality of identification classes, to determine a match to information of an identification data type;
execute a second ML process based on the authentication mode, wherein the second ML process when executed by the at least one processor is configured to:
compare distances between at least one stored distance measurable encrypted feature vector and a newly generated distance measurable encrypted feature vector of the identification data type, produced, at least in part, by the pre-trained generation neural network, during identification or authentication of an entity to determine a match; and return a label associated with the entity identified by one or both of the first ML process or the second ML process, or return an unknown result on failure to match.

2. The system of claim 1, wherein the second ML process when executed by the at least one processor is configured to process plain text identification inputs of the identification data type using the pre-trained neural network that is trained to generate distance measurable encrypted feature vectors from the plain text identification inputs of the identification data type.

3. The system of claim 1, wherein at least one of the first ML process or the second ML process is configured, during enrollment, to:

determine one or more distances between encrypted feature vectors produced by the pre-trained generation neural network;

exclude encrypted feature vectors having one or more distances exceeding a threshold distance for subsequent training processes; and include encrypted feature vectors having distances within the threshold distance for subsequent training processes.

4. The system of claim 1, wherein the at least one processor is configured to determine the authentication mode and select one or both of the first ML process or the second ML process for execution.

5. The system of claim 3, wherein the at least one processor is configured to trigger at least training operations of one or both the first and second ML processes responsive to determining that a current authentication mode includes an enrollment mode.

6. The system of claim 3, wherein the at least one processor is configured to execute at least part of the second ML process to authenticate a new user until at least a period of time required for training the first classification network expires.

7. The system of claim 6, wherein the at least one processor is configured to execute at least part of the first ML process to authenticate a new user responsive to completing training of the first classification network.

8. The system of claim 1, wherein the first classification network comprises a deep neural network ("DNN"), wherein the DNN is configured to:

generate an array of values in response to input of at least one unclassified encrypted feature vector during authentication; and determine a label or unknown result based on analyzing the generate array of values.

9. The system of claim 1, wherein the first classification network and the pre-trained generation neural network define an operative pairing based on a first biometric data type, the operative pairing including at least one instance of a first DNN and at least one instance of a first pre-trained generation neural network that are collectively configured to process and predict matches on input of the first biometric data type.

10. The system of claim 9, wherein the at least one processor is configured to instantiate at least a second operative pairing of neural networks including a second classification network and a second pre-trained generation neural network, the second operative pairing configured to process and predict matches on a second biometric data type.

11. The system of claim 1, wherein the at least one processor is configured to communicate or execute an application configured to:

initiate an input of plaintext instances of a first biometric data type; and automatically delete the plaintext instances of the first biometric data type subsequent to generation of the distance measurable encrypted feature vectors of the first biometric data type.

12. The system of claim 1, wherein the first pre-trained generation neural network is configured to generate the distance measurable encrypted feature vectors during prediction, independent of an identity of the entity to be identified or authenticated.

13. A computer implemented method for privacy enabled authentication, the method comprising:

establishing an authentication mode of operation;

triggering, by at least one processor, one or both of a first machine learning ("ML") process or a second ML process responsive to determining an authentication mode;

executing, by the at least one processor, the first ML process, wherein executing the first ML process includes:

accepting at least one distance measurable encrypted feature vector, produced, at least in part, by a pre-trained generation neural network, as input to a first classification-network, and classifying the distance measurable encrypted feature vector input as part of identification or authentication of an entity using the first classification network trained on the distance measurable encrypted feature vectors for a plurality of identification classes, to determine a match;

executing, by the at least one processor, the second ML process, wherein executing the second ML process includes:

comparing, by the at least one processor, distances between at least one stored distance measurable encrypted feature vector and a newly generated distance measurable encrypted feature vector during identification or authentication of the entity to determine a match, the newly generated distance measurable encrypted feature vector produced, at least in part, by the pre-trained neural network; and returning a label associated with the entity identified by one or both of the first ML process or the second ML process, or returning an unknown result on failure to match.

14. The method of claim 13, further comprising:

processing plain text identification inputs of an identification data type using a pre-trained neural network trained to generate distance measurable encrypted feature vectors from the plain text identification inputs of the identification data type.

15. The method of claim 13, further comprising:

determining one or more distances between encrypted feature vectors produced by the pre-trained generation neural network;

excluding encrypted feature vectors having one or more distances exceeding a threshold distance for subsequent training processes; and including encrypted feature vectors having distances within the threshold distance for subsequent training processes.

16. The method of claim 13, further comprising determining the authentication mode and select one or both of the first ML process or the second ML process for execution.

17. The method of claim 13, further comprising determining the authentication mode includes operations to identify an enrollment mode for establishing a new entity for subsequent authentication.

18. The method of claim 13, wherein the first classification network and the pre-trained generation neural network define an operative pairing based on a first biometric data type, the operative pairing including at least one instance of a first DNN and at least one instance of a first pre-trained generation neural network that are collectively configured to process and predict matches on input of the first biometric data type.

19. The method of claim 18, wherein the method further comprises instantiating at least a second operative pairing of neural networks including a second classification network and a second pre-trained generation neural network, the second operative pairing configured to process and predict matches on a second identification data type.

20. The method of claim 13, wherein the method further comprises:
communicating or executing an application;
initiating, by the application, an input of plaintext instances of a first biometric data type; and
automatically deleting, by the application, the plaintext instances of the first biometric data type subsequent to generation of the distance measurable encrypted feature vectors of the first biometric data type.

21. The method of claim 13, wherein the method further comprises generating by the first pre-trained generation neural network the distance measurable encrypted feature vectors during prediction, independent of an identity of the entity to be identified or authenticated.

\* \* \* \* \*